(12) United States Patent
Wang et al.

(10) Patent No.: US 12,490,203 B2
(45) Date of Patent: Dec. 2, 2025

(54) DELAY-TOLERANT CONSTRAINED ONLINE CONVEX OPTIMIZATION

(71) Applicant: Telefonaktiebolaget LM Ericsson (publ), Stockholm (SE)

(72) Inventors: Juncheng Wang, Toronto (CA); Ben Liang, Whitby (CA); Min Dong, Whitby (CA); Gary Boudreau, Kanata (CA); Hatem Abou-Zeid, Calgary (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 511 days.

(21) Appl. No.: 18/006,794

(22) PCT Filed: Aug. 3, 2021

(86) PCT No.: PCT/IB2021/057106
§ 371 (c)(1),
(2) Date: Jan. 25, 2023

(87) PCT Pub. No.: WO2022/034436
PCT Pub. Date: Feb. 17, 2022

(65) Prior Publication Data
US 2023/0284154 A1    Sep. 7, 2023

Related U.S. Application Data

(60) Provisional application No. 63/065,757, filed on Aug. 14, 2020.

(51) Int. Cl.
*H04W 52/34* (2009.01)
*H04W 52/24* (2009.01)

(52) U.S. Cl.
CPC ......... *H04W 52/346* (2013.01); *H04W 52/24* (2013.01)

(58) Field of Classification Search
CPC ..................... H04W 52/346; H04W 52/24
See application file for complete search history.

(56) References Cited

U.S. PATENT DOCUMENTS 9,979,458 B1 * 5/2018 Sivasivaganesan .. H04B 7/0634
2012/0002743 A1 * 1/2012 Cavalcante ............ H04B 7/024
                                                            375/267

(Continued)

FOREIGN PATENT DOCUMENTS

CN     105163380 A     12/2015
WO    2018/207031 A1   11/2018

OTHER PUBLICATIONS

International Search Report and Written Opinion dated Nov. 9, 2021 issued in PCT Application No. PCT/IB2021/057106 filed Aug. 3, 2021, consisting of 17 pages.

(Continued)

*Primary Examiner* — Lewis G West
(74) *Attorney, Agent, or Firm* — Sonoda & Kobayashi Intellectual Property Law; Sarvajit S. Patil

(57) ABSTRACT

A method and network node configured to perform wireless network virtualization to allocate resources of an infrastructure provider (InP) among a plurality of service providers (SPs) are provided. According to one aspect, a method in a network node includes, in each of a plurality of successive time slots in a time interval, T: receiving precoding feedback information from each SP, allocating a virtual transmit power to each cell served by an SP based at least in part on the received precoding feedback information and determining a precoding matrix for each SP. The method also includes minimizing a loss function based at least in part on the received precoding feedback information received in multiple previous time slots.

20 Claims, 22 Drawing Sheets

(56) References Cited

U.S. PATENT DOCUMENTS

| | | | | |
|---|---|---|---|---|
| 2014/0177461 | A1* | 6/2014 | Seyedmehdi | H04B 7/026 370/336 |
| 2014/0317241 | A1* | 10/2014 | Zhao | H04L 65/756 709/219 |
| 2017/0019297 | A1* | 1/2017 | Rakib | H04W 88/085 |
| 2017/0064675 | A1* | 3/2017 | Kim | H04W 72/23 |
| 2017/0250739 | A1* | 8/2017 | Guerreiro | H04W 52/247 |
| 2018/0248639 | A1* | 8/2018 | He | H04W 16/20 |
| 2018/0331731 | A1* | 11/2018 | Boudreau | H04B 7/0456 |
| 2019/0260434 | A1* | 8/2019 | Park | H04B 7/0626 |
| 2022/0103210 | A1* | 3/2022 | Wang | H04B 7/0426 |
| 2023/0014932 | A1* | 1/2023 | Huang | H04W 24/02 |
| 2023/0058926 | A1* | 2/2023 | Boudreau | H04B 7/0452 |
| 2023/0223992 | A1* | 7/2023 | Boudreau | H04B 7/0634 370/328 |
| 2025/0167840 | A1* | 5/2025 | Kaver | H04B 7/0452 |

OTHER PUBLICATIONS

Wang et al., Online Precoding Design for Downlink MIMO Wireless Network Virtualization with Imperfect CSI; IEEE Infocom 2020; IEEE Conference on Computer Communications, IEEE; Jul. 6, 2020, consisting of 10 pages.

Wang et al., Online MIMO Wireless Network Virtualization Over Time-Varying Channels with Periodic Updates; May 26, 2020 IEEE 21st International Workshop on Signal Processing Advances in Wireless Communication (SPAWC), consisting of 5 pages.

Wang et al., Online Downlink MIMO Wireless Network Virtualization in Fading Environments; Dec. 9, 2019 IEEE Global Communications Conference (Globecom), IEEE, consisting of 6 pages.

Shai Shalev-Shwartz, Online Learning and Online Convex Optimization; Foundations and Trends in Machine Learning, vol. 4; Feb. 2012, consisting of 22 pages.

Elad Hazan, Introduction to Online Convex Optimization; Foundations and Trends Optim. vol. 2, Aug. 2016, consisting of 178 pages.

Martin Zinkevic, Online Convex Programming and Generalized Infinitesimal Gradient Ascent; Proc. Intel. Conf. Mach. Learn. (ICML), 2003, consisting of 8 pages.

Eric C. Hall et al., Online Convex Optimization in Dynamic Environments, IEEE Journal of Selected Topics in Signal Processing, vol. 9, No. 4, Jun. 2015, consisting of 16 pages.

Ali Jadbabaie et al., Online Optimization: Competing with Dynamic Comparators, Proc. Intel. Conf. Artif. Intell. Statist., May 2015, consisting of 9 pages.

Mehrdad Mahdavi et al., Trading Regret for Efficiency: Online Convex Optimization with Long Term Constraints; Journal of Machine Learning Research; Sep. 2012, consisting of 26 pages.

Rodolphe Jenatton et al., Adaptive Algorithms for Online Convex Optimization with Long-term Constraints; Proc. Intel. Conf. Mach. Learn. (ICML), Jun. 2016, consisting of 10 pages.

Hao Yu et al., A Low Complexity Algorithm with $O(\sqrt{T})$ Regret and $O(1)$ Constraint Violations for Online Convex Optimization with Long Term Constraints; Journal of Machine Learning Research, vol. 21, Feb. 2020, consisting of 24 pages.

Tianyi Chen et al., An Online Convex Optimization Approach to Proactive Network Resource Allocation; IEEE Transactions on Signal Processing, vol. 65, No. 24; Dec. 15, 2017, consisting of 15 pages.

Xuanyu Cao, et al., A Virtual-Queue-Based Algorithm for Constrained Online Convex Optimization With Applications to Data Center Resource Allocation; IEEE Journal of Selected Topics in Signal Processing, vol. 12, No. 4, Aug. 2018, consisting of 14 pages.

John Langford et al., Slow Learners are Fast; Proc. Adv. Neural Info. Proc. Sys. (NIPS), 2009, consisting of 9 pages.

H. Brendan McMahan et al., Delay-Tolerant Algorithms for Asynchronous Distributed Online Learning; Proc. Adv. Neural Info. Proc. Sys. (NIPS), 2014, consisting of 9 pages.

Kent Quanrud et al., Online Learning with Adversarial Delays, Proc. Adv. Neural Info. Proc. Sys. (NIPS), 2015, consisting of 9 pages.

Xuanyu Cao et al., Impact of Delays on Constrained Online Convex Optimization; Proc. Asilomar Conf. Signal Sys. Compu., Nov. 2019, consisting of 4 pages.

Xin Wang et al., Wireless Network Virtualization; International Conference on Computing, Networking and Communications, Invited Position Papers; Jan. 2013, consisting of 5 pages.

Matias Richart et al., Resource Slicing in Virtual Wireless Networks: A Survey; IEEE Transactions on Network and Service Management, vol. 13, No. 3; Sep. 2016, consisting of 15 pages.

Vikas Jumba et al., Resource Provisioning in Wireless Virtualized Networks via Massive-MIMO; IEEE Wireless Communications Letter, vol. 4, No. 3; Jun. 2015, consisting of 4 pages.

Zheng Chang et al., Energy Efficient Optimization for Wireless Virtualized Small Cell Networks With Large-Scale Multiple Antenna; IEEE Transactions on Communications, vol. 65, No. 4; Apr. 2017, consisting of 12 pages.

Kun Zhu et al., Virtualization of 5G Cellular Networks as a Hierarchical Combinatorial Auction; IEEE Transactions on Mobile Computing, vol. 15, No. 10; Oct. 2016, consisting of 15 pages.

Saeedeh Parsaeefard, et al., Dynamic Resource Allocation for Virtualized Wireless Networks in Massive-MIMO-Aided and Fronthaul-Limited C-RAN; IEEE Transactions on Vehicular Technology, vol. 66, No. 10; Oct. 2017, consisting of 9 pages.

Daniel Tweed et al., Dynamic Resource Allocation for Uplink MIMO NOMA VWN with Imperfect SIC; IEEE Int. Conf. Commun. (ICC); May 2018, consisting of 6 pages.

Ye Liu et al., Antenna Allocation and Pricing in Virtualized Massive MIMO Networks via Stackelberg Game; IEEE Transactions on Communications, vol. 66, No. 11; Nov. 2018, consisting of 15 pages.

Mohammadmoein Soltanizadeh et al., Power Minimization in Wireless Network Virtualization with Massive MIMO; Proc. Intel. Conf. Commun. (ICC) Workshops; May 2018, consisting of 6 pages.

Juncheng Wang et al., Online Downlink MIMO Wireless Network Virtualization in Fading Environments; Proc. IEEE Global Commun. Conf. (Globecom); Dec. 2019, consisting of 6 pages.

Juncheng Wang et al., Online Precoding Design for Downlink MIMO Wireless Network Virtualization with Imperfect CSI; Proc. IEEE Int. Conf. Comput. Commun. (Infocom); Apr. 2020, consisting of 10 pages.

Juncheng Wang et al., Online MIMO Wireless Network Virtualization over Time-Varying Channels with Periodic Updates; IEEE 21st International Workshop on Signal Processing Advances in Wireless Communications (SPAWC); May 2020, consisting of 5 pages.

David Gesbert et al., Multi-Cell MIMO Cooperative Networks: A New Look at Interference; IEEE Journal on Selected Areas in Communications, vol. 28, No. 9; Dec. 2010, consisting of 29 pages.

Hongyuan Zhang et al., Asynchronous Interference Mitigation in Cooperative Base Station Systems; IEEE Transactions on Wireless Communications, vol. 7, No. 1; Jan. 2008, consisting of 11 pages.

Hayssam Dahrouj et al., Coordinated Beamforming for the Multi-Cell Multi-Antenna Wireless System; IEEE Transactions on Wireless Communications, vol. 9; May 2010, consisting of 6 pages.

Luca Venturino et al., Coordinated Linear Beamforming in Downlink Multi-Cell Wireless Networks; IEEE Transactions on Wireless Communications, vol. 9, No. 4; Apr. 2010, consisting of 11 pages.

Desmond W.H. Cai et al., Max-Min SINR Coordinated Multipoint Downlink Transmission—Duality and Algorithms; IEEE Transactions on Signal Processing, vol. 60, No. 10; Oct. 2012, consisting of 12 pages.

M.J. Neely et al., Stochastic Network Optimization with Application to Communication and Queueing Systems; Morgan & Claypool; 2010, consisting of 211 pages.

Stephen Boyd et al., Convex Optimization; Cambridge University Press; 2004, consisting of 730 pages.

Antti Toskala et al., UTRAN Long-Term Evolution; John Wiley & Sons, Ltd .; 2010, consisting of 29 pages.

(56) References Cited

OTHER PUBLICATIONS

Muriel Medard, The Effect upon Channel Capacity in Wireless Communications of Perfect and Imperfect Knowledge of the Channel; IEEE Transactions on Information Theory, vol. 46, No. 3; May 2000, consisting of 14 pages.
Ibrahim Abou-Faycal et al., Binary Adaptive Coded Pilot Symbol Assisted Modulation Over Rayleigh Fading Channels Without Feedback; IEEE Transactions on Communications, vol. 53, No. 6; Jun. 2005, consisting of 11 pages.
Roberto Corvaja et al., Phase Noise Degradation in Massive MIMO Downlink With Zero-Forcing and Maximum Ratio Transmission Precoding; IEEE Transactions on Vehicular Technology, vol. 65, No. 10; Oct. 2016, consisting of 8 pages.
Leonidas Georgiadis et al., Resource Allocation and Cross Layer Control in Wireless Networks; Found. Trends Networks; 2006 Now Publishers Inc., consisting of 146 pages.
Tianyi Chen, et al., Stochastic Averaging for Constrained Optimization With Application to Online Resource Allocation; IEEE Transactions on Signal Processing, vol. 65, No. 12; Jun. 2017, consisting of 16 pages.
Chinese Office Action and Search Report with English Machine Translation dated Dec. 6, 2023 for Patent Application No. 202080028258.6, consisting of 18 pages.
International Search Report and Written Opinion dated Jun. 9, 2020 issued in PCT Application No. PCT/IB2020/053454, consisting of 15 pages.
Sucha Supittayapornpong et al., Quality of Information Maximization for Wireless Networks via a Fully Separable Quadratic Policy; IEEE/ACM Transactions on Networking, vol. 23, No. 2, Apr. 2015, consisting of 13 pages.
Jonathan van de Belt, et al., Defining and Surveying Wireless Link Virtualization and Wireless Network Virtualization, The Center for Future Networks and Communications, 2017, consisting of 25 pages.
Chengchao Liang et al., Wireless Network Virtualization: A Survey, Some Research Issues and Challenges, IEEE Communications Surveys & Tutorials, 2013, consisting of 24 pages.
Fatemeh Amirnavaei, et al., Online Power Control Optimization for Wireless Transmission With Energy Harvesting and Storage, IEEE Transactions on Wireless Communications, Jul. 2016, consisting of 14 pages.
Panayotis Mertikopoulos et al., Learning to Be Green: Robust Energy Efficiency Maximation in Dynamic MIMO-OFDM Systems, IEEE Journal on Selected Areas in Communications, Apr. 2016, consisting of 25 pages.
Panayotis Mertikopoulos et al., Learning in an Uncertain World: MIMO Covariance Matrix Optimization with Imperfect Feedback, IEEE Transactions on Wireless Communications, Jun. 2017, consisting of 27 pages.
Hao Yu, et al., Dynamic Transmit Covariance Design in MIMO Fading Systems with Unknown Channel Distributions and Inaccurate Channel State Information, IEEE Transactions on Wireless Communications, Jun. 2017, consisting of 16 pages.
Harri Holma et al., UTRAN Long-Term Evolution, WCDMA for UMTS—HSPA Evolution and LTE, John Wieley & Sons, 2010, consisting of 29 pages.
Andrea Goldsmith, Wireless Communications, Stanford University Press, 2005, consisting of 427 pages.
Antonio Assalini et al., Linear MMSE MIMO Channel Estimation with Imperfect Channel Covariance Information, Proc. Intel. Conf. Communications (ICC) Jun. 2009, consisting of 6 pages.
Non Final Office Action dated Mar. 15, 2022 issued in U.S. Appl. No. 17/425,427, consisting of 19 pages.
Non Final Office Action dated Sep. 29, 2022 issued in U.S. Appl. No. 17/425,427, consisting of 11 pages.
Notice of Allowance dated May 12, 2023 issued in U.S. Appl. No. 17/425,427, consisting of 11 pages.
International Search Report and Written Opinion dated Sep. 24, 2020 issued in PCT Application No. PCT/IB2020/053022, consisting of 14 pages.
Alec Koppel et al., A Saddle Point Algorithm for Networked Online Convex Optimization, IEEE Transactions on Signal Processing, vol. 63, No. 19, Oct. 2015, consisting of 16 pages.
Alec Koppel et al., Proximity Without Consensus in Online Mutiagent Optimization, IEEE Transactions on Signal Processing, vol. 65, No. 12, Jun. 2017, consisting of 16 pages.
Michael J. Neely et al., Online Convex Optimization with Time-Varying Constraints, University of Southern California, 2017, consisting of 18 pages.
Marcelo J. Weinberger et al., On Delayed Prediction of Individual Sequences, IEEE Trans. Inf. Theory, vol. 48, No. 7, Jul. 2002, consisting of 43 pages.
Pooria Joulani et al., Delay-Tolerant Online Convex Optimization: Unified Analysis and Adaptive-Gradient Algorithms, Proceedings of the Thirtieth AAAI Conference on Artificial Intelligence (AAAI-16) 2016, consisting of 7 pages.
Jim Zyren et al., Overview of the 3GPP Long Term Evolution Physical Layer, Freescale Semiconductor Inc., 2007, consisting of 27 pages.
D.H. Brandwood, A Complex Gradient Operator and its Application in Adaptive Array Theory, IEEE Proceedings H-Microwaves, Optics, and Antennas, Feb. 1983, consisting of 6 pages.
Michael C. Grant et al., The CVX User's Guide Release 2.1, Dec. 2018, consisting of 99 pages.
International Search Report and Written Opinion dated Aug. 31, 2021 issued in PCT Application No. PCT/IB2021/054717, consisting of 13 pages.
N.M. Mosharaf Kabir Chowdhury et al., Network Virtualization: State of the Art and Research Challenges; Topics in Network and Service Management; IEEE Communications Magazine, Jul. 2009, consisting of 7 pages.
Ami Wiesel, et al., Linear Precoding via Conic Optimization for Fixed MIMO Receivers; IEEE Transactions on Signal Processing, vol. 54, No. 1; Jan. 2006, consisting of 16 pages.
Yi Jiang, et al., Performance Analysis of ZF and MMSE Equalizers for MIMO Systems: An In-Depth Study of the High SNR Regime; IEEE Transactions on Information Theory, vol. 57, No. 4; Apr. 2011, consisting of 19 pages.
Oren Somekh, et al., Cooperative Multicell Zero-Forcing Beamforming in Cellular Downlink Channels; IEEE Transactions on Information Theory, vol. 55, No. 7; Jul. 2009, consisting of 14 pages.
Juncheng Wang et al., Online Downlink MIMO Wireless Network Virtualization in Fading Environments, IEEE, 2019, consisting of 5 pages.
Xin Wang et al., Wireless Network Virtualization, Journal of Communications vol. 8, No. 5, May 2013, consisting of 8 pages.
Matias Richart et al., Resource Slicing in Virtual Wireless Networks: A Survey, IEEE Transactions on Network and Service Management, Sep. 2016, consisting of 14 pages.
V. Jumba et al., Resource Provisioning in Wireless Virtualized Networks Via Massive-MIMO, IEEE Wireless Communications Letters, Jun. 2015, consisting of 5 pages.
Kun Zhu et al., Virtualization of 5G Cellular Networks as a Hierarchical Combinatorial Auction, IEEE Transations on Mobile Computing, 2016, consisting of 16 pages.
Saeedeh Parsaeefard et al., Dynamic Resource Allocation for Virtualized Wireless Networks in Massive-MIMO-Aided and Fronthaul-Limited C-RAN, Oct. 2017, consisting of 10 pages.
Hao Yu et al., A Low Complexity Algorithm with O($\sqrt{T}$) Regret and Finite Constraint Violations for Online Convex Optimization with Long Term Constraints, Department of Electrical Engineering, University of Southern California, Oct. 2016, consisting of 15 pages.
Juncheng Wang et al., Online Precoding Design for Downlink MIMO Wireless Network Virtualization with Imperfect CSI; IEEE Int. Conf. Comput. Commun. (Infocom), Apr. 2020, consisting of 9 pages.
Hayssam Dahrouj et al., Coordinated Beamforming for the Multi-Cell Multi-Antenna Wireless System; IEEE Transactions on Wireless Communications; 2008, consisting of 6 pages.

* cited by examiner

DELAY-TOLERANT CONSTRAINED ONLINE CONVEX OPTIMIZATION

CROSS-REFERENCE TO RELATED APPLICATIONS

This application is a Submission Under 35 U.S.C. § 371 for U.S. National Stage Patent Application of International Application No.: PCT/IB2021/057106, filed Aug. 3, 2021 entitled "DELAY-TOLERANT CONSTRAINED ONLINE CONVEX OPTIMIZATION," which claims priority to U.S. Provisional Application No. 63/065757, filed Aug. 14, 2020, entitled "SYSTEM AND METHOD FOR DELAY-TOLERANT CONSTRAINED ONLINE CONVEX OPTIMIZATION," the entireties of both of which are incorporated herein by reference.

TECHNICAL FIELD

This disclosure relates to wireless communication and in particular to delay-tolerant constrained online convex optimization (OCO).

BACKGROUND

The Third Generation Partnership Project (3GPP) has developed and is developing standards for Fourth Generation (4G) (also referred to as Long Term Evolution (LTE)) and Fifth Generation (5G) (also referred to as New Radio (NR)) wireless communication systems. Such systems provide, among other features, broadband communication between network nodes, such as base stations, and mobile wireless devices (WD), as well as communication between network nodes and between WDs. Sixth Generation (6G) wireless communication systems are also under development.

Wireless communication systems according to the 3GPP may include the following channels:
  A physical downlink control channel, PDCCH;
  A physical uplink control channel, PUCCH;
  A physical downlink shared channel, PDSCH;
  A physical uplink shared channel, PUSCH;
  A physical broadcast channel, PBCH; and
  A physical random access channel, PRACH.

Online Convex Optimization (OCO) is a solution to many signal processing and resource allocation problems in the presence of uncertainty. At the beginning of each time slot, an agent makes a decision from a known convex set. At the end of each time slot, the system reveals the convex loss function to the agent, and then the agent's loss is realized. The convex loss function can change arbitrarily at each time slot with unknown statistics. It is impossible for an OCO algorithm to make an optimal decision at each time slot due to the lack of in-time information of the convex loss function. Thus, the goal of an OCO algorithm is to make a sequence of decisions to minimize the regret, i.e., the performance gap between the online solution and some performance benchmarks. Most of the early works on OCO studied the static regret, which compared the online solution with the offline optimal solution (which requires that the convex loss functions in all time slots are known ahead of time). A desired OCO algorithm should provide sub-linear regret, i.e., the performance gap between the online and offline benchmark solutions, in terms of the accumulated loss, tends to zero as time approaches infinity. With the bounded gradient or sub-gradient assumption, an online projected gradient descent algorithm achieved an $$o(T^{\frac{1}{2}})$$

static regret in the seminal work of unconstrained OCO, where T is the total time horizon.

However, when the optimum of the underlying system is time-varying, the offline optimal solution itself may perform poorly. Therefore, achieving a sublinear static regret is not promising any more. An additional comprehensive dynamic regret is also presented in which the benchmark was the online optimal solution with knowledge of the convex loss function in the current time slot. The online optimal solution has been recognized as a more attractive but harder-to-track performance benchmark. Sublinear dynamic regret can be achieved if the accumulated variation of the per-slot optimal solutions (or path length) increases sub-linearly with respect to the total time horizon.

Some known methods have focused on OCO with short-term constraints that must be strictly satisfied. Subsequently, OCO with long-term time-invariant constraints, in which short-term constraints were relaxed to long-term constraints that allow instantaneous violation of the constraints. A desired OCO algorithm with long-term constraints should provide sub-linear constraint violations, i.e., the time-averaged violations of the long-term constraints tend to zero as time approaches infinity. Some known methods show a trade-off between the regret and constraint violation.

While some known methods assume that all the information feedbacks are delayed for one time slot in the standard OCO setting. Some known studies of unconstrained OCO with multiple-time-slot delay have been performed. Delay-adaptive online gradient descent algorithms focus on unconstrained OCO. The impact of delay on constrained OCO has been considered. Known methods of OCO with multiple-time-slot delay have studied the static regret, which may not be a meaningful performance metric for the inherently time-varying system. The impact of feedback delay on the performance of constrained OCO algorithm is still an open problem, especially for the dynamic regret analysis. Furthermore, the constraint violation was always no less than $$o(T^{\frac{3}{4}}),$$

no matter how small the accumulated variation of the online problem is.

Background on WNV

The capital and operational expenses of wide-area wireless networks discourage service providers (SPs) from deploying modern technologies and also hinder new companies from entering the industry. In response, network virtualization has been proposed to reduce the expenses of network deployment and operation by abstracting and sharing the physical resources, and to make it easier to migrate to newer products and technologies by decoupling distinct parts of the network. Network virtualization is particularly important when the physical infrastructure is expensive, e.g., in a shopping mall with a high density of service requests with limited space to install many wireless base stations.

To fulfil the potential of network virtualization to improve resource utilization and network efficiency, dynamic resource allocation strategies to ensure service isolation among SPs is desired, i.e., service to the users of one SP should be minimally affected by service to users of the other SPs. However, service isolation is particularly challenging in wireless networks, due to radio interference in the open transmission environment. Existing works on multiple input multiple output (MIMO) wireless network virtualization (WNV) can be categorized into two streams: strict service isolation and spatial service isolation.

The idea of strict service isolation is to apply strict resource separation to achieve isolation, by dividing the wireless spectrum, resource blocks (RBs), or antenna hardware among different SPs. Such an approach is based on known works in computer virtualization and wired network virtualization, and it has been shown to be highly effective. However, strict service separation limits the design space of virtualization in the wireless environment, as it does not take advantage of the improved power and spectral efficiency that can be achieved by more flexible sharing of the wireless medium. In contrast, a salient feature of the spatial service isolation method is that it leverages the interference suppression capability of MIMO communications to achieve effective service isolation in the coding space, through specially designed infrastructure provider (InP) precoding. It has been shown that, through proper precoding instead of slicing resources physically, the InP can enforce the requirements of isolation by leveraging MIMO precoding, while improving the overall efficacy of the network.

In a non-virtualized network, joint signal processing across multiple cells can significantly improve the system performance of a conventional single-cell network. There are two signal processing streams: cooperative precoding and coordinated precoding. The basic idea of cooperative precoding (also called network MIMO) is to treat antennas from multiple cells as a large single antenna array, which requires stringent signal-level coordination and global CSI sharing across the cells. In contrast, coordinated precoding does not need to share data streams and CSI among the cells.

Although coordinated precoding has been well studied in non-virtualized wireless networks, new challenges arise when it comes to coordinated multi-cell MIMO WNV. Since each SP in a cell does not have access to the channel state information (CSI) of other SPs' users in this cell and all users in other cells, handling the interference between the users of different SPs and cells is challenging.

Early works on constrained OCO have focused on long-term time-invariant constraints that are known in advance. A prior art saddle-point-typed algorithm for constrained OCO to achieve lower computational complexity provides $$O(T^{\frac{1}{2}})$$

regret and $$O(T^{\frac{3}{4}})$$

constraint violation. Additional prior art indicates a trade-off between the regret and constraint violation bounds. The saddle-point-typed and virtual-queue-based algorithms have been modified to deal with long-term time-varying constraints. However, the above works are under the standard OCO setting, so that the feedbacks are always delayed for only one time slot.

Most known work on OCO with multiple-time-slot feedback delays focused on unconstrained online problems. The standard online gradient descent algorithm has been extended to deal with delays. Known methods also include delay-adaptive online gradient descent algorithms to accommodate feedback delays. The impact of delay on constrained OCO has previously been studied, including the static regret, which may not be an attractive performance metric for an inherently time-varying system. Furthermore, the constraint violation is always no less than $$O(T^{\frac{3}{4}}),$$

inherited from the saddle-point-typed algorithm. The impact of delay on the dynamic regret analysis for constrained OCO is still an open problem. It requires new techniques for the online algorithm design and performance bound analysis that is not addressed by the existing literature.

The long-term constrained OCO is closely related to the Lyapunov optimization. However, under the Lyapunov framework, the system states are assumed to be independent and identically distributed (i.i.d.) or Markovian under the Lyapunov optimization framework. Furthermore, the standard Lyapunov optimization relies on the current and accurate system state for decision updates. In the presence of feedback delay to the system states, one can apply Lyapunov optimization by leveraging the history information to predict the current system state with some error. However, this way of dealing with feedback delay is equivalent to extending the standard Lyapunov optimization to tackle inaccurate system states, which naturally leads to an $\mathcal{O}(\delta T)$ gap to the optimality with $\delta$ being the measure of system inaccuracy.

There currently exist certain challenge(s).
Problems with Prior Art on WNV

Inherited from wired network virtualization, most existing MIMO WNV works enforced strict physical isolation. The system throughput and energy efficiency maximization problems have been studied for WNV in orthogonal frequency division multiplexing (OFDM) massive MIMO system. Exclusive sub-channels were allocated to each SP through a two-level hierarchical auction architecture. The cloud radio access networks (C-RAN) and non-orthogonal multiple access (NOMA) techniques have been combined with uplink MIMO WNV. Antennas were allocated through pricing among the SPs for virtualized massive MIMO systems.

The physical isolation approach does not fully utilize the benefit of spatial spectrum sharing enabled by MIMO beamforming. In contrast, all antennas and channel resources were shared among the SPs through spatial isolation. Known literature discloses stochastic robust precoding for WNV in massive MIMO systems, online MIMO WNV schemes under accurate and inaccurate CSI, periodic precoding update scheme proposed for online MIMO WNV. It has been demonstrated that, for single-cell MIMO WNV, the spatial service isolation approach substantially outperforms the strict service isolation approach.

Known methods for spatial virtualization focused on single-cell MIMO systems. Additionally, none of the above solutions were designed to handle time-varying constraints.

SUMMARY

Certain aspects of the present disclosure and their embodiments may provide solutions to these or other challenges.

Some embodiments provide a delay-tolerant constrained online convex optimization (OCO) algorithm (Algorithm 1) which naturally leads to fully distributed implementation (Algorithm 2) provided that the constraint function is separable, as well as means to apply it to network virtualization and resource allocation.

In the most general aspect, an agent makes a decision from a known convex decision space at the beginning of each time slot. The feedback information of the convex loss and constraint functions is revealed to the agent only after the decision is made and may be delayed for multiple time slots. The sequence of online decisions is subject to both long-term and short-term constraints. Both the convex loss function and the long-term constraint function can change arbitrarily at each time slot with unknown statistics. In some embodiments, based only on the past feedback information, the agent makes a sequence of online decisions to provide sublinear regret and constraint violation.

The disclosed OCO algorithm is utilized to further design an online coordinated precoding scheme at the infrastructure provider (InP) for downlink multi-cell MIMO WNV, in which the wireless network is comprised of multiple service providers (SPs), with channel state information (CSI) that can be delayed for multiple time slots. Each SP is allowed to utilize all antenna and wireless spectrum resources provided by the InP and designs the virtual precoding matrix in a cell, without the need to be aware of the other SPs' users in the cell and all users in other cells. The InP coordinates the cells at the precoding level to mitigate both the intra-cell inter-SP interference and inter-cell interference, and to meet the virtualization demands from SPs. The goal at the InP is to minimize the accumulated signal leakage, subject to both long-term constraint on the precoding deviation from virtualization demand and short-term transmit power constraint.

Some aspects further demonstrates the universality of the disclosed OCO algorithm by solving a general online network resource allocation problem for wired or wireless networks, in which scheduling nodes dispatch data to processing nodes. The data transmission and processing prices can vary arbitrarily over time and the information about the transmission and processing costs can be delayed for multiple time slots. The online algorithm aims to minimize the cumulative network costs subject to both the long-term constraint on the data queue backlog and short-term data rate constraint.

In some additional aspects, a delay-tolerant OCO algorithm (Algorithm 1) that accommodates time-varying constraints and naturally leads to fully distributed implementation (Algorithm 2) if the constraint function is separable. At the beginning of each time slot, the OCO algorithm disclosed herein makes a decision from a known convex set. The convex loss and constraint functions can change arbitrarily at each time slot with unknown statistics. The feedbacks of the loss and constraint functions are allowed to be delayed for multiple time slots. In some embodiments, a sequence of decisions is made based only on the delayed information, subject to both long-term and short-term constraints. A performance analysis particularly considers the impact of delay on the dynamic regret and constraint violation, to show sublinear performance bounds.

Leveraging the disclosed OCO algorithm (Algorithm 2) provides an online precoding scheme for coordinated multi-cell MIMO WNV with delayed CSI. In the disclosed virtualization framework, each SP is allowed to utilize all antenna and spectrum resources and designs its virtual precoding matrix in each cell, without the need to be aware of the other SPs' users in the cell and all users in other cells. At the beginning of each time slot, the InP coordinates the cells at the beamforming level to mitigate both the intra-cell inter-SP interference and inter-cell interference, and meet the virtualization demands from SPs. In some embodiments, based only on the past local CSI, the goal at the InP is to minimize the accumulated leakage, subject to both a long-term constraint on the precoding deviation from the virtualization demand and short-term constraints on the transmit power. A key advantage of the disclosed online precoding scheme is that, it naturally leads to fully-distributed implementation at each cell, without any CSI exchange or central transmit power update.

To further demonstrate the universality of the disclosed OCO algorithm (Algorithm 1), a general online network resource allocation problem is solved for wired or wireless networks. Based on the delayed data tasks, the scheduling nodes dispatch the data requests to the processing nodes. The data communication and processing prices can vary arbitrarily over time. The goal is to minimize the accumulated network costs and clear the data backlogs in the long run, with limits on the data communication and processing rates. In such a case, the online network resource allocation problem has a closed-form solution, based only on the delayed data task and cost information.

Some additional information on the performance evaluation that has been performed includes the following. Extensive simulation studies have been conducted to validate the performance of the disclosed precoding scheme for coordinated multi-cell MIMO WNV under typical Long-Term-Evolution (LTE) network settings. Simulation studies show a fast convergence of the time-averaged performance. Our disclosed algorithm is able to track channel variations and is applicable to massive MIMO and high-density networks. System performance yielded by the online precoding solution is close to the one achieved by the online optimal precoding solution, and substantially outperforms the state-of-the-art alternative. Simulation studies have also been carried out to validate the disclosed online resource allocation algorithm for wired or wireless networks. Comparison with the online optimal solution and the existing alternative solutions demonstrate the system performance advantages of the disclosed algorithm.

Thus, according to one aspect, a method in a network node is provided for wireless network virtualization to allocate resources of an infrastructure provider, InP, among a plurality of service providers, SPs, each SP serving at least one cell, each SP further serving a respective set of wireless devices, WDs. The method includes, in each of a plurality of successive time slots in a time interval, T: receiving precoding feedback information from each SP of the plurality of SPs, the precoding feedback information from an SP including a precoding demand from the SP, the feedback information being based at least in part on RF channels between one or more base stations of the SP and corresponding WDs; allocating a virtual transmit power to each cell served by an SP, each allocation of a virtual transmit power allocated to a cell of an SP being based at least in part on the received precoding feedback information from the plurality of SPs and at least one constraint on interference; and determining a precoding matrix for each SP of the plurality of SPs to meet each of the plurality of received precoding demands subject to the at least one constraint. The determining includes minimizing a loss function based at least in part on the received precoding feedback information received in multiple previous time slots.

According to this aspect, in some embodiments, minimizing a loss function includes finding a set of precoding matrices, one for each SP of the plurality of SPs, that minimizes a function of a gradient of the precoding feedback information. In some embodiments, the loss function includes a virtual queue sequence used as a backlog queue of long-term constraint violations where an upper bound on the virtual queue is transformed into an upper bound on the long-term constraint violation. In some embodiments, the loss function includes:

$$2\text{Re}\{tr\{[\nabla_{V_{t-\tau}^*} f_{t-\tau}(V_{t-\tau})]^H (V - V_{t-\tau})\}\} +$$
$$\alpha\|V - V_{t-\tau}\|_F^2 + [Q_{t-1} + g_{t-\tau-1}(V_{t-1})]^T g_{t-\tau}(V) + \eta\|V - V_{t-1}\|_F^2$$

where $$\nabla_{V_{t-\tau}^*} f_{t-\tau}(V_{t-\tau})$$

is the feedback from a plurality of SPs at time $t-\tau$, $V_{t-\tau}$ is the precoding matrix for a plurality of SPs, $Q_{t-1}$ is the virtual queue sequence value at time $t-1$, $g_{t-\tau-1}(V_{t-1})$ is a constraint at time $t-\tau-1$, and $\alpha$ and $\eta$ are constants. In some embodiments, the interference constraint is a constraint on signal leakage, the signal leakage being determined based at least in part on a channel matrix for the SP and the actual precoding matrix determined by the SP. In some embodiments, minimizing the loss function further includes minimizing a per cell loss function for each of a plurality of cells of the plurality of SPs. In some embodiments, the per cell loss function includes:

$$2\text{Re}\{tr\{[\nabla_{V_{t-\tau}^{c*}} f_{t-\tau}^c(\tilde{V}_{t-\tau}^c)]^H (\tilde{V}^c - \tilde{V}_{t-\tau}^c)\}\} +$$
$$\alpha\|\tilde{V}^c - \tilde{V}_{t-\tau}^c\|_F^2 + [Q_{t-1}^c + g_{t-\tau-1}^c(\tilde{V}_{t-1}^c)]g_{t-\tau}^c(\tilde{V}^c) + \eta\|\tilde{V}^c - \tilde{V}_{t-1}^c\|_F^2$$

subject to $$\|\tilde{V}^c\|_F^2 \leq P_c^{max},$$

where $$\nabla_{V_{t-\tau}^{c*}} f_{t-\tau}^c(\tilde{V}_{t-\tau}^c)$$

is the feedback corresponding to a cell of a plurality of SPs at time $t-\tau$, $$\tilde{V}_{t-\tau}^c$$

is the precoding matrix for the cell, $$Q_{t-1}^c$$

is the virtual queue sequence value for the cell at time $t-1$, $$g_{t-\tau-1}^c$$

is a constraint at time $t-\tau-1$, and $\alpha$ and $\eta$ are constants. In some embodiments, the method also includes updating the virtual queue for any $c \in \mathcal{C}$ as $$Q_t^c = \max\{-\gamma g_{t-\tau}^c(x_t), Q_{t-1}^c + \gamma g_{t-\tau}^c(x_t)\}$$

where $\gamma$ is a constant. In some embodiments, the interference constraint is a constraint on signal leakage between cells, the signal leakage between cells being determined based at least in part on a channel matrix for the cell and the actual precoding matrix for the cell.

According to another aspect, a network node is configured to perform wireless network virtualization to allocate resources of an infrastructure provider, InP, among a plurality of service providers, SPs, each SP serving at least one cell, each SP further serving a respective set of wireless devices, WDs. The network node includes processing circuitry configured to: in each of a plurality of successive time slots in a time interval, T: receive precoding feedback information from each SP of the plurality of SPs, the precoding feedback information from an SP including a precoding demand from the SP, the feedback information being based at least in part on RF channels between one or more base stations of the SP and corresponding WDs; allocate a virtual transmit power to each cell served by an SP, each allocation of a virtual transmit power allocated to a cell of an SP being based at least in part on the received precoding feedback information from the plurality of SPs and at least one constraint on interference; and determine a precoding matrix for each SP of the plurality of SPs to meet each of the plurality of received precoding demands subject to the at least one constraint. The determining includes minimizing a loss function based at least in part on the received precoding feedback information received in multiple previous time slots.

According to this aspect, in some embodiments, minimizing a loss function includes finding a set of precoding matrices, one for each SP of the plurality of SPs, that minimizes a function of a gradient of the precoding feedback information. In some embodiments, the loss function includes a virtual queue sequence used as a backlog queue of long-term constraint violations where an upper bound on the virtual queue is transformed into an upper bound on the long-term constraint violation. In some embodiments, the loss function includes:

$$2\text{Re}\{tr\{[\nabla_{V_{t-\tau}^*} f_{t-\tau}(V_{t-\tau})]^H (V - V_{t-\tau})\}\} +$$
$$\alpha\|V - V_{t-\tau}\|_F^2 + [Q_{t-1} + g_{t-\tau-1}(V_{t-1})]^T g_{t-\tau}(V) + \eta\|V - V_{t-1}\|_F^2$$

where $f_{t-\tau}(V_{t-\tau})$ is the feedback from a plurality of SPs at time $t-\tau$, $V_{t-\tau}$ is the precoding matrix for a plurality of SPs, $Q_{t-1}$ is the virtual queue sequence value at time $t-1$, $g_{t-\tau-1}(V_{t-1})$ is a constraint at time $t-\tau-1$, and $\alpha$ and $\eta$ are constants. In some embodiments, the interference constraint is a constraint on signal leakage, the signal leakage being determined based at least in part on a channel matrix for the SP and the actual precoding matrix determined by the SP. In some embodiments, minimizing the loss function further includes minimizing a per cell loss function for each of a plurality of cells of the plurality of SPs. In some embodiments, the per cell loss function includes:

$$2\text{Re}\{tr\{[\nabla_{\tilde{V}_{t-\tau}^{c*}} f_{t-\tau}^c(\tilde{V}_{t-\tau}^c)]^H (\tilde{V}^c - \tilde{V}_{t-\tau}^c)\}\} +$$

$$\alpha \|\tilde{V}^c - \tilde{V}_{t-\tau}^c\|_F^2 + [Q_{t-1}^c + g_{t-\tau-1}^c(\tilde{V}_{t-1}^c)]g_{t-\tau}^c(\tilde{V}^c) + \eta \|\tilde{V}^c - \tilde{V}_{t-1}^c\|_F^2$$

subject to $$\|\tilde{V}^c\|_F^2 \leq P_c^{max},$$

where $$\nabla_{\tilde{V}_{t-\tau}^{c*}} f_{t-\tau}^c(\tilde{V}_{t-\tau}^c)$$

is the feedback from corresponding to a cell of a plurality of SPs at time $$t - \tau, \tilde{V}_{t-\tau}^c$$

is the precoding matrix for the cell, $$Q_{t-1}^c$$

is the virtual queue sequence value for the cell at time t−1, $$g_{t-\tau-1}^c$$

is a constraint at time t−τ−1, and α and η are constants. In some embodiments, the processing circuitry is further configured to update the virtual queue for any c ∈ 𝒞 as:

$$Q_t^c = \max\{-\gamma g_{t-\tau}^c(x_t), Q_{t-1}^c + \gamma g_{t-\tau}^c(x_t)\}$$

where γ is a constant. In some embodiments, the interference constraint is a constraint on signal leakage, the signal leakage being determined based at least in part on a channel matrix and the actual precoding matrix.

According to yet another aspect, a method in a network node provides wireless infrastructure to a service provider, SP, of a plurality of SPs, the SP of the plurality of SPs being in communication with a plurality of WDs in each of at least one cell served by the SP. The method includes, in each of a plurality of time slots over a time interval, T, and for each cell of the at least one cell: receiving from an infrastructure provider, InP, a cell channel state, the cell channel state being based at least in part on a plurality of virtual precoding matrices received from the plurality of SPs; determining a virtual precoding matrix based at least in part on the cell channel state; transmitting the determined virtual precoding matrix; receiving a virtual transmit power allocated to the cell by the InP, the received allocated virtual transmit power being based at least in part on the plurality of virtual precoding matrices received by the InP; determining an actual precoding matrix for the cell based at least in part on the determined virtual precoding matrix; and communicating with each of a plurality of WDs in the cell using the determined actual precoding matrix at a power level based at least in part on the received allocated virtual transmit power.

According to another aspect, a network node is configured to provide wireless infrastructure to a service provider, SP, of a plurality of SPs, the SP of the plurality of SPs being in communication with a plurality of WDs in each of at least one cell served by the SP, the method comprising, in each of a plurality of time slots over a time interval, T, and for each cell of the at least one cell. The network node includes processing circuitry configured to: in each of a plurality of time slots over a time interval, T, and for each of the at least one cell: receive from an infrastructure provider, InP, a cell channel state, the cell channel state being based at least in part on a plurality of virtual precoding matrices received by the InP from the plurality of SPs; determine a virtual precoding matrix based at least in part on the cell channel state; transmit the determined virtual precoding matrix; receive a virtual transmit power allocated to the cell by the InP, the received allocated virtual transmit power being based at least in part on the plurality of virtual precoding matrices received by the InP; determine an actual precoding matrix for the cell based at least in part on the determined virtual precoding matrix; and communicate with each of a plurality of WDs in the cell using the determined actual precoding matrix at a power level based at least in part on the received allocated virtual transmit power.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
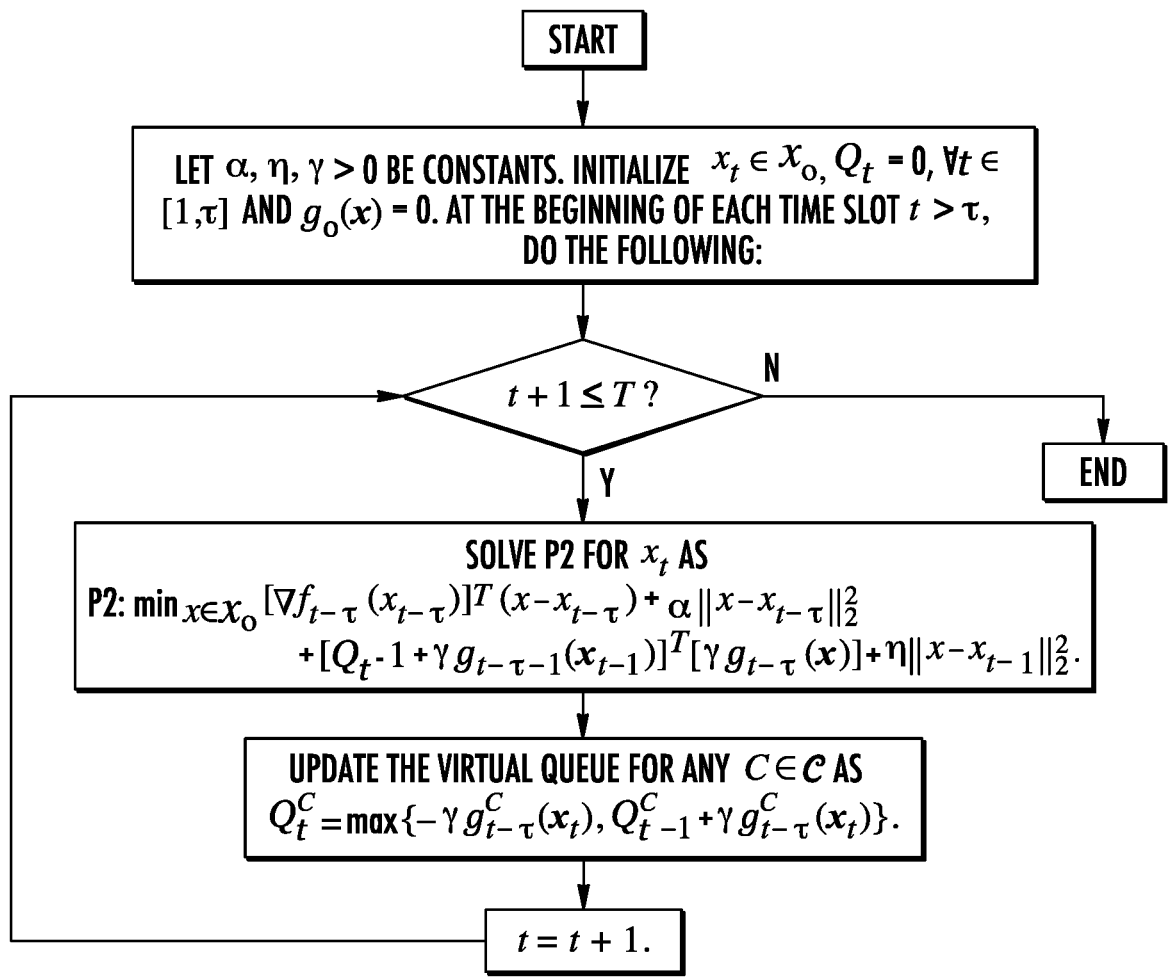
FIG. 1 is a flowchart of a first algorithm disclosed herein.

Before describing in detail example embodiments, it is noted that the embodiments reside primarily in combinations of apparatus components and processing steps related to delay-tolerant constrained online convex optimization (OCO). Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements. Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

The term signal used herein can be any physical signal or physical channel. Examples of physical signals are reference signal such as primary synchronization signal (PSS), secondary synchronization signal (SSS), cell-specific reference signal (CRS), positioning reference signal (PRS), etc. The term physical channel (e.g., in the context of channel reception) used herein is also called as 'channel. Examples of physical channels are master information block (MIB), PBCH, narrowband physical broadcast channel (NPBCH), PDCCH, PDSCH, sPUCCH, SPDSCH. sPUCCH. sPUSCH, MPDCCH, NPDCCH, NPDSCH, E-PDCCH, PUSCH, PUCCH, NPUSCH etc. These terms/abbreviations may be used according to 3GPP standard language, in particular according to LTE.

It may be considered for cellular communication there is provided at least one uplink (UL) connection and/or channel and/or carrier and at least one downlink (DL) connection and/or channel and/or carrier, e.g., via and/or defining a cell, which may be provided by a network node, in particular a base station or eNodeB. An uplink direction may refer to a data transfer direction from a terminal to a network node, e.g., base station and/or relay station. A downlink direction may refer to a data transfer direction from a network node, e.g., base station and/or relay node, to a terminal. UL and DL may be associated to different frequency resources, e.g., carriers and/or spectral bands. A cell may comprise at least one uplink carrier and at least one downlink carrier, which may have different frequency bands. A network node, e.g., a base station or eNodeB, may be adapted to provide and/or define and/or control one or more cells, e.g., a PCell and/or a LA cell.

Transmitting in the downlink may pertain to transmission from the network or network node to the terminal. Transmitting in the uplink may pertain to transmission from the terminal to the network or network node. Transmitting in sidelink may pertain to (direct) transmission from one terminal to another. Uplink, downlink and sidelink (e.g., sidelink transmission and reception) may be considered communication directions. In some variants, uplink and downlink may also be used to described wireless communication between network nodes, e.g. for wireless backhaul and/or relay communication and/or (wireless) network communication for example between base stations or similar network nodes, in particular communication terminating at such. It may be considered that backhaul and/or relay communication and/or network communication is implemented as a form of sidelink or uplink communication or similar thereto.

Generally, configuring may include determining configuration data representing the configuration and providing, e.g. transmitting, it to one or more other nodes (parallel and/or sequentially), which may transmit it further to the radio node (or another node, which may be repeated until it reaches the wireless device). Alternatively, or additionally, configuring a radio node, e.g., by a network node or other device, may include receiving configuration data and/or data pertaining to configuration data, e.g., from another node like a network node, which may be a higher-level node of the network, and/or transmitting received configuration data to the radio node. Accordingly, determining a configuration and transmitting the configuration data to the radio node may be performed by different network nodes or entities, which may be able to communicate via a suitable interface, e.g., an X2 interface in the case of LTE or a corresponding interface for NR. Configuring a terminal (e.g. WD) may comprise scheduling downlink and/or uplink transmissions for the terminal, e.g. downlink data and/or downlink control signalling and/or DCI and/or uplink control or data or communication signalling, in particular acknowledgement signalling, and/or configuring resources and/or a resource pool therefor. In particular, configuring a terminal (e.g. WD) may comprise configuring the WD to perform certain measurements on certain subframes or radio resources and reporting such measurements according to embodiments of the present disclosure.

Signalling may comprise one or more signals and/or symbols. Reference signalling may comprise one or more reference signals and/or symbols. Data signalling may pertain to signals and/or symbols containing data, in particular user data and/or payload data and/or data from a communication layer above the radio and/or physical layer/s. It may be considered that demodulation reference signalling comprises one or more demodulation signals and/or symbols. Demodulation reference signalling may in particular comprise DM-RS according to 3GPP and/or LTE technologies. Demodulation reference signalling may generally be considered to represent signalling providing reference for a receiving device like a terminal to decode and/or demodulate associated data signalling or data. Demodulation reference signalling may be associated to data or data signalling, in particular to specific data or data signalling. It may be considered that data signalling and demodulation reference signalling are interlaced and/or multiplexed, e.g. arranged in the same time interval covering e.g. a subframe or slot or symbol, and/or in the same time-frequency resource structure like a resource block. A resource element may represent a smallest time-frequency resource, e.g. representing the time and frequency range covered by one symbol or a number of bits represented in a common modulation. A resource element may e.g. cover a symbol time length and a subcarrier, in particular in 3GPP and/or LTE standards. A data transmission may represent and/or pertain to transmission of specific data, e.g. a specific block of data and/or transport block. Generally, demodulation reference signalling may comprise and/or represent a sequence of signals and/or symbols, which may identify and/or define the demodulation reference signalling.

Data or information may refer to any kind of data, in particular any one of and/or any combination of control data or user data or payload data. Control information (which may also be referred to as control data) may refer to data controlling and/or scheduling and/or pertaining to the process of data transmission and/or the network or terminal operation.

Certain embodiments may provide one or more of the following technical advantage(s) over known arrangements.

In some embodiments, a delay-tolerant constrained OCO algorithm (Algorithm 1), which naturally leads to a fully distributed implementation (Algorithm 2) if the constraint function is separable, is provided. In these embodiments, the online algorithm may make a decision at the beginning of each time slot, based on the feedback information that can be delayed for multiple time slots. The convex loss and constraint functions can change arbitrarily at each time slot with unknown statistics. The online solution sequence aims to minimize the accumulated cost, subject to both long-term and short-term constraints. The online algorithm design considers the impact of multiple-time-slot delay, and it provides dynamic regret and constraint violation bounds. When the underlying system varies sub-linearly, both the dynamic regret and constraint violation are proven to be sublinear.

Leveraging the disclosed OCO algorithm (Algorithm 2), an online precoding scheme is provided for coordinated multi-cell MIMO WNV with delayed CSI. In this WNV framework, each SP is allowed to utilize all antenna and wireless spectrum resources and designs its precoding matrix in a cell, without considering the other SPs' users in the cell and all users in other cells. The InP coordinates the cells at the precoding level to minimize the accumulated signal leakage, subject to both long-term constraint on the precoding deviation from virtualization demand and short-term transmit power constraint at each cell. In some embodiments, the algorithm provides theoretically guaranteed performance inherited from the general OCO algorithm. An advantage of some embodiments of the online precoding scheme is that it naturally leads to a fully-distributed semi-closed-form implementation at each cell, without any CSI exchange across the coordinated cells or central transmit power update. Numerically, the disclosed precoding solution substantially outperforms state-of-the-art alternatives and is tolerant to the CSI delay. Furthermore, the online precoding scheme described herein for multi-cell MIMO WNV is readily applied to massive MIMO and high-density networks.

Further, a general online network resource allocation problem is solved for wired or wireless networks to show the universality of the disclosed OCO algorithm (Algorithm 1). The online resource allocation strategy minimizes the accumulated network cost, subject to both long-term constraint on the data queue backlog and short-term constraint on the data rate. The data arrival tasks, and data communication and processing prices can vary arbitrarily over time. Furthermore, the feedback information on the data tasks and prices can be delayed for multiple time slots. Simulation results show that the disclosed online resource allocation strategy substantially outperforms the state-of-the-art alternative. Furthermore, it converges fast and is tolerant to the feedback delay.

In some embodiments, the constrained OCO problem is formulated with multiple-time-slot feedback delays. Then, for performance metrics, the static and dynamic regrets are defined, and the constraint violation is formulated. Finally, a delay-tolerant constrained OCO algorithm is presented.

The time-varying constrained OCO problem can be seen as an iterative decision making process between an agent and the system. At the beginning of each time slot t, an agent makes a decision $x_t \in \mathcal{X}_0$, where $\mathcal{X}_0 \in \mathbb{R}^n$ is a known compact convex set. At the end of each time slot t, the system reveals the convex loss function $f_t(x): \mathbb{R}^n \mapsto \mathbb{R}$ and the vector-valued constraint function $g_t(x): \mathbb{R}^n \mapsto \mathbb{R}^C$ to the agent, where $$g_t(x) = [g_t^1(x), \ldots, g_t^C(x)]^T$$

with C being the number of constraints. (Let $\mathcal{C} = \{1, \ldots, C\}$.) The agent then suffers a loss $f_t(x_t)$ and a constraint violation $g_t(x_t)$. A goal of a constrained OCO algorithm is to select a sequence of decisions $\{x_t\}$ to minimize the accumulated loss and ensure that the constraints are satisfied in the long run. The formulated online optimization problem is given by $$P1: \min_{\{x_t\} \in \mathcal{X}_0} \sum_{t=1}^{T} f_t(x_t) \qquad (1)$$

$$\text{s.t.} \sum_{t=1}^{T} g_t(x_t) \leq 0$$

where T is the total time horizon. Specifically, if the constraint functions are time-invariant, i.e., $g_t(x) = g(x)$, $\forall t$, the long-term constraint in (1) becomes $$\sum_{t=1}^{T} g(x_t) \leq 0$$

and P1 becomes the standard time-invariant constrained OCO problem.

The above standard setting of OCO assumes that the feedback information of $f_t(x)$ and $g_t(x)$ is received by the agent at the end of time slot t and can be leveraged to make the new decision $x_{t+1}$. In other words, the feedback information is delayed for one time slot. The standard OCO formulation is useful in many applications. However, in practical systems, the feedback information is very likely to be delayed for multiple time slots. For example, in federated learning, feedback delay can be caused by computing the machine learning tasks in mobile devices and communicating through the wireless channels. In wireless networks, transmission precoding design relies on CSI, which is usually delayed after a series of channel estimation, quantization, and feedback processes. Therefore, in these embodiments, the feedback information of $f_t(x)$ and $g_t(x)$ is delayed for $t \geq 1$ time slots, and is received by the agent at the end of $t+\tau-1$ time slot [14]. When $\tau=1$, existing works on time-varying constrained OCO under the standard setting can be applied.

Performance Metrics

Due to the lack of in-time information on the loss and constraint functions, it impracticable to obtain the optimal solution to P1 in the online setting. Instead, one goal of a constrained OCO algorithm is to provide an online solution $\{x_t\}$ that is asymptotically no worse than some performance benchmarks. The offline optimal solution:

$$x^\circ \triangleq \operatorname{argmin}_{x \in X_0} \left\{ \sum_{t=1}^T f_t(x_t) | g_t(x_t) \leq 0, \forall t \right\} \quad (2)$$

is commonly adopted by constrained OCO algorithms as the performance target. The static regret measures the performance gap between the online solution $\{x_t\}$ and offline optimal solution $x^\circ$, given by:

$$RE_s(T) \triangleq \sum_{t=1}^T [f_t(x_t) - f_t(x^\circ)] \quad (3)$$

An OCO algorithm is desired to provide a sublinear regret, i.e., $RE_s(T)=o(T)$. Consequently, no regret is achieved, since $$\lim_{T \to \infty} \frac{RE_s(T)}{T} \leq 0$$

implies that the online solution $\{x_t\}$ is asymptotically no worse than the offline optimal solution $x^\circ$. The static regret is widely adopted in early works on OCO. However, as a rather coarse performance benchmark, the static regret may not be attractive especially when the underlying system is inherently time-varying.

A more attractive performance benchmark for constrained OCO is the online optimal solution given by:

$$x_t^\circ \triangleq \operatorname{argmin}_{x \in X_0} \{f_t(x_t) | g_t(x_t) \leq 0\}. \quad (4)$$

The corresponding dynamic regret for constrained OCO is recently defined in as:

$$RE_d(T) \triangleq \sum_{t=1}^T [f_t(x_t) - f_t(x_t^\circ)]. \quad (5)$$

From the definition of $x^\circ$ and $x_t^\circ$, since $f_t(x)$ is independent of $\{x_s | \forall s \leq t\}$, it is clear that $RE_s(T) \leq RE_d(T)$ is always satisfied. A sublinear dynamic regret naturally leads to a sublinear static regret, but not vice versa. In some cases, the gap between $RE_d(T)$ and $RE_s(T)$ can even be as large as $\mathcal{O}(T)$.

Another goal of a constrained OCO algorithm is to provide sublinear constraint violation defined as:

$$VO^c(T) \triangleq \sum_{t=1}^T g_t^c(x_t), \forall c \in C. \quad (6)$$

Here, assume that a temporary constraint violation can be compensated by later decisions that satisfy the constraint strictly. For example, in online transmit power control, the average power budget is allowed to be violated at some time slots but needs to be met in the long run. Ideally, when $$VO^c(T) = o(T), \text{ i.e., } \lim_{T \to \infty} \frac{VO^c(T)}{T} \leq 0,$$

the long-term constraint is satisfied. Note that the long-term constraints introduce correlation on the online decisions over time and lead to a more complicated online problem, especially when the feedback information is delayed for multiple time slots while the underlying system keeps evolving over time.

A constrained OCO algorithm may be desired to provide both sublinear dynamic regret and sublinear constraint violation. Unfortunately, with multiple-time-slot delayed information feedback, only sublinear static regret is achieved. Therefore, some embodiments provide a delay-tolerant constrained OCO algorithm to ensure sublinear dynamic regret and sublinear constraint violation under some mild assumptions that are standard in OCO problems.

Delay-Tolerant Constrained OCO Algorithm

Figure 2:
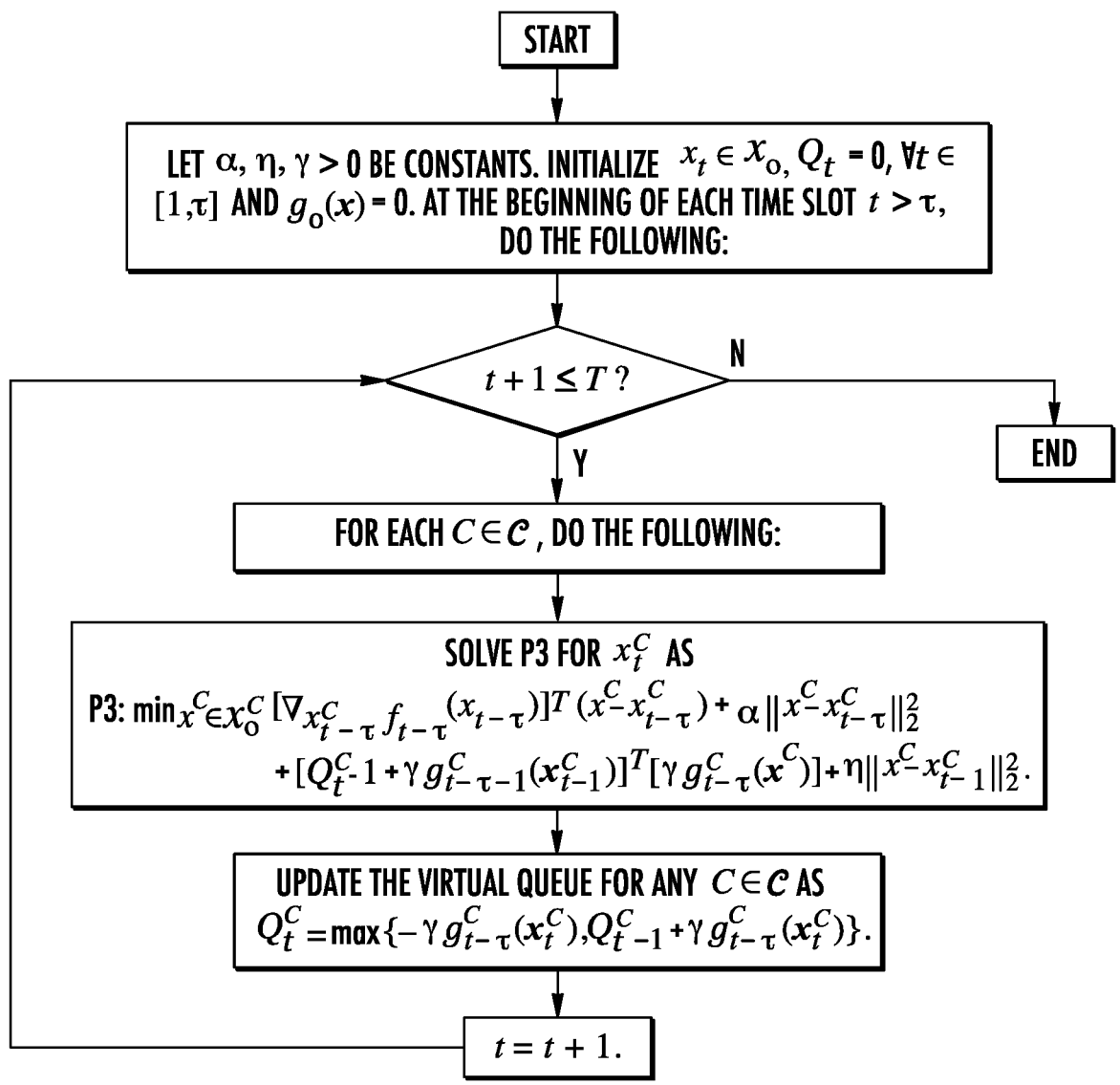
FIG. 2 is a flowchart of a second algorithm disclosed herein.

Referring now to the drawing figures, Algorithm 1, is summarized in the flowchart of FIG. 1. Algorithm 1 selects a decision sequence $\{x_t\}$ and a virtual queue sequence $\{Q_t\}$, which can be viewed as the primal and dual variables in the saddle-point-typed OCO algorithms. The main difference is that Algorithm 1 uses the virtual queue as a backlog queue on the long-term constraint violation, and thus an upper bound on the virtual queue can be transformed into an upper bound on the constraint violation. The virtual queue was originally proposed for Lyapunov optimization and later extended to OCO. However, the virtual-queue-based OCO algorithm focused on obtaining a static regret bound with time-invariant long-term constraints. In contrast, Algorithm 1 accommodates time-varying long-term constraints with a guarantee on the dynamic regret. Compared with the OCO algorithm, Algorithm 1 only uses the gradient information of the loss functions at the past decision points, instead of complete information of the past loss functions, in some embodiments. Furthermore, the online algorithm disclosed is limited to the standard OCO setting with one-time-slot delay. Algorithm 1 has two regularization terms in the per-slot optimization problem P2 for the gradient descent and virtual queue update, respectively. The use of two regularization terms is unique, in comparison with existing algorithms for constrained OCO that use one regularization term for decision update. It gives Algorithm 1 some advantages over the existing works on constrained OCO in terms of regret bounds and average In some embodiments, $g_t(x)$ may be separable, i.e., $$g_t(x) = [g_t^1(x^1), \ldots, g_t^1(x^C)]^T$$

with $x^c$ being one block of the decision variable x, Algorithm 1 naturally leads to fully-distributed implementation as presented in Algorithm 2, which is summarized in FIG. 2. Algorithm 2 can be leveraged to provide a fully-distributed online precoding solution for coordinated multi-cell MIMO WNV.

If the feedback delays for the loss and constraint functions are different, e.g., information feedbacks of $f_t(x)$ and $g_t(x)$ are delayed for $\tau_1$ and $\tau_2$ time slots, respectively, and $\tau_1 \neq \tau_2$, then Algorithm 1 and 2 can still be applied by setting $\tau = \max\{\tau_1, \tau_2\}$.

In some embodiments, the following assumptions can be made to facilitate the performance bound analysis of Algorithm 1.

Assumption 1. There exists a constant D>0 such that for any $x \in \mathcal{X}_0$ and any t:

$$\|\nabla f_t(x)\|_2 \leq D. \tag{7}$$

Assumption 2. There exists a constant $\beta>0$ such that $g_t(x)$ is Lipschitz continuous with modulus $\beta$ for any x, $y \in \mathcal{X}_0$ and any t, i.e.:

$$\|g_t(x) - g_t(y)\|_2 \leq \beta \|x - y\|_2. \tag{8}$$

Assumption 3. There exists a constant G>0 such that for any $x \in \mathcal{X}_0$ and any t:

$$\|g_t(x)\|_2 \leq G. \tag{9}$$

Assumption 4. There exists a constant R>0 such that for any x, $y \in \mathcal{X}_0$ and any t:

$$\|x - y\|_2 \leq R. \tag{10}$$

Assumption 5. There exists a constant $\delta>0$ and a $\tilde{x}_t \in \mathcal{X}_0$ such for any t:

$$g_t(\tilde{x}_t) \leq -\epsilon 1. \tag{11}$$

The above assumptions are all general for constrained OCO. In order, Equations (7) to Equation (11) refer to the following: 1) The gradient of the convex loss function $f_t(x)$ is bounded; 2) The constraint function $g_t(x)$ is Lipschitz continuous (if and only if the gradient of constraint function is bounded); 3) The impact of $g_t(x)$ is bounded; 4) The impact of the compact convex set $\mathcal{X}_0$ is bounded; and 5) There exists an interior point $\tilde{x}_t \in \mathcal{X}_0$ for $g_t(x)$.

Some embodiments address the impact of feedback delay on the dynamic regret and constraint violation analysis for constrained OCO, which has not been addressed by the existing literature. To this end, the accumulated variations are quantified of the underlying time-varying system. The accumulated variation of the online optimal solution sequence $$\Delta_{x^\circ} \triangleq \sum_{t=1}^{T} \|x_t^\circ - x_{t-1}^\circ\|_2. \tag{12}$$

(or the path length) is quantified as:

$$\Delta_{x^\circ} \triangleq \sum_{t=1}^{T} \|x_t^\circ - x_{t-1}^\circ\|_2. \tag{12}$$

Is it assumed that $\Delta_{x^\circ} \leq \mathcal{O}(T^\delta)$ for some $\delta \in [0,1]$. Furthermore, the accumulated squared variation of the constraint function sequence $\{g_t(x)\}$ is defined as $$\Delta_g \triangleq \sum_{t=1}^{T} \max_{x \in \mathcal{X}_0} \{\|g_t(x) - g_{t-1}(x)\|_2^2\}. \tag{13}$$

Another related quantity regarding the accumulated variation of $\{g_t(x)\}$ is defined as $$\tilde{\Delta}_g \triangleq \sum_{t=1}^{T} \max_{x \in \mathcal{X}_0} \{\|g_t(x) - g_{t-1}(x)\|_2\}. \tag{14}$$

In the order sense, $\Delta_g$ is usually smaller than $\tilde{\Delta}_g$ for a constraint function sequence $\{g_t(x)\}$ that varies sub-linearly. For illustration, assume $\|g_t(x) - g_{t-1}(x)\|_2 \propto T^\mu$; then $\Delta_g = \mathcal{O}(T^{2\mu+1})$ and $\tilde{\Delta}_g = \mathcal{O}(T^{\mu+1})$. Therefore, if either $\Delta_g$ or $\tilde{\Delta}_g$ is sublinear, indicated that $\mu<0$ and $\Delta_g$ is smaller than $\tilde{\Delta}_g$ in the order sense.

Performance Analysis

In some embodiments, performance bounds are provided for the disclosed OCO algorithms. Impacts of the feedback delay on the regret and constraint violation bounds are explicitly analyzed.

First, bounds are provided on the virtual queue vector in the following lemma.

Lemma 1. The virtual vector generated by Algorithm 1 is bounded for any $t > \tau$ as follows:

$$Q_t \succeq 0, \tag{15}$$

$$Q_t + \gamma g_{t-\tau}(x_t) \succeq 0, \tag{16}$$

$$\|Q_t\|_2 \geq \|\gamma g_{t-\tau}(x_t)\|_2, \tag{17}$$

$$\|Q_t\|_2 \leq \|Q_{t-1}\|_2 + \|\gamma g_{t-\tau}(x_t)\|_2. \tag{18}$$

Define $$L_t \triangleq \frac{1}{2} \|Q_t\|_2^2$$

as the quadratic Lyapunov function and $\Delta_t \triangleq L_{t+1} - L_t$ as the corresponding Lyapunov drift. Leveraging results in Lemma 1, the upper bound on the Lyapunov drift is provided in the following lemma.

Lemma 2. The Lyapunov drift is upper bounded for any $t > \tau$ as follows:

$$\Delta_{t-1} \leq \gamma Q_{t-1}^T g_{t-\tau}(x_t) + \|\gamma g_{t-\tau}(x_t)\|_2^2. \tag{19}$$

Leveraging results in Lemma 1-2 and OCO techniques, the following theorem provides dynamic regret bound for Algorithm 1 with $\tau$-time-slot delay.

Theorem 3. Let $\alpha, \gamma > 0$ and $\eta \geq \gamma^2 \beta^2$ in Algorithm 1, the dynamic regret is upper bounded as follows:

$$RE_d(T) \leq \frac{D^2}{4\alpha} T + \frac{\gamma^2 G^2}{2} + \gamma^2 \Delta_g + (\alpha \tau + \eta)(R^2 + 2R\Delta_{x^\circ}) + DR\tau. \tag{20}$$

Next, an upper bound on the constraint violation $VO^c(T)$ for Algorithm 1 is provided. First, the virtual queue $Q_t$ is related to the constraint violation in the following lemma.

Lemma 4. For the virtual queue vector $Q_t$ produced by Algorithm 1, for any $c \in \mathcal{C}$, the following holds:

$$VO^c(T) \leq \frac{1}{\gamma}\|Q_T\|_2 + \tau\tilde{\Delta}_g + G\tau. \quad (21)$$

From Lemma 4, the constraint violation $VO^c(T)$ is bound through an upper bounded on the virtual queue vector $Q_T$. The following Theorem provides an upper bound on the constraint violation over any given $T>0$.

Theorem 5. Let $\alpha, \eta, \gamma>0$ in Algorithm 1, the constraint violation for any $c \in \mathcal{C}$ is upper bounded as follows:

$$VO^c(T) \leq 2G + \frac{2\gamma^2 G^2 + DR + (\alpha+\eta)R^2}{\epsilon\gamma^2} + \tau\tilde{\Delta}_g + G\tau. \quad (22)$$

Theorem 3 and 5 provide performance bounds on the dynamic regret and constraint violation for Algorithm 1. Performance analysis explicitly considers the impact of multiple-time-slot delay on the performance guarantees of constrained OCO, which has not been studied in the literature before. From Theorem 3 and 5, the following corollary provides dynamic regret and constraint violation bounds with different knowledge on the underlying system.

Corollary 1. Stepsizes with knowledge of $\delta$: Let $$\alpha = \tau^{-\frac{1}{2}}T^{\frac{1-\delta}{2}}, \eta = \beta^2\gamma^2,$$

and $\gamma=1$ in Algorithm 1, the dynamic regret is upper bounded given by:

$$RE_d(T) \leq O\left(\max\left\{\tau^{\frac{1}{2}}T^{\frac{1+\delta}{2}}, \Delta_g\right\}\right)$$

and the constraint violation for any $c \in \mathcal{C}$ is upper bounded given by:

$$VO^c(T) \leq O\left(\max\left\{T^{\frac{1+\delta}{2}}, \tau\tilde{\Delta}_g\right\}\right).$$

If $\tau = \mathcal{O}(1)$, $\delta<1$, $\Delta_g=o(T)$, and $\tilde{\Delta}_g=o(T)$, both the dynamic regret and constraint violation are sublinear, i.e., $RE_d(T)=o(T)$ and $VO^c(T)=o(T)$, $\forall c \in \mathcal{C}$.

Corollary 2. Stepsizes without knowledge of $\delta$: Let $$\alpha = \tau^{-\frac{1}{2}}T^{\frac{1}{2}},$$

$\eta=\beta^2\gamma^2$, and $\gamma=1$ in Algorithm 1, the dynamic regret is upper bounded given by:

$$RE_d(T) \leq O\left(\max\left\{\tau^{\frac{1}{2}}T^{\frac{1}{2}+\delta}, \Delta_g\right\}\right)$$

and the constraint violation for any $c \in \mathcal{C}$ is upper bounded given by:

$$VO^c(T) \leq O\left(\max\left\{T^{\frac{1}{2}}, \tau\tilde{\Delta}_g\right\}\right).$$

In general, the performance bounds of Algorithm 1 cannot be compared, as the results rely on different assumptions and specific values of the underlying system variations. Some embodiments of the online algorithm allow the feedback information to be delayed for multiple time slots. The impact of delay on the dynamic regret and constraint violation is considered.

The performance bounds achieved by modified online saddle point (MOSP) relies on the assumption that the slack constant is larger than the maximum variation of the constraint functions given by:

$$\epsilon > \max_{t\in[1,T]}\left\{\max_{x\in\mathcal{X}_0}\{\|g_t(x) - g_{t-1}(x)\|_2\}\right\}$$

which is difficult to satisfy in general. In contrast, it is assumed that $\epsilon>0$ in Assumption 5. Furthermore, the optimal stepsizes of MOSP may require knowledge of both $\delta$ and $\tilde{\Delta}_g$, while the stepsizes provided herein need only $\delta$ and $\beta$. Note that $\beta$ is an upper bound on the gradient of constraint function $g_t(x)$, and may be easier to acquire than the accumulated variation of the constraint function $\tilde{\Delta}_g$. When $\delta$ is unknown, MOSP achieves $$O\left(\max\left\{T^{\frac{1}{3}+\delta}, T^{\frac{1}{3}}\tilde{\Delta}_g, T^{\frac{2}{3}}\right\}\right)$$

dynamic regret and $$O\left(T^{\frac{2}{3}}\right)$$

constraint violation, both are at least $$O\left(T^{\frac{2}{3}}\right)$$

regardless how small the system variations are. In contrast, the performance bounds of Algorithm 1 decrease smoothly to $$O\left(T^{\frac{1}{2}}\right)$$

if the system variations are sufficiently small.

To achieve $\mathcal{O}(T)$ dynamic regret and constraint violation, the OCO algorithm relies on additional assumptions that the accumulated variation of the convex loss functions $\{f_t(x)\}$ is sublinear given by:

$$\sum_{t=1}^{T}\max_{x\in\mathcal{X}_0}\{\|f_t(x) - f_{t-1}(x)\|_2\} = o(T)$$

and the accumulated variation of the optimal dual points $$\{\lambda_t^\circ\}$$

of the optimization problem P1 is sublinear given by:

$$\sum_{t=1}^T \|\lambda_t^\circ - \lambda_{t-1}^\circ\|_2 = o(T)$$

which are not assumed in the analysis. Furthermore, the OCO algorithm requires full information feedback of the convex loss function $f_t(x)$, instead of the gradient information $\nabla f_t(x_t)$ at the online solution point used in Algorithm 1. Note that penalizing the convex loss function $f_t(x)$ as part of the objective in the per-slot optimization problem prevent the problem from distributed implementation if $f_t(x)$ is not separable. In contrast, Algorithm 1 naturally leads to a distributed implementation if the constraints function $g_t(x)$ are separable.

Corollary 3. Static regret: Let $$\alpha = \tau^{-\frac{1}{2}} T^{\frac{1}{2}},$$

$\eta \beta^2 \gamma^2$, and $\gamma=1$ in Algorithm 1, the static regret is upper bounded given by:

$$RE_s(T) \le O\left(\max\left\{\tau^{\frac{1}{2}} T^{\frac{1}{2}}, \Delta_g\right\}\right)$$

and the constraint violation for any $c \in \mathcal{C}$ is upper bounded given by:

$$VO^c(T) \le O\left(\max\left\{T^{\frac{1}{2}}, \tau \tilde{\Delta}_g\right\}\right).$$

If $\tau = \mathcal{O}(1)$, $\Delta_g = o(T)$, and $\tilde{\Delta}_g = o(T)$, both the static regret and constraint violation are sublinear, i.e., $RE_s(T) = o(T)$ and $VO^c(T) = o(T)$, $\forall c \in \mathcal{C}$.

Remark 5. The performance analysis assumes T is large enough such that:

$$\frac{(1+C)(\max\{D, \beta\})^2 + 2}{\sqrt{\tau T}} + [(5C+1)(\max\{D, \beta\})^2 + 2]\sqrt{\frac{\tau}{T}} \le \sqrt{\frac{1}{3}}$$

and therefore, provides no performance guarantee for a mediocre value of T. Furthermore, only a static regret bound is provided, while both the dynamic and static regret bounds are provided in some embodiments disclosed herein. In addition, the optimal step size requires additional information of D and C compared to the step size choice of some embodiments disclosed herein.

Corollary 4. Time-invariant constraint: If the constraint function is time-invariant, i.e., $g_t(x_t) = g(x_t)$, $\forall t$; then $\Delta_g = \tilde{\Delta}_g = 0$. Let $$\alpha = \gamma^2 = \tau^{-\frac{1}{2}} T^{\frac{1-\delta}{2}},$$

$\eta = \beta^2 \gamma^2$, the dynamic regret is upper bounded given by:

$$RE_d(T) \le O\left(\max\left\{\tau^{\frac{1}{2}} T^{\frac{1+\delta}{2}}\right\}\right)$$

and the constraint violation for any $c \in \mathcal{C}$ is upper bounded given by:

$$VO^c(T) = \sum_{t=1}^T g^c(x_t) \le O(\tau).$$

On conditions that $\tau = \mathcal{O}(1)$ and $\delta < 1$, the dynamic regret is sublinear and the constraint violation is upper bounded by a constant, i.e., $RE_d(T) = o(T)$ and $VO^c(T) = \mathcal{O}(1)$.

Remark 6. The constraint violations in [9] and [14] are no less than $$o\left(T^{\frac{2}{3}}\right)$$

and $$o\left(T^{\frac{3}{4}}\right),$$

respectively, even when the constraint function is time-invariant. In contrast, when $\tilde{\Delta}_g$ is small, the constraint violation $VO^c(T)$ yielded by Algorithm 1 decreases smoothly to $$o\left(T^{\frac{1}{2}}\right).$$

Particularly, if the constraint function is time-invariant, Algorithm 1 provides $\mathcal{O}(\tau)$ constraint violation.

Online Multi-Cell MIMO WNV

In some embodiments, Algorithm 2 is leveraged to provide an online precoding scheme for coordinated multi-cell MIMO WNV with delayed CSI. An advantage of the online precoding scheme presented herein is that it naturally leads to a fully-distributed implementation at each cell without any CSI exchange or central transmit power update. Furthermore, the online precoding scheme presented herein may be based only on the past local CSI and is in a semi-closed form.

Idealized Multi-Cell MIMO WNV Model

A total of C cells owned by the InP are first considered. There are M SPs that share the hardware, wireless spectrum, and the transmission power provided by the InP at each cell base station (BS) or network node. Let $\mathcal{C} = \{1, \ldots, C\}$ and $\mathcal{M} = \{1, \ldots, M\}$. The network node at each cell $c \in \mathcal{C}$ has $N_c$ antennas. Then, there are a total of $N = \sum_{c \in \mathcal{C}} N_c$ antennas in the network. Each SP $m \in \mathcal{M}$ has $$K_c^m$$

subscribing users in cell c. The total number of users in cell c is $K_c = \sum_{m \in \mathcal{M}}$ $K_c^m$, and the total number of users in the network is $K=\sum_{c\in\mathcal{C}} K_c$.

Precoding Design by the InP and SPs

In some embodiments, each SP designs its desirable precoding matrix for its users, and then sends it to the InP as its virtualization service demand. Specifically, let $$H_t^{clm} \in \mathbb{C}^{K_c^m \times N_l}$$

denote the channel of the $K_c^m$ users of SP m in cell c from the network node in cell l at time t. In each cell c, the InP communicates with each SP m the channel state $$H_t^{ccm}$$

of SP m's serving users in cell c. Based on the service needs and channel state $$H_t^{ccm}$$

of its own users, each SP m designs a normalized precoding matrix $$W_t^{ccm} \in \mathbb{C}^{N_c \times K_c^m}, \|W_t^{ccm}\|_F^2 = 1,$$

to be sent to the InP as its precoding demand. Note that each SP m designs $$W_t^{ccm}$$

locally without knowledge of the other SPs' users in the cell or the users in other cells, and it can choose any demanded precoding matrices. For example, an SP may choose from the two most commonly used linear precoding schemes, i.e., maximum ratio transmission (MRT) precoding and zero forcing (ZF) precoding.

Let $$P_c^{max}$$

denote the maximum transmit power at the network node in cell c. After collecting the precoding demand $$W_t^{ccm}$$

from the each SP m, the InP allocates a virtual transmit power $$\varpi_c^m P_t^c$$

to each SP m's precoding demand, where $$P_t^c \leq P_c^{max}$$

the virtual transmit power allocated to cell c, and $$\varpi_c^m$$

is the virtual transmit power allocation factor for SP m with $$\sum_{m\in\mathcal{M}} \varpi_c^m = 1.$$

Here $$\varpi_c^m$$

indicates the fraction of InP's transmit power allocated to SP m in cell c. It is assumed that $$\varpi_c^m$$

is known a priori from the contractual agreement between SP m and the InP. Its value may also depend on the priority of the SP, user density, and/or some bidding mechanism, etc. Note that all previous spatial virtualization approaches assume that the InP allocates full transmit power to each SP's precoding demand. This can lead to severe inter-SP and inter-cell interference, which in turn deteriorates the system performance. A more flexible virtual transmit power allocation scheme at the InP is presented herein to mitigate the interference. It allows the InP to balance between interference suppression and each SP's demand, to achieve a certain desired system performance. Let $$x_t^{cm}$$

represent the downlink transmitted signal vector for the users of SP m in cell c. With the precoding demand $$W_t^{ccm}$$

and virtual transmit power $$\varpi_c^m P_t^c,$$

the virtual received signal vector at the $$K_c^m$$

users of SP m in cell c is given by:

$$\tilde{y}_t^{ccm} = \sqrt{\varpi_c^m P_t^c} H_t^{ccm} W_t^{ccm} x_t^{cm}, \forall m \in \mathcal{M}. \quad (23)$$

The virtual received signal vector at all $K_c$ users in cell c is given by:

$$\tilde{y}_t^{cc} = \sqrt{P_t^c} H_t^{ccm} D_t^c x_t^c, \forall c \in C \quad (24)$$

where $$x_t^c$$

is the overall signal vector for $K_c$ users in cell c with $$\mathbb{E}\{x_t^c x_t^{cH}\} = I, \forall c \in C, \forall t,$$

and $$D_t^c \triangleq blk\text{diag}\{\sqrt{\varpi_c^m} H_t^{cc1} W_t^{cc1}, \ldots, \sqrt{\varpi_c^m} H_t^{ccM} W_t^{ccM}\}$$

is the virtualization demand from cell c.

The InP virtualizes the network nodes (and their served cells) to meet the virtualization service demands of SPs. Based on the channel states between the network node in cell c and all users, as well as the demanded precoding matrices $$W_t^{ccM}$$

from the SPs, the InP designs the actual downlink precoding $$\tilde{V}_t^c = [V_t^{c1}, \ldots, V_t^{c1}] \in \mathbb{C}^{N_c \times K_c}$$

to meet the SPs' demands, where $$V_t^{cm} \in \mathbb{C}^{N_c \times K_c^m}$$

is the actual precoding designed for SP m. The actual received signal at the $$K_c^m$$

users, originated from the serving network node using the InP-designed precoding matrix $$\tilde{V}_t^c$$

at cell c (in the absent of receiver noise), is given by:

$$y_t^{ccm} = H_t^{ccm} \tilde{V}_t^{cm} x_t^{cm} + \sum_{i \in \mathcal{M}, i \neq m} H_t^{ccm} \tilde{V}_t^{ci} x_t^{ci}, \forall m \in \mathcal{M} \quad (25)$$

where the second term is the intra-cell inter-SP interference to the users of SP m from the other SPs. Note that $$y_t^{ccm}$$

only contains signals from the network node in cell c and does not contain inter-cell interference. The actual received signal at users in cell l from the network node in cell c (in the absent of receiver noise) is given by $$y_t^{lc} = \bar{H}_t^{lc} \tilde{V}_t^c x_t^c, \forall c \in C \quad (26)$$

where $$\bar{H}_t^{lc} = [H_t^{lc1H}, \ldots, H_t^{lcMH}]^H \in \mathbb{C}^{K_c \times N_l}$$

is the channel state between the $K_c$ users in cell c and the network node in cell l.

Figure 3:
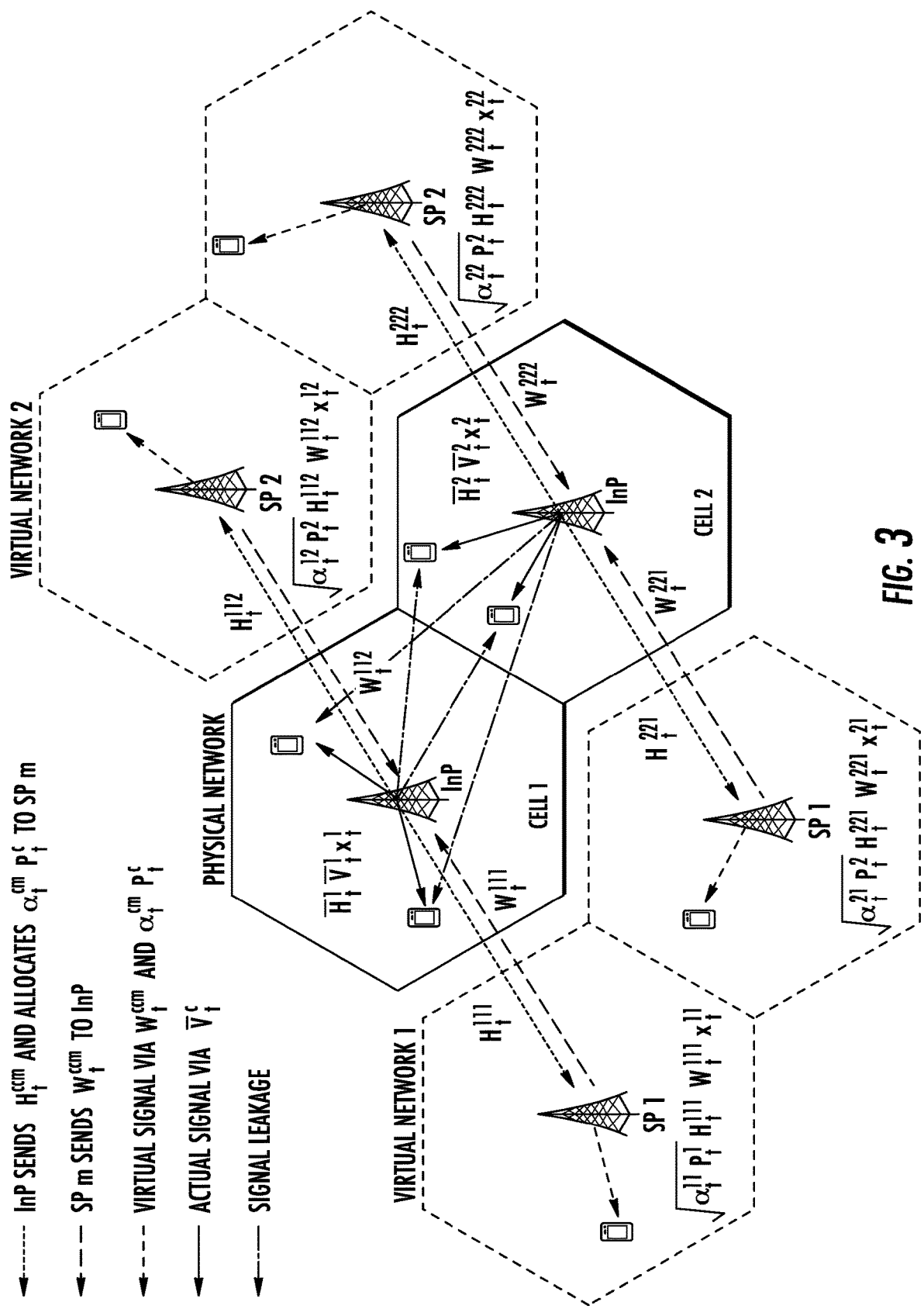
FIG. 3 illustrates a virtualized multi-cell MIMO network.

The virtualized multi-cell MIMO network is illustrated in FIG. 3. The virtualization procedure in each cell c is summarized as follows: 1) the InP communicates the local channel state $$H_t^{ccm}$$

of subscribing users to each SP m; 2) SP m designs the normalized virtual precoding matrix $$W_t^{ccm}$$

and sends it to the InP as the virtualization service demand; 3) the InP allocates a virtual transmit power $$\varpi_c^m P_t^c$$

to each SP m, and designs the actual precoding matrix $$\tilde{V}_t^c$$

for downlink transmission for users in cell c.

Signal Leakage and Precoding Deviation

Since $$W_t^{ccm}$$

is designed locally by SP m without considering either the inter-SP interference or the inter-cell interference, the InP needs to design the actual precoding $$\tilde{V}_t^c$$

to mitigate the interference and ensure that the actual received signal $$y_t^{ccm}$$

reflects the service demand of SP m in cell c. For this purpose, two design metrics are considered. First, to quantity the difference between the actual precoding by the InP and the virtual precoding by the SPs for cell c, the precoding deviation is defined as:

$$\mathbb{E}_{x_t^c}\{\|y_t^{cc} - \tilde{y}_t^{cc}\|_F^2\} = \|\bar{H}_t^{cc}\tilde{V}_t^c - \sqrt{P_t^c}D_t^c\|_F^2. \quad (27)$$

Next, to quantify inter-cell interference due to the InP precoding, the signal leakage is defined as:

$$\mathbb{E}_{x_t^c}\left\{\sum_{l\in C, l\neq c}\|y_t^{lc}\|_F^2\right\} = \sum_{l\in C, l\neq c}\|\bar{H}_t^{lc}\tilde{V}_t^c\|_F^2. \quad (28)$$

This indicates the amount of inter-cell interference generated by cell c to all the other cells. The signal leakage is often considered as a design criterion for interference management in conventional non-virtualized MIMO systems.

Ideally, the InP designs the precoding matrix $$\tilde{V}_t^c$$

to eliminate both the intra-cell inter-SP interference and the inter-cell interference, such that it meets the precoding demands with zero precoding deviation and generates zero signal leakage to other cells. However, these two cannot be satisfied in general. This is because interference management limits the degree of freedom for precoding within an SP's user set. In the multi-cell scenario, a trade-off between precoding deviation and signal leakage is required.

Problem Formulation

In some embodiments, a focus of the InP is to minimize the accumulated signal leakage, subject to both long-term constraints on the precoding deviation and short-term transmit power constraints. The formulated online precoding optimization problem is $$P4: \min_{\{V_t\}\in\mathcal{V}_0} \sum_{t=1}^{T}\sum_{c=1}^{C} f_t^c(\tilde{V}_t^c) \quad (29)$$

s.t. $\sum_{t=1}^{T} g_t^c(\tilde{V}_t^c) \leq 0, \forall c \in C$ where $$f_t^c(\tilde{V}_t^c) \triangleq \sum_{l\in C, l\neq c}\|\bar{H}_t^{lc}\tilde{V}_t^c\|_F^2$$

is the leakage loss function, $$g_t^c(\tilde{V}_t^c) \triangleq \|\bar{H}_t^{cc}\tilde{V}_t^c - \sqrt{P_t^c}D_t^c\|_F^2 - \theta_c P_t^c\|D_t^c\|_F^2$$

is the precoding deviation constraint function with $\theta_c$ being a predefined limit on the precoding deviation, and $$\mathcal{V}_0 \triangleq \{V = blkdiag(\tilde{V}^1, \ldots, \tilde{V}^C) : \|\tilde{V}^c\|_F^2 \leq P_c^{max}, \forall c \in C\}.$$

The online precoding design optimization problem P4 is in a same form as the general constrained OCO problem P1. Let $$f_t(V_t) = \sum_{c=1}^{C} f_t^c(\tilde{V}_t^c)$$

and $$g_t(V_t) = [g_t^1(\tilde{V}_t^1), \ldots, g_t^C(\tilde{V}_t^C)]^T,$$

the following lemma shows that P4 satisfies Assumption 1-5.

Lemma 6. For any cell c and any time t, assume $$N_c \geq K_c, \|\bar{H}_t^c\|_F^2 \leq B_c$$

where $$\bar{H}_t^c = [\bar{H}_t^{1cH}, \ldots, \bar{H}_t^{CcH}]^H,$$

and the InP sets the virtual transmit power as $$P_t^c = \frac{P_c^{max}}{\|\bar{H}_t^{ccH}(\bar{H}_t^{cc}\bar{H}_t^{ccH})^{-1}D_t^c\|_F^2}.$$

Then, for any time t, the following statements hold:

$$\|\nabla f_t(V)\|_F \leq D, \forall V \in \mathcal{V}_0, \quad (30)$$

$$\|g_t(V) - g_t(Z)\|_2 \leq \beta\|V - Z\|_F, \forall V, Z \in \mathcal{V}_0, \quad (31)$$

$$\|g_t(V)\|_2 \leq G, \forall V \in \mathcal{V}_0, \quad (32)$$

$$\|V - Z\|_F \leq R, \forall V, Z \in \mathcal{V}_0 \quad (33)$$

$$\exists Z_t \in \mathcal{V}_0, g_t(Z_t) \leq -\epsilon \mathbf{1} \quad (34)$$

where $$D = \sqrt{\sum_{c \in C} B_c^2 P_c^{max}},$$

$$\beta = \sqrt{\max\{8 B_c^2 P_c^{max}, \forall c \in C\}},$$

$$G = \sqrt{\sum_{c \in C} (2 B_c P_c^{max})^2},$$

$$R = \sqrt{\sum_{c \in C} 2 P_c^{max}},$$

and $$\epsilon = \min\left\{\frac{\theta_c M}{K_c B_c^2} P_c^{max} \min \right.$$

$$\left.\{\sigma_t^{k_c}, \forall k_c \in \mathcal{K}_C, \forall t\} \min\{\|H_t^{ccm} W_t^{ccm}\|_F^2, \forall m \in \mathcal{M}, \forall t\}, \forall c \in C\right\}$$

with $$\sigma_t^{k_c}$$

being the $k_c$-th eigenvalue of $$\overline{H}_t^{cc} \overline{H}_t^{ccH}.$$

Online Precoding Solution

Leveraging the disclosed OCO algorithm (Algorithm 2) the following online precoding solution to P4 with $\tau$-time-slot delayed CSI is given. This precoding solution provides worst-case performance guarantees on the leakage and precoding deviation as stated in Theorem 3 and 5, with the constants given in Lemma 6.

At each time t, the InP solves the following precoding optimization problem:

$$P5: \min_{V \in \mathcal{V}_0} 2\mathrm{Re}\{tr\{[\nabla_{V_{t-\tau}^*} f_{t-\tau}(V_{t-\tau})]^H (V - V_{t-\tau})\}\} +$$

$$\alpha \|V - V_{t-\tau}\|_F^2 + [Q_{t-1} + g_{t-\tau-1}(V_{t-1})]^T g_{t-\tau}(V) + \eta \|V - V_{t-1}\|_F^2$$

which can be equivalently decomposed into C subproblems. Each subproblem corresponds to the precoding optimization problem for cell c given by:

$$P6: \min_{\tilde{V}^c} 2\mathrm{Re}\{tr\{[\nabla_{\tilde{V}_{t-\tau}^{c*}} f_{t-\tau}^c(\tilde{V}_{t-\tau}^c)]^H (\tilde{V}^c - \tilde{V}_{t-\tau}^c)\}\} + \alpha \|\tilde{V}^c - \tilde{V}_{t-\tau}^c\|_F^2 +$$ (35)

$$Q_{t-1}^c + g_{t-\tau-1}^c(\tilde{V}_{t-1}^c)] g_{t-\tau}^c(\tilde{V}^c) + \eta \|\tilde{V}^c - \tilde{V}_{t-1}^c\|_F^2 \text{ s.t. } \|\tilde{V}^c\|_F^2 \le P_c^{max}.$$

P6 is a convex optimization problem satisfying the Slater's condition, thus strong duality holds. By studying the Karush-Kuhn-Tucker (KKT) conditions, a semi-closed-form solution for $$\tilde{V}_t^{c\circ}$$

is derived given by:

$$\tilde{V}_t^{c\circ} = [A_t^c(\lambda_t^{c\circ})]^{-1} B_t^c$$ (36)

where $$A_t^c(\lambda_t^{c\circ}) \triangleq \left[Q_{t-1}^c + g_{t-\tau-1}^c(\tilde{V}_{t-1}^C)\right] \overline{H}_{t-\tau}^{ccH} \overline{H}_{t-\tau}^{cc} + (\alpha + \eta + \lambda_t^{c\circ})I$$ (37)

and $$B_t^c = \left(\alpha I - \sum_{l \in C, l \ne c} \overline{H}_{t-\tau}^{lcH} \overline{H}_{t-\tau}^{lc}\right) \tilde{V}_{t-\tau}^c +$$ (38)

$$\eta \tilde{V}_{t-1}^c + \left[Q_{t-1}^c + g_{t-\tau-1}^c(\tilde{V}_{t-1}^c)\right] \sqrt{P_c^c} \overline{H}_{t-\tau}^{ccH} D_{t-\tau}^c.$$

In some embodiments, the solution in the following two cases. 1)

$$\lambda_t^{c\circ} = 0 : \tilde{V}_t^{c\circ}$$

is in a closed-form given by:

$$\tilde{V}_t^{c\circ} = [A_t^c(0)]^{-1} B_t^c.$$ (39)

If $$\tilde{V}_t^{c\circ}$$

in (39) satisfies (35), it is the optimal solution. Otherwise, consider 2)

$$\lambda_t^{c\circ} > 0 : \tilde{V}_t^{c\circ}$$

is in a semi-closed-form in (36), where $$\lambda_t^{c\circ} > 0$$

can be found by bi-section search such that $$\|\tilde{V}_t^{c\circ}\|_F^2 = P_c^{max}.$$

Note that the matrix inversion dominates the computational complexity for calculating $\hat{V}_t^c$, and thus it is in the order of $$O(N_c^3).$$

Numerical Performance Evaluation

In some embodiments, an InP that owns a cellular network consisting of C=3 urban hexagon micro-cells, each cell c is of 500 m radius and has a network node at the center equipped with $N_c$=32 antennas by default. The InP serves M=4 SPs, each SP m serves $$K_c^m = 2$$

users, for a total of $K_c$=8 users in each cell c. A maximum transmit power limit is set to $$P_c^{max} = 33 \text{ dBm},$$

noise spectral density $N_0$=−174 dBm/Hz, noise figure $N_F$=10 dB, and transmission channel bandwidth $B_W$=15 kHz [34]. The fading channel is modeled as a first-order Gauss-Markov process as $$h_{t+1}^{ck} = \alpha_h h_t^{ck} + z_t^{ck}$$

where $$h_t^{ck} \sim \mathcal{CN}(0, \beta^{ck} I)$$

is the channel between user k and network node antennas in cell c, $\beta^{ck}[dB]$=−31.54−33 $\log_{10} d^{ck} - \psi^{ck}$ models path-loss and shadowing, $d^{ck}$ is the distance in kilometers from the network node in cell c to user k, $$\psi^{ck} \sim \mathcal{CN}(0, \sigma_\phi^2)$$

accounts for shadowing with $\sigma_\phi$=8 dB, $\alpha_h$ is the channel correlation coefficient, and $$z_t^{ck} \sim \mathcal{CN}(0, (1-\alpha_h^2)\beta^{ck} I)$$

is independent of $$h_t^{ck}.$$

For a coherence time of $$T_c = \frac{9}{16\pi f_d}$$

and transmission channel bandwidth $B_W$, $\alpha_h$ is determined by $$\alpha_h^{T_c B_W} = \emptyset$$

where $$f_d = \frac{v}{v_c} f_c$$

is the Doppler spread, v is the user speed assumed to be the same for all K users, $f_c$=2.5 GHz is the central frequency, $v_c$ is the speed of light, and ∅=0.1 is the level of de-correlation. For $\alpha_h$=0.997 as default v≈1.5 km/h. The CSI feedback delay τ is increased with the user speed v unchanged, it is equivalent to the case that the user speed v increases while the CSI feedback delay is fixed. Therefore, the user speed v is fixed and varies the CSI feedback delay τ. A summary of some of the default simulation parameters is shown in Table I.

TABLE I

Default Simulation Parameters

| Parameter | Value |
| --- | --- |
| Number of cells C | 3 |
| Number of SPs M | 4 |
| Number of users per cell $K_c$ | 8 |
| Number of users per cell $N_c$ | 32 |
| Transmission channel bandwidth $B_W$ | 15 kHz |
| Central frequency $f_c$ | 2.5 GHz |
| Noise spectral density $N_0$ | −174 dBm/Hz |
| Noise figure $N_F$ | 10 dB |
| User speed v | 1.5 km/h |
| Maximum transmit power per cell $P_{max}^c$ | 33 dBm |
| Time horizon T | 500 |

In some embodiments, each SP m uses MRT or ZF precoding, which are the two commonly used precoding schemes in current MIMO systems, to design their own virtual precoding matrices given by:

$$W_t^{ccm} = \begin{cases} \varphi_t^{ccm} H_t^{ccmH}, & MRT \\ \varphi_t^{ccm} H_t^{ccmH}(H_t^{ccm} H_t^{ccmH})^{-1}, & ZF \end{cases}$$

where $$\varphi_t^{ccm}$$

is a power normalizing factor such that $$\|W_c^{ccm}\|_F^2 = 1.$$

The InP set $$\varpi^{cm} = \frac{1}{M}, \forall m \in \mathcal{M}, \forall c \in C,$$

i.e., all SPs are allocated with equal virtual transmit power. A step size $$\alpha = \sqrt{\frac{T}{\tau}}, \gamma^2 = 1,$$

and $$\eta = \beta^2 = \max\{8B_c^2 P_C^{max}, \forall c \in C\},$$

where $$B_c = 1.645 N_c \sum_{k_c \in \mathcal{K}_c} \beta_c^{k_c};$$

it is chosen that, based on the Chernoff bound, the probability that the gain of unbounded Rayleigh fading channel exceeds this bound is $$\mathbb{P}\{\|\bar{H}_t^c\|_F^2 \le B_c\} \le 2.65 \times 10^{-10}, \forall c \in C.$$

For performance metrics, the time-averaged per-user signal to leakage plus noise ratio (SLNR) is defined as:

$$\overline{SLNR}(T) \triangleq \frac{1}{TK} \sum_{t=1}^{T} \sum_{c=1}^{C} \sum_{m=1}^{M} \sum_{k=1}^{K_c^m} SLNR_t^k,$$

the time-averaged normalized constraint violation as:

$$\bar{\rho}(T) \triangleq \frac{1}{TC} \sum_{t=1}^{T} \sum_{c=1}^{C} \frac{\|\bar{H}_t^{cc} \tilde{V}_t^c - \sqrt{P_t^c} D_t^c\|_F^2}{P_t^c \|D_t^c\|_F^2},$$

the time-averaged minimum rate of the SPs is:

$$\bar{R}_{min}(T) \triangleq \frac{1}{TCM} \sum_{t=1}^{T} \sum_{c=1}^{C} \sum_{m=1}^{M} \min_{k \in \mathcal{K}_c^m} \log_2(1 + SINR_t^k),$$

and the-averaged per-user rate as:

$$\bar{R}(T) \triangleq \frac{1}{TK} \sum_{t=1}^{T} \sum_{c=1}^{C} \sum_{m=1}^{M} \sum_{k=1}^{K_c^m} \log_2(1 + SINR_t^k)$$

where $$SLNR_t^k$$

and $$SINR_t^k$$

are the signal to leakage plus noise ratio (SLNR) and signal to interference plus noise ratio (SINR) of the k-th user of SP m in cell c at time t, respectively.

Performance vs. Time Horizon T

In some embodiments, a time trajectory is plotted with different values of the CSI feedback delay $\tau$. A performance comparison is conducted between the online coordinated multi-cell MIMO WNV algorithm, the online optimal precoding solution, and the online algorithm proposed above. The online optimal precoding is the solution to the following precoding optimization problem $$\min_{\{V_t\} \in \mathcal{V}_0} \sum_{c=1}^{C} f_t^c(\tilde{V}_t^c) \qquad \text{P7}$$

$$\text{s.t. } g_t^c(\tilde{V}_t^c) \le 0, \forall c \in C.$$

Figure 4:
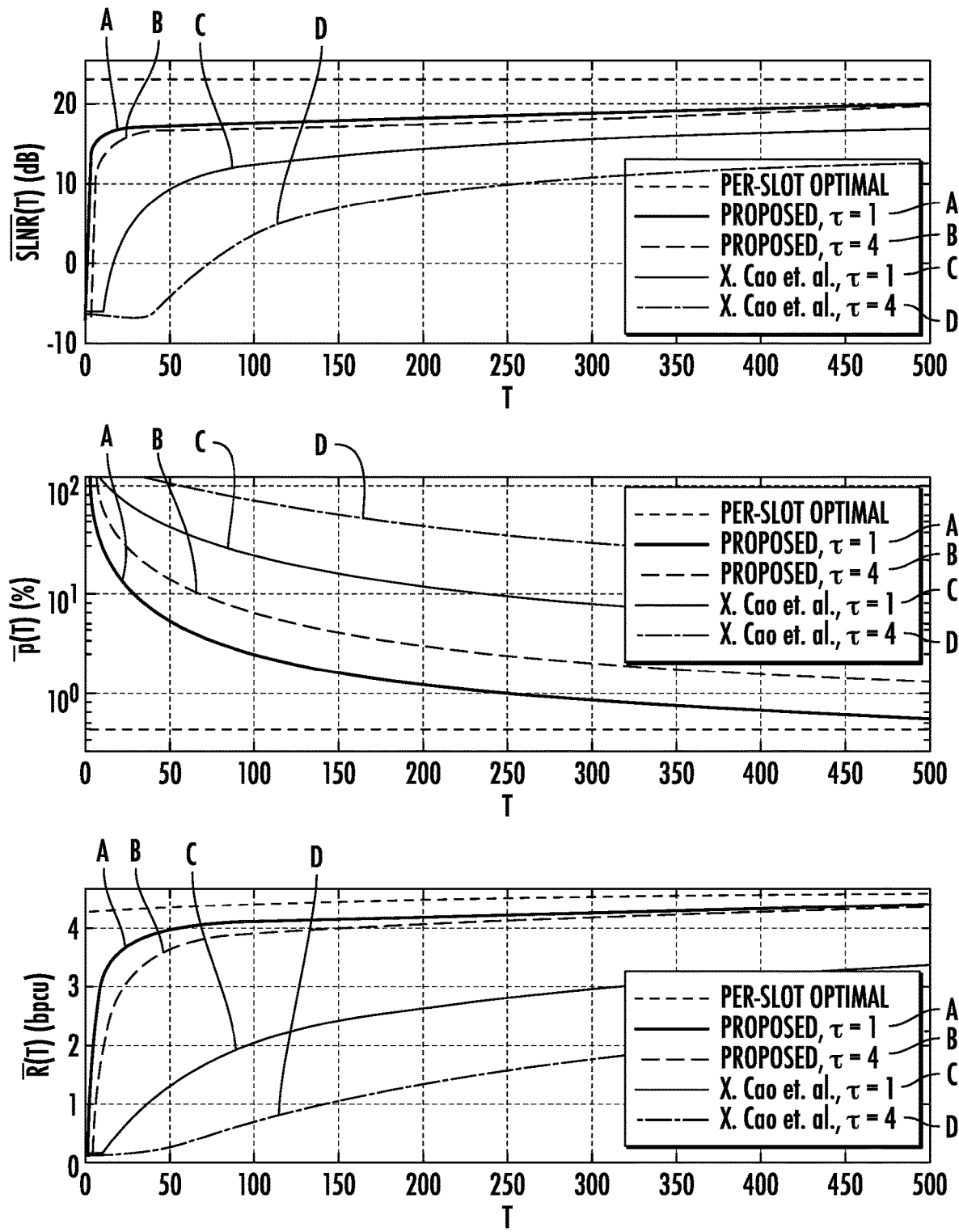
FIG. 4 illustrates $\overline{\text{SLNR}}(T)$, $\overline{P}(T)$ and $\overline{R}(T)$ vs. T with different τ when all SPs adopt MRT precoding.
Figure 5:
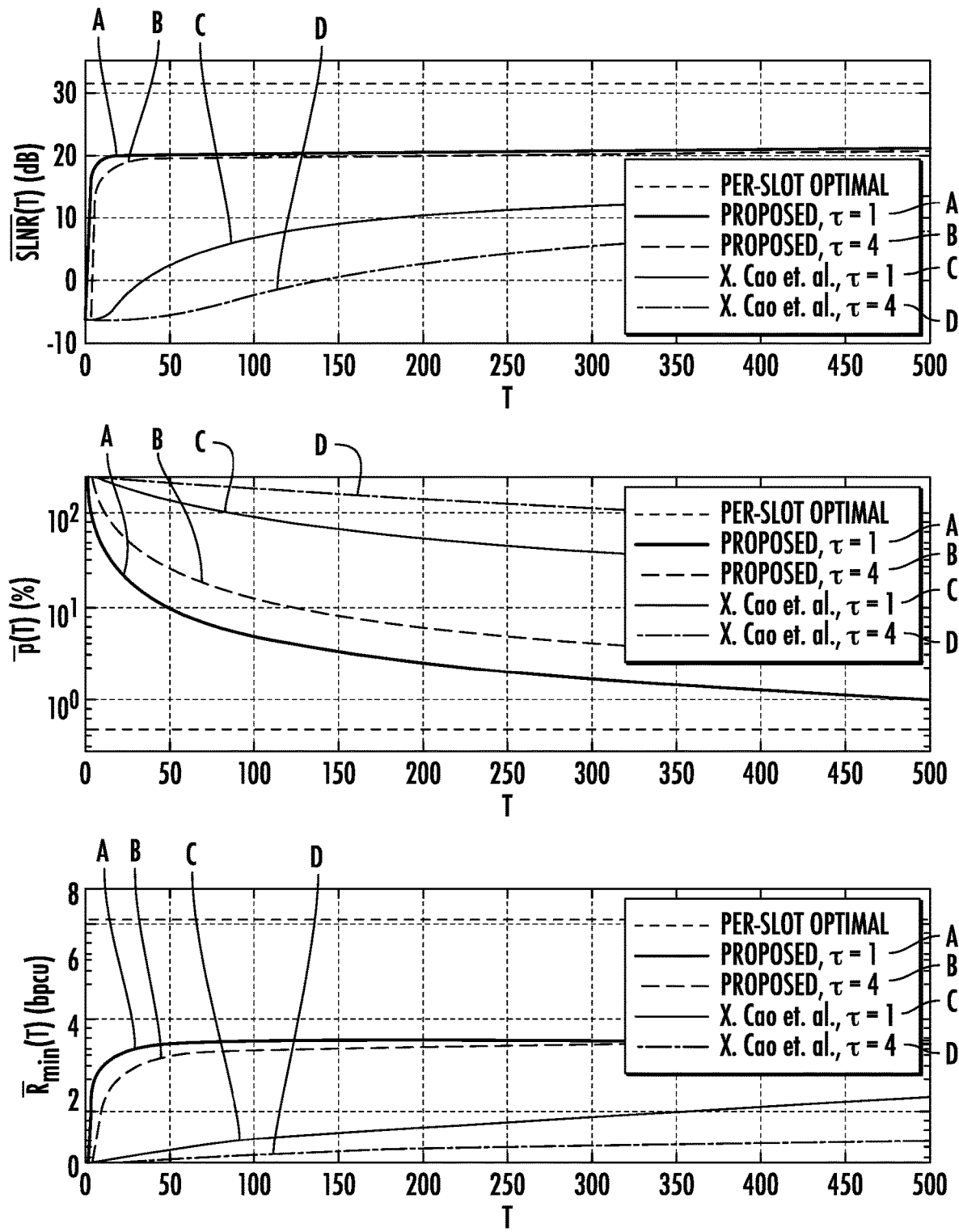
FIG. 5 illustrates $\overline{\text{SLNR}}(T)$, $\overline{P}(T)$ and $\overline{R}_{min}(T)$ vs. T with different τ when all SPs adopt zero forcing (ZF) precoding.

Note that the online optimal precoding can make use of the current CSI while the precoding scheme uses the $\tau$-time-slot delayed CSI. Furthermore, although P7 is a convex optimization problem, it does not admit a semi-closed-form solution as the online precoding scheme disclosed herein. FIG. 4 shows $\overline{SLNR}(T)$, $\bar{\rho}(T)$, and $\bar{R}(T)$ versus time horizon T for different values of $\tau$ when all SPs adopt MRT precoding. It is observed that the algorithm converges much faster (within 500 time slots) than the OCO algorithm. The performance gap between the disclosed online precoding solution with delayed CSI and the online optimal precoding solution with in-time CSI is small. As $\tau$ increasing, the CSI is delayed for a longer time, Therefore the online algorithms take a longer time to reach the steady state. However, it is observed that the performance gap between the precoding solution and the one yielded enlarges as $\tau$ increasing. FIG. 5 shows $\overline{SLNR}(T)$, $\bar{\rho}(T)$, and $\bar{R}_{min}(T)$ versus time horizon T for different values of $\tau$ when all SPs adopt ZF precoding. Compared with the MRT precoding case, when all SPs adopt ZF precoding, a larger system performance gap is observed between the precoding solution and the online optimal precoding solution. This is because ZF precoding is known to be sensitive to channel noise and inaccuracy.

Performance vs. Number of Antennas $N_c$ and the Number of Users $K_c$

Figure 6:
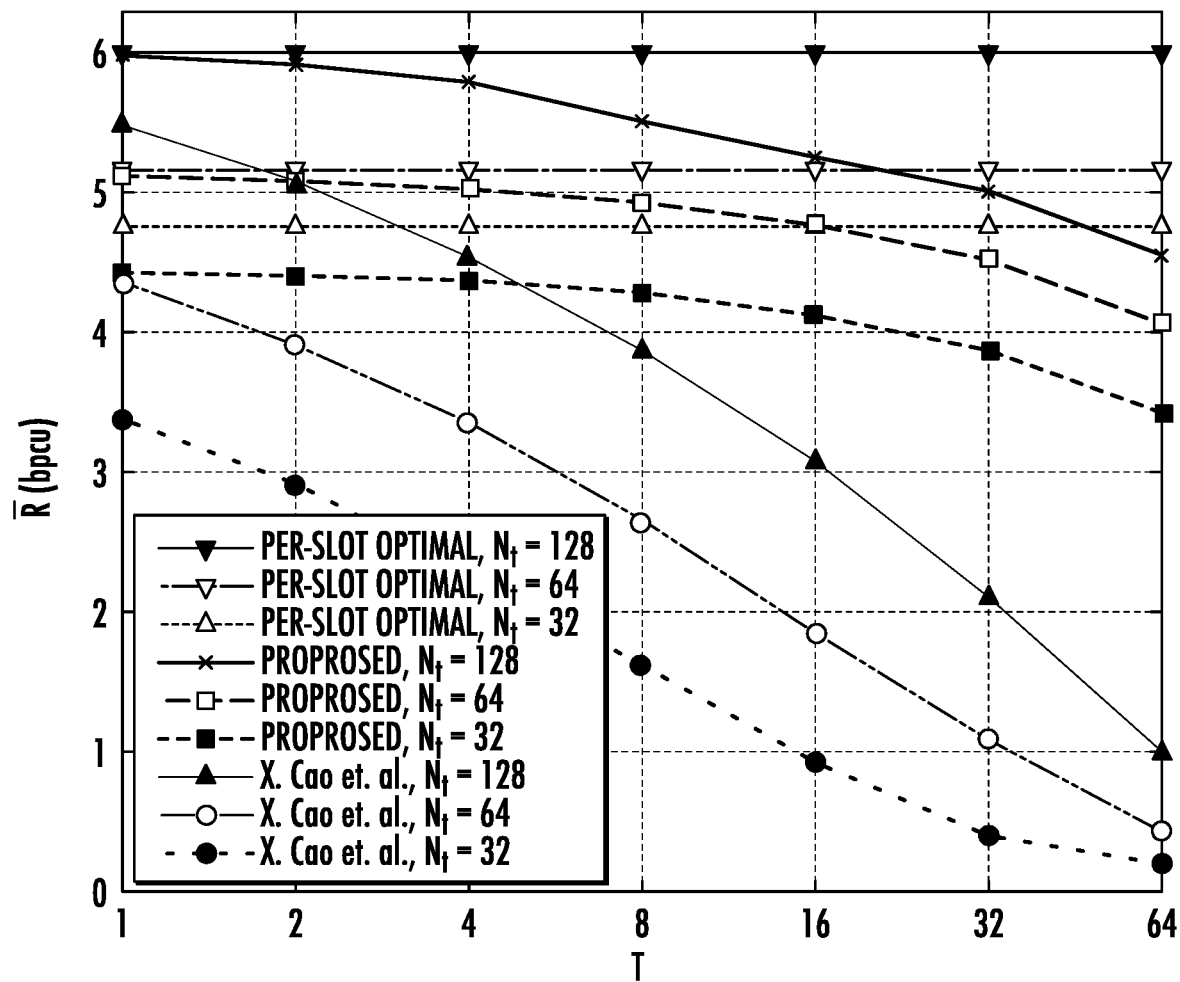
FIG. 6 illustrates $\overline{R}$ vs. τ with different τ with $K_c=8$ and different values of $N_c$.
Figure 7:
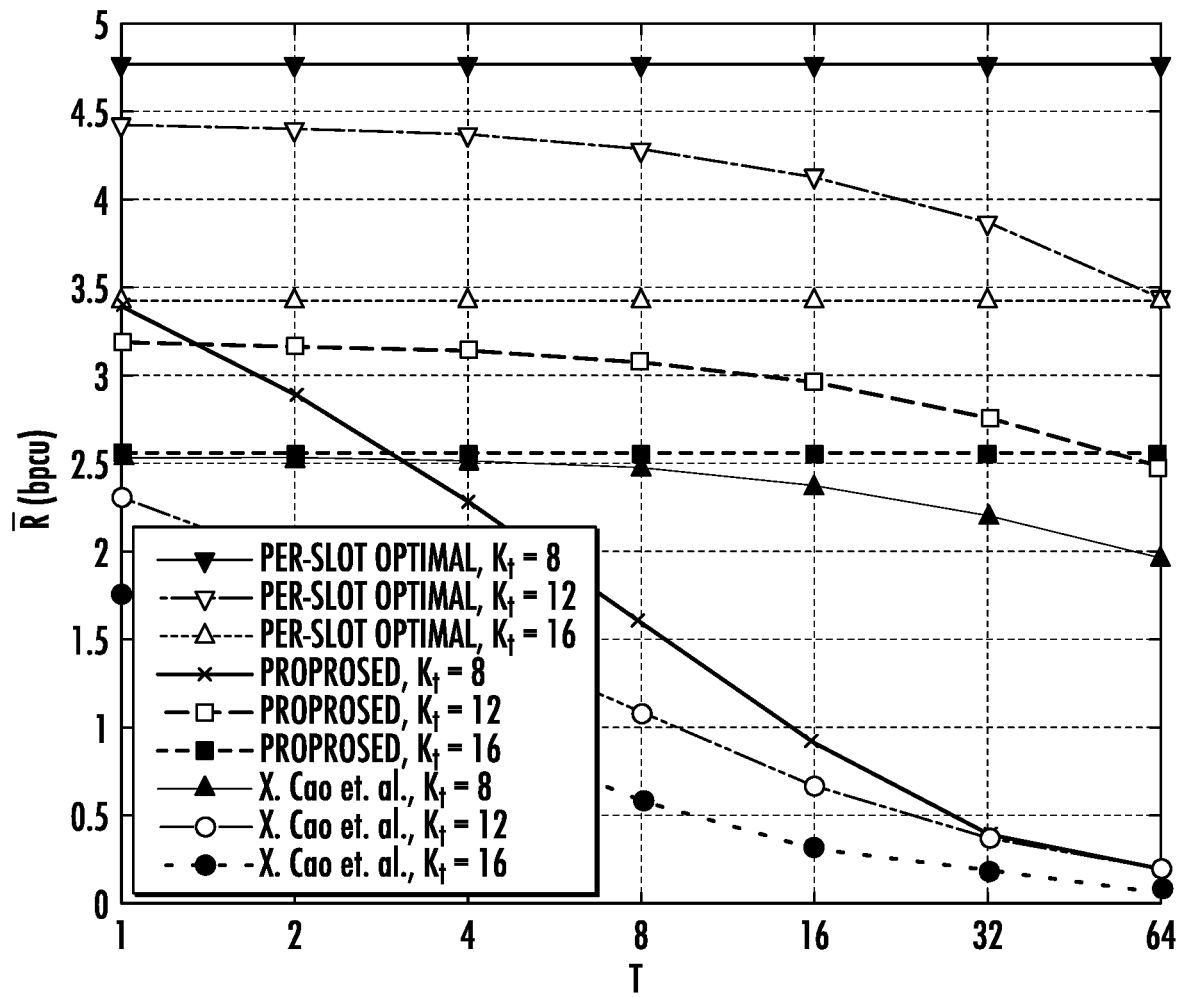
FIG. 7 illustrates $\overline{R}$ vs. τ with different τ with $N_c=32$ and different values of $K_c$.

FIG. 6 illustrates $\bar{R}$ vs. $\tau$ with different $\tau$ with $K_c=8$ and different values of $N_c$. FIG. 7 illustrates $\bar{R}$ vs. $\tau$ with different $\tau$ with $N_c=32$ and different values of $K_c$.

The impact of the number of antennas $N_c$ and the number of users $K_c$ on the system performance of embodiments of the precoding scheme in FIGS. 6 and 7, respectively, is considered. The online precoding solution is tolerant to the CSI delay compared to some known solutions. As the number of antennas increases, the performance gap between the disclosed online precoding solution and the online optimal precoding solution shrinks, indicating the advantage of coordinated multi-cell WNV in massive MIMO systems.

As the number of users increases, the system performance yielded by the disclosed online precoding solution becomes closer to the upper bound generated by the online optimal precoding solution. Therefore, the disclosed coordinated MIMO WNV scheme is readily applied to high-density wireless networks.

Online Network Resource Allocation

In some embodiments, another example on how the disclosed OCO algorithm can be applied to solve a general problem of online network resource allocation in wired or wireless networks is illustrated. These embodiments demonstrate the performance advantages of the disclosed OCO algorithm over the state-of-the-art alternative.

Network Resource Allocation

Consider a general network consists of J scheduling nodes and K processing nodes. For example, in a wired network, the scheduling nodes may be routers, and the processing nodes may be destination nodes. In a wireless network, the scheduling nodes may be relays, and the processing nodes may be sink nodes. In a cloud computing network, the scheduling nodes may be mappers and the processing nodes may be data centers.

Let $\mathcal{J} = \{1, \ldots, J\}$ and $\mathcal{K} = \{1, \ldots K\}$. At each time (timeslot) t, the amount of data arriving at scheduling node j is denoted by $$d_t^j,$$

and the overall data arrival vector is denoted by $$d_t \triangleq [d_t^1, \ldots, d_t^J, 0_{1 \times K}]^T.$$

The unit of $d_t$ depends on the context of the network and can be bits, kilobits, packets or other units. After receiving $d_t$, the scheduling nodes communicate the data requests to a central controller, which then decides the transmission rate $$y_t^{jk}$$

of the link between scheduling node j and processing node k, and the processing rate $$z_t^k$$

at processing node k. In compact form, the decision vector made by the central controller at time t is $$x_t \triangleq [y_t^{11}, \ldots, y_t^{JK}, z_t^1, \ldots, z_t^K]^T$$

(e.g., in bits/slot). The maximum transmission rate of the link connecting scheduling node j and processing node k is $$y_{max}^{jk}$$

and the maximum data processing rate of processing node k is $$z_{max}^k.$$

The transmission rate limits are compactly expressed in the convex set as $\mathcal{X}_0 \triangleq \{x, 0 \leqslant x \leqslant x_{max}\}$, where $$x_{max} \triangleq [y_{max}^{11}, \ldots, y_{max}^{JK}, z_{max}^1, \ldots, z_{max}^K]^T$$

is the maximum rate vector. The data queue backlogs at scheduling node j and processing node k are denoted by $$q_t^j$$

and $$q_t^{J+k},$$

respectively. The queue backlog vector at time t in compact form is $$q_t \triangleq [q_t^1, \ldots, q_t^J, q_t^{J+1}, \ldots, q_t^{J+K}]^T.$$

Figure 8:
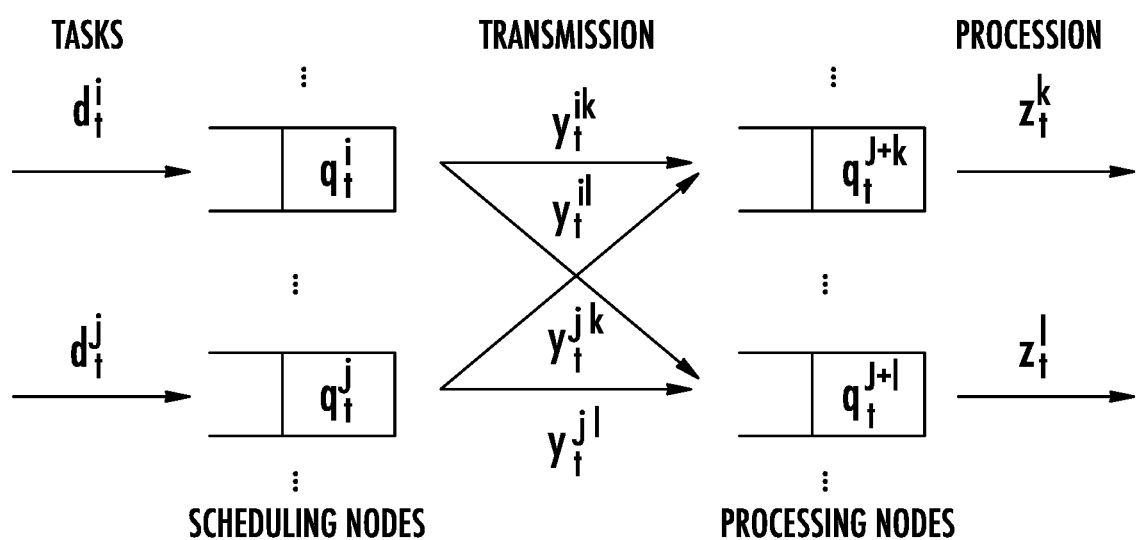
FIG. 8 is a system diagram of online network resource allocation.

The system diagram of online network resource allocation is shown in FIG. 8.

A goal is to minimize the network cost while controlling the long-term averaged data outgoing rate to be no less than the incoming data rate for queue stability. As an example, in the following, both the data transmission and processing costs are defined by the following quadratic cost function at time t as:

$$f_t(x_t) = \sum_{j \in \mathcal{J}} \sum_{k \in \mathcal{K}} \theta_t^{jk} (y_t^{jk})^2 + \sum_{k \in \mathcal{K}} \varsigma_t^k (z_t^k)^2 = x_t^T \Lambda_t x_t \quad (40)$$

where $$\theta_t^{jk}$$

and $$\varsigma_t^k$$

are the time-varying pricing parameters of data transmission and processing, and $$\Lambda_t \triangleq \text{diag}\{\theta_t^{11}, \ldots, \theta_t^{JK}, \varsigma_t^1, \ldots, \varsigma_t^K\}$$

is the pricing vector in compact form. The pricing vector $\Lambda_t$ is also communicated to the central controller for decision update and is time-varying due to the fluctuations of channel quality, energy cost and so on. Some embodiments of the OCO solution can be applied to scenarios with a more general cost function, as long as it is convex with respect to the decision variables $x_t$.

The network resource allocation problem is formulated as $$\min_{\{x_t\} \in \mathcal{X}_0} \sum_{t=1}^{T} f_t(x_t) \qquad \text{P8}$$

$$\text{s.t.} \sum_{t=1}^{T} g_t(x_t) \leq 0$$

where $g_t(x_t) = Cx_t + d_t$ represents the difference between incoming and outgoing data at time slot t and $$C = \begin{bmatrix} -1_{1 \times K} & & & 0_{J \times K} \\ & \ddots & & \\ & & -1_{1 \times K} & \\ I_{K \times K} & \cdots & I_{K \times K} & -I_{K \times K} \end{bmatrix}_{(J+K) \times (JK+K)}. \qquad (41)$$

The general network resource allocation problem has been studied in the stochastic setting with the current network information and the standard OCO setting with one-time-slot delayed feedback information. Note that the stochastic optimization based algorithm require the time-varying network parameters to be independent and identically distributed (i.i.d.) or Markovian. Furthermore, due to the intermittence and crowdedness of the communication links between the nodes and central controller, it is very likely that the central controller experience multiple-time-slot feedback delays of the data tasks and network prices. Different from existing solutions, an online solution is disclosed herein that is based on τ-time-slot delayed network parameters that can vary arbitrarily over time.

P8 is in the standard constrained OCO form as P1. Note that the constraint function $g_t(x)$ is not separable, which does not allow Algorithm 1, or any existing time-varying constrained OCO algorithms, from being implemented in a fully-distributed manner.

Leveraging the disclosed Algorithm 1, the following online solution to P8 based on the delayed data vector $d_{t-\tau}$ and the pricing vector $\Lambda_{t-\tau}$, is disclosed, where τ is the amount of information delay.

At each time t, the per-slot problem is solved:

$$P9: \min_{x \in \mathcal{X}_0} (2\Lambda_{t-\tau} x_{t-\tau})^T (x - x_{t-\tau}) + \alpha \|x - x_{t-\tau}\|_2^2 +$$

$$(Q_{t-1} + Cx_{t-1} + d_{t-\tau-1})^T (Cx + d_{t-\tau}) + \eta \|x - x_{t-1}\|_2^2$$

where $$Q_t \triangleq [Q_t^1, \ldots, Q_t^J, Q_t^{J+1}, \ldots, Q_t^{J+K}]^T$$

is the virtual queue for the time-varying long-term constraint. Further, these is a closed-form solution to P9, where the data transmission rate between scheduling node j and processing node k is given by:

$$y_t^{jk} = \left[ \frac{1}{2(\alpha + \eta)} \left( 2(\alpha - \theta_{t-\tau}^{jk}) y_{t-\tau}^{jk} + 2\eta y_{t-1}^{jk} - \right. \right. \qquad (42)$$

$$\left. \left. \sum_{k' \in \mathcal{K}} y_{t-1}^{jk'} + d_{t-\tau-1}^{j} + Q_{t-1}^{j} - \sum_{j' \in \mathcal{J}} y_{t-1}^{j'k} + z_{t-1}^{k} - Q_{t-1}^{J+k} \right) \right]_0^{y_{max}^{jk}}$$

and a closed-form solution for the data processing rate at processing node k is given by:

$$z_t^k = \left[ \frac{1}{2(\alpha + \eta)} \left( 2(\alpha - \varsigma_{t-\tau}^k) z_{t-\tau}^k + (2\eta - 1) z_{t-1}^k + \sum_{j \in \mathcal{J}} y_{t-1}^{jk} + Q_t^{J+k} \right) \right]_0^{z_{max}^k} \qquad (43)$$

where $$[x]_a^b = \min\{b, \max\{x, a\}\}.$$

In each time slot, the virtual queue is updated at each scheduling node j as:

$$Q_t^j = \max \left\{ \sum_{k \in \mathcal{K}} y_t^{jk} + d_{t-\tau}^j, Q_{t-1}^j - \sum_{k \in \mathcal{K}} y_t^{jk} + d_{t-\tau}^j \right\} \qquad (44)$$

and at each processing node k as:

$$Q_t^{J+k} = \max \left\{ -\sum_{j \in \mathcal{J}} y_t^{jk} + z_t^k, \, Q_{t-1}^{J+k} + \sum_{j \in \mathcal{J}} y_t^{jk} - z_t^k \right\}. \qquad (45)$$

Simulation Results

In some embodiments, a cloud computing network consists of J=10 mapping nodes and K=10 data centers. Assume $$y_{max}^{jk} \sim \mathcal{U}(10, 100), \forall j \in \mathcal{J}, \forall k \in \mathcal{K}$$

and $$z_{max}^k \sim \mathcal{U}(50, 500), \forall k \in \mathcal{K}.$$

The performance metrics are the time-averaged cost of the network given by:

$$\bar{f}(T) = \frac{1}{T} \sum_{t=1}^{T} f_t(x_t) \qquad (46)$$

and the time-averaged data queue backlog given by:

$$\bar{g}(T) = \frac{1}{T(U+K)} \sum_{t=1}^{T} \sum_{l=1}^{J+K} g_t^l(x_t). \qquad (47)$$

For performance comparison, the system performance achieved by the online optimal solution is plotted, the offline solution given by:

$$x^\circ \triangleq \operatorname{argmin}_{x \in X_0}\left\{\sum_{t=1}^T f_t(x_t) \mid \sum_{t=1}^T g_t(x_t) \preceq 0, \forall\, t\right\} \quad (48)$$

and the one yielded, which may be a best known time-varying constrained OCO algorithm than accommodates feedback delays. Note that different from (2), the constraint function does not need to be satisfied at each time slot in (48). Therefore, the offline solution in (48) can achieve a lower network cost compared with the one in (2). We set $$\alpha = \tau^{-\frac{1}{2}} T^{\frac{1}{2}}, \eta = \|C\|_2^2$$

as the algorithm parameters. For fair comparison, the step sizes is selected such that it has a steady state value of $\bar{g}(T)$ similar to the algorithm disclosed herein. The time-varying system parameters $$\{d_t^j\}, \{\theta_t^{jk}\}, \text{ and } \{\varsigma_t^k\}$$

are updated in the following three cases (note that one can relate the normalized unit to practical network prices)

I.i.d. parameters: The system parameters are i.i.d. at each time slot t as follows:

$$d_t^j \sim \mathcal{U}(50, 150), \forall\, j \in \mathcal{J},$$

$$\theta_t^{jk} \sim \mathcal{U}(0.1, 1), \forall\, j \in \mathcal{J}, \forall\, k \in \mathcal{K},$$

$$\varsigma_t^k \sim \mathcal{U}(1, 10), \forall\, k \in \mathcal{K}.$$

Markovian parameters: The system parameters vary in a Markovian manner as follows:

$$d_t^j = \left[d_{t-1}^j + t^{-\frac{1}{4}} e_t^{j,d}\right]^+, \forall\, j \in \mathcal{J},$$

$$\theta_t^{jk} \left[\theta_{t-1}^{jk} + t^{-\frac{1}{4}} e_t^{jk,\theta}\right]^+, \forall\, j \in \mathcal{J}, \forall\, k \in \mathcal{K},$$

$$\varsigma_t^k = \left[\varsigma_{t-1}^k + t^{-\frac{1}{4}} e_t^{k,\varsigma}\right]^+, \forall\, k \in \mathcal{K}$$

where $$e_t^{j,d} \sim \mathcal{U}(-10, 10), e_t^{jk,\theta} \sim \mathcal{U}(0.1, 0.1), \text{ and } e_t^{k,\varsigma} \sim \mathcal{U}(-1, 1).$$

The initial parameters are generated as $$d_1^j \sim \mathcal{U}(50, 150), \theta_1^{jk} \sim \mathcal{U}(0.1, 1), \text{ and } \varsigma_1^k \sim \mathcal{U}(1, 10).$$

Noisy periodic parameters: The system parameters vary in a periodic manner as follows:

$$d_t^j = 50\sin\left(\frac{\pi t}{20}\right) + n_t^{j,d}, \forall\, j \in \mathcal{J},$$

$$\theta_t^{jk} = 0.1\sin\left(\frac{\pi t}{20}\right) + n_t^{jk,\theta}, \forall\, j \in \mathcal{J}, k \in \mathcal{K},$$

$$\varsigma_t^k = 1\sin\left(\frac{\pi t}{20}\right) + n_t^{k,\varsigma}, \forall\, k \in \mathcal{K}$$

where $$n_t^{j,d} \sim \mathcal{U}(99, 101), n_t^{jk,\theta} \sim \mathcal{U}(0.2, 0.9), \text{ and } n_t^{k,\varsigma} \sim \mathcal{U}(2, 9).$$

Figure 9:
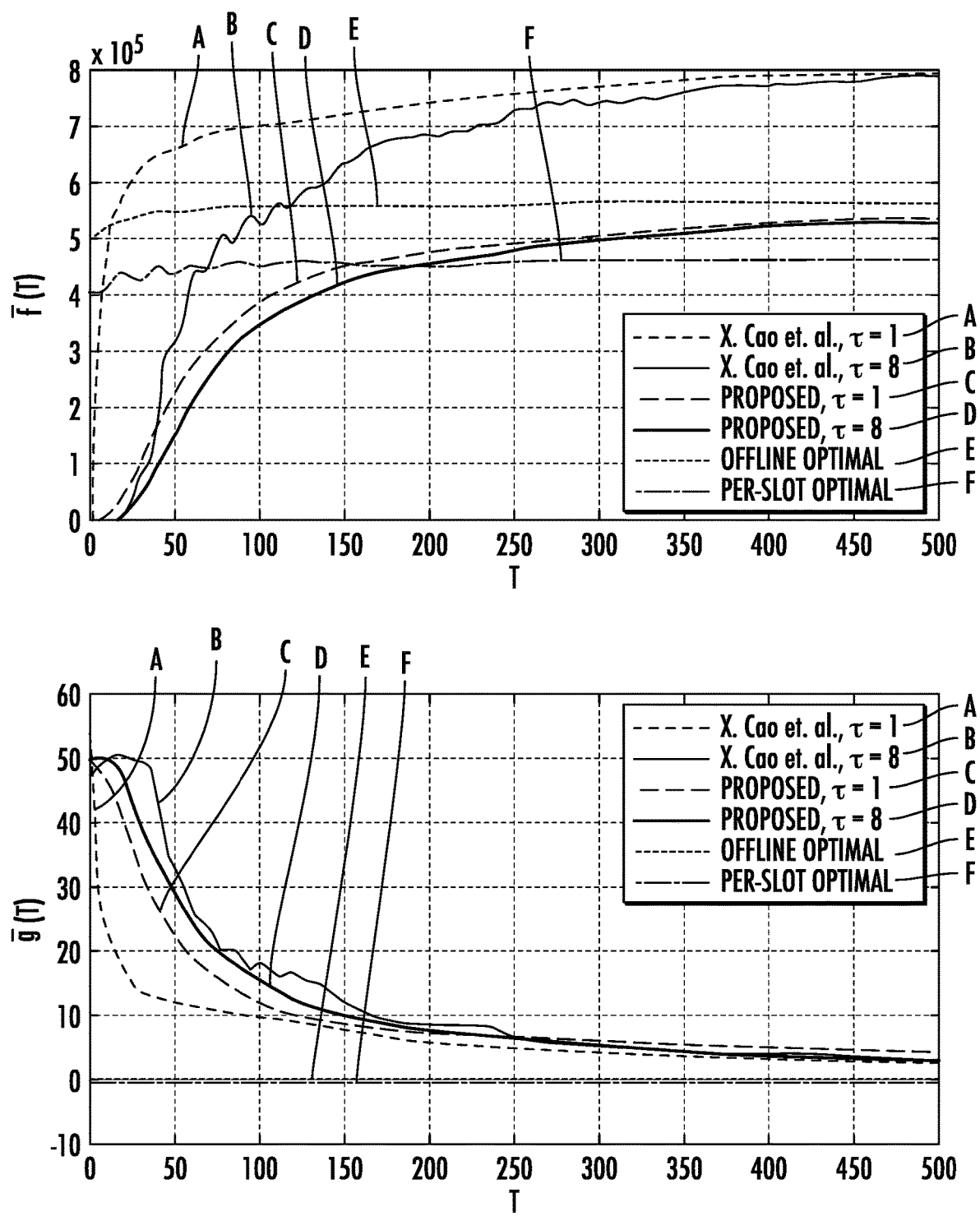
FIG. 9 illustrates $\bar{f}(T)$ and $\bar{g}(T)$ vs. T for a first example case.
Figure 10:
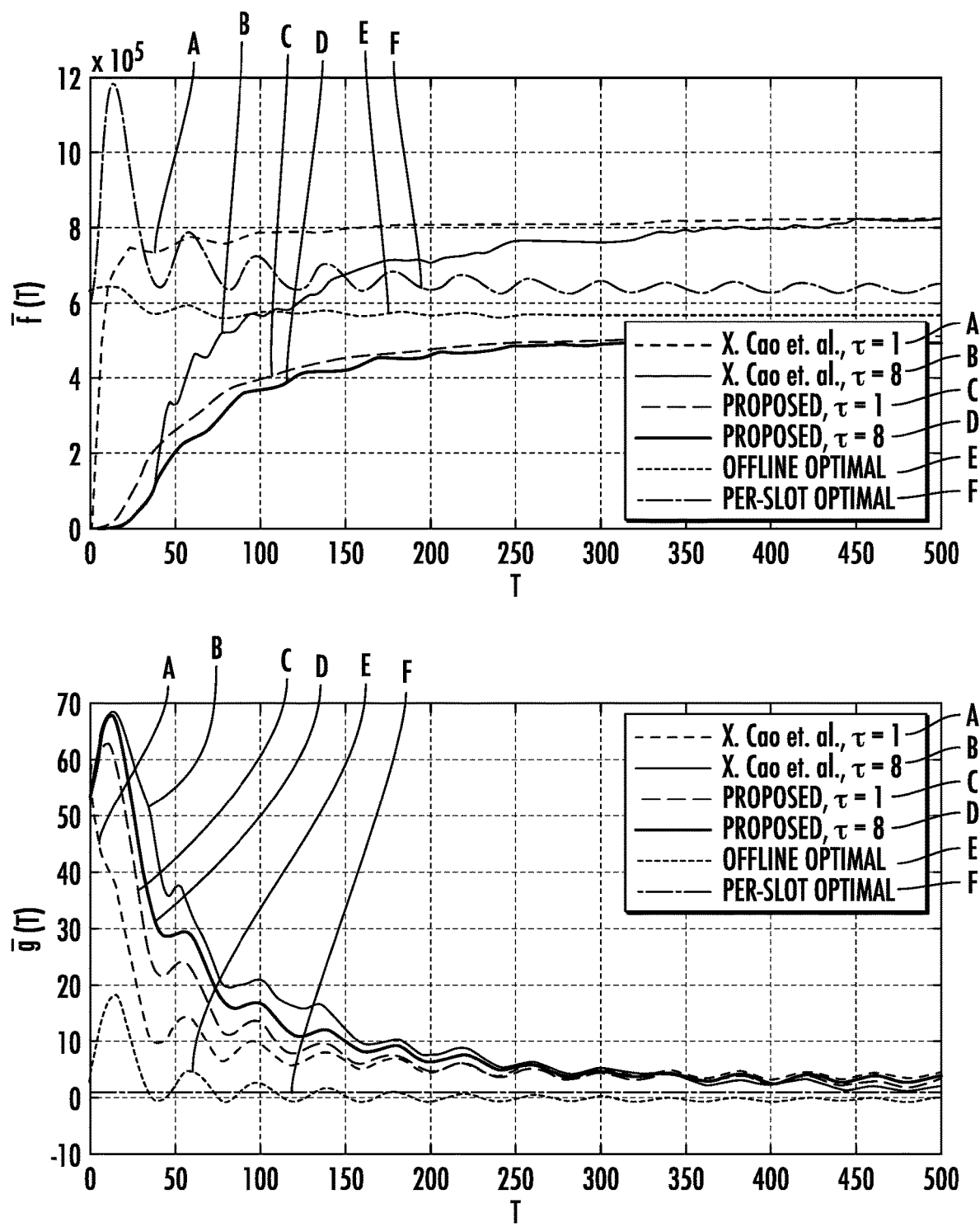
FIG. 10 illustrates $\bar{f}(T)$ and $\bar{g}(T)$ vs. T for a second example case.
Figure 11:
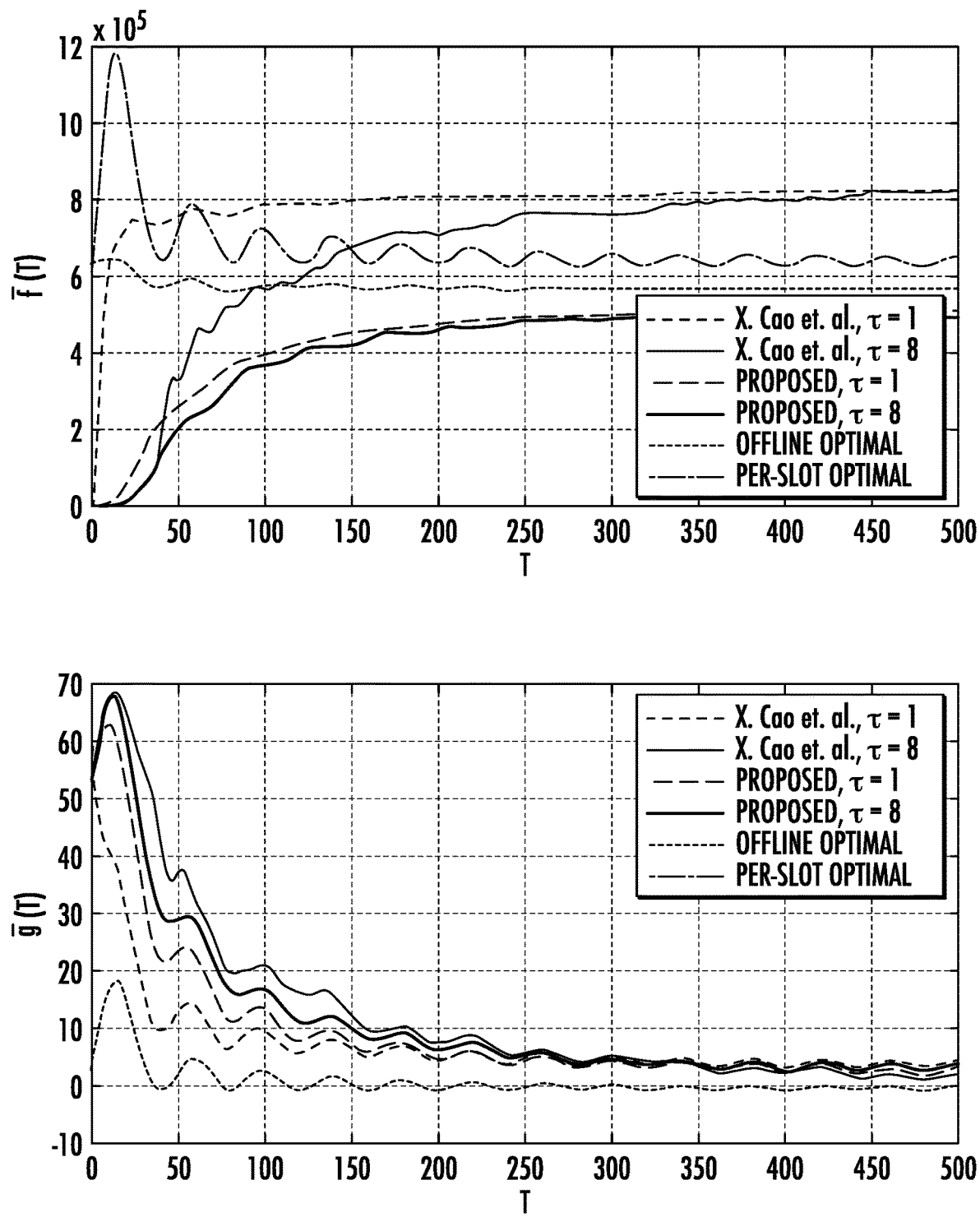
FIG. 11 illustrates $\bar{f}(T)$ and $\bar{g}(T)$ vs. T for a third example case.

FIG. 9 illustrates $\bar{f}(T)$ and $\bar{g}(T)$ vs. T for case 1.
FIG. 10 illustrates $\bar{f}(T)$ and $\bar{g}(T)$ vs. T for case 2.
FIG. 11 illustrates $\bar{f}(T)$ and $\bar{g}(T)$ vs. T for case 3.

FIGS. 9-11 show $\bar{f}(T)$ and $\bar{g}(T)$ versus T with different values of $\tau$ for the three cases. The network cost yielded by the disclosed online solution is very close to and even better than the one achieved by the online optimal solution in (4). This is because, the online optimal solution needs to satisfy the per-slot constraint at each time slot, while the disclosed online solution solves a relaxed problem P9 that only requires the queue backlogs to be cleared in the long-run.

Figure 12:
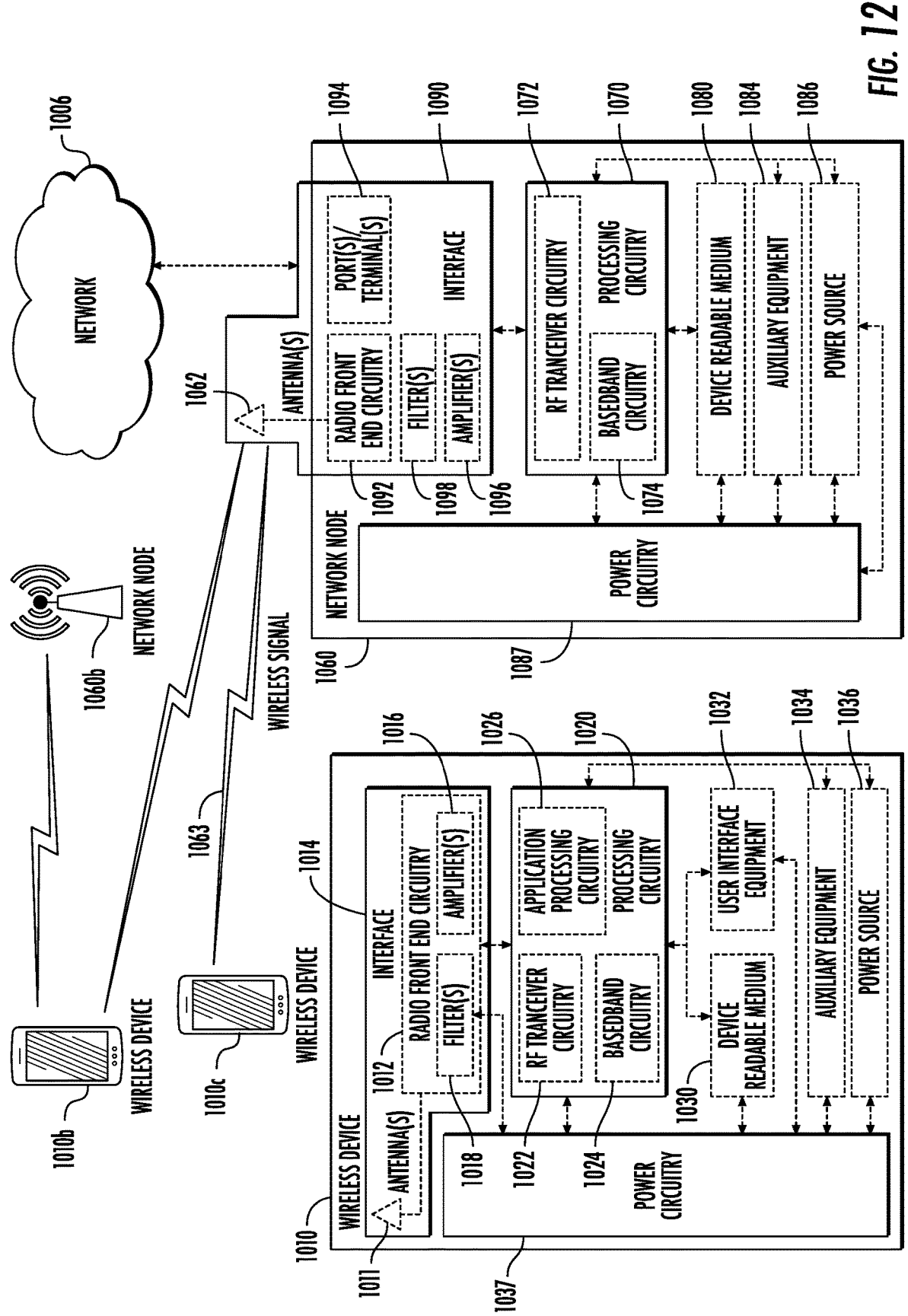
FIG. 12 illustrates a wireless network in accordance with some embodiments.

FIG. 12 illustrates a wireless network in accordance with some embodiments. Although the subject matter described herein may be implemented in any appropriate type of system using any suitable components, the embodiments disclosed herein are described in relation to a wireless network, such as the example wireless network illustrated in FIG. 12. For simplicity, the wireless network of FIG. 12 only depicts network 1006, network nodes 1060 and 1060b, and WDs 1010, 1010b, and 1010c. In practice, a wireless network may further include any additional elements suitable to support communication between wireless devices or between a wireless device and another communication device, such as a landline telephone, a service provider, or any other network node or end device. Of the illustrated components, network node 1060 and wireless device (WD) 1010 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1006 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1060 and WD 1010 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 12, network node 1060 includes processing circuitry 1070, device readable medium 1080, interface 1090, auxiliary equipment 1084, power source 1086, power circuitry 1087, and antenna 1062. Although network node 1060 illustrated in the example wireless network of FIG. 12 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 1060 are depicted as single boxes located within a larger box, or nested within multiple boxes, in practice, a network node may comprise multiple different physical components that make up a single illustrated component (e.g., device readable medium 1080 may comprise multiple separate hard drives as well as multiple RAM modules).

Similarly, network node 1060 may be composed of multiple physically separate components (e.g., a NodeB component and a RNC component, or a BTS component and a BSC component, etc.), which may each have their own respective components. In certain scenarios in which network node 1060 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 1060 may be configured to support multiple radio access technologies (RATs). In such embodiments, some components may be duplicated (e.g., separate device readable medium 1080 for the different RATs) and some components may be reused (e.g., the same antenna 1062 may be shared by the RATs). Network node 1060 may also include multiple sets of the various illustrated components for different wireless technologies integrated into network node 1060, such as, for example, GSM, WCDMA, LTE, NR, Wi-Fi, or Bluetooth wireless technologies. These wireless technologies may be integrated into the same or different chip or set of chips and other components within network node 1060.

Processing circuitry 1070 is configured to perform any determining, calculating, or similar operations (e.g., certain obtaining operations) described herein as being provided by a network node. These operations performed by processing circuitry 1070 may include processing information obtained by processing circuitry 1070 by, for example, converting the obtained information into other information, comparing the obtained information or converted information to information stored in the network node, and/or performing one or more operations based on the obtained information or converted information, and as a result of said processing making a determination.

Processing circuitry 1070 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1060 components, such as device readable medium 1080, network node 1060 functionality. For example, processing circuitry 1070 may execute instructions stored in device readable medium 1080 or in memory within processing circuitry 1070. Such functionality may include providing any of the various wireless features, functions, or benefits discussed herein. In some embodiments, processing circuitry 1070 may include a system on a chip (SOC).

In some embodiments, processing circuitry 1070 may include one or more of radio frequency (RF) transceiver circuitry 1072 and baseband processing circuitry 1074. In some embodiments, radio frequency (RF) transceiver circuitry 1072 and baseband processing circuitry 1074 may be on separate chips (or sets of chips), boards, or units, such as radio units and digital units. In alternative embodiments, part or all of RF transceiver circuitry 1072 and baseband processing circuitry 1074 may be on the same chip or set of chips, boards, or units In certain embodiments, some or all of the functionality described herein as being provided by a network node, base station, eNB or other such network device may be performed by processing circuitry 1070 executing instructions stored on device readable medium 1080 or memory within processing circuitry 1070. In alternative embodiments, some or all of the functionality may be provided by processing circuitry 1070 without executing instructions stored on a separate or discrete device readable medium, such as in a hard-wired manner. In any of those embodiments, whether executing instructions stored on a device readable storage medium or not, processing circuitry 1070 can be configured to perform the described functionality. The benefits provided by such functionality are not limited to processing circuitry 1070 alone or to other components of network node 1060, but are enjoyed by network node 1060 as a whole, and/or by end users and the wireless network generally.

Device readable medium 1080 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1070. Device readable medium 1080 may store any suitable instructions, data or information, including a computer program, software, an application including one or more of logic, rules, code, tables, etc. and/or other instructions capable of being executed by processing circuitry 1070 and, utilized by network node 1060. Device readable medium 1080 may be used to store any calculations made by processing circuitry 1070 and/or any data received via interface 1090. In some embodiments, processing circuitry 1070 and device readable medium 1080 may be considered to be integrated.

Interface 1090 is used in the wired or wireless communication of signalling and/or data between network node 1060, network 1006, and/or WDs 1010. As illustrated, interface 1090 comprises port(s)/terminal(s) 1094 to send and receive data, for example to and from network 1006 over a wired connection. Interface 1090 also includes radio front end circuitry 1092 that may be coupled to, or in certain embodiments a part of, antenna 1062. Radio front end circuitry 1092 comprises filters 1098 and amplifiers 1096. Radio front end circuitry 1092 may be connected to antenna 1062 and processing circuitry 1070. Radio front end circuitry may be configured to condition signals communicated between antenna 1062 and processing circuitry 1070. Radio front end circuitry 1092 may receive digital data that is to be sent out to other network nodes or WDs via a wireless connection. Radio front end circuitry 1092 may convert the digital data into a radio signal having the appropriate channel and bandwidth parameters using a combination of filters 1098 and/or amplifiers 1096. The radio signal may then be transmitted via antenna 1062 via a wireless signal 1063 (over the air (OTA)). Similarly, when receiving data, antenna 1062 may collect radio signals which are then converted into digital data by radio front end circuitry 1092. The digital data may be passed to processing circuitry 1070. In other embodiments, the interface may comprise different components and/or different combinations of components.

In certain alternative embodiments, network node 1060 may not include separate radio front end circuitry 1092, instead, processing circuitry 1070 may comprise radio front end circuitry and may be connected to antenna 1062 without separate radio front end circuitry 1092. Similarly, in some embodiments, all or some of RF transceiver circuitry 1072 may be considered a part of interface 1090. In still other embodiments, interface 1090 may include one or more ports or terminals 1094, radio front end circuitry 1092, and RF transceiver circuitry 1072, as part of a radio unit (not shown), and interface 1090 may communicate with baseband processing circuitry 1074, which is part of a digital unit (not shown).

Antenna 1062 may include one or more antennas, or antenna arrays, configured to send and/or receive wireless signals. Antenna 1062 may be coupled to radio front end circuitry 1092 and may be any type of antenna capable of transmitting and receiving data and/or signals wirelessly. In some embodiments, antenna 1062 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 1062 may be separate from network node 1060 and may be connectable to network node 1060 through an interface or port.

Antenna 1062, interface 1090, and/or processing circuitry 1070 may be configured to perform any receiving operations and/or certain obtaining operations described herein as being performed by a network node. Any information, data and/or signals may be received from a wireless device, another network node and/or any other network equipment. Similarly, antenna 1062, interface 1090, and/or processing circuitry 1070 may be configured to perform any transmitting operations described herein as being performed by a network node. Any information, data and/or signals may be transmitted to a wireless device, another network node and/or any other network equipment.

Power circuitry 1087 may comprise, or be coupled to, power management circuitry and is configured to supply the components of network node 1060 with power for performing the functionality described herein. Power circuitry 1087 may receive power from power source 1086. Power source 1086 and/or power circuitry 1087 may be configured to provide power to the various components of network node 1060 in a form suitable for the respective components (e.g., at a voltage and current level needed for each respective component). Power source 1086 may either be included in, or external to, power circuitry 1087 and/or network node 1060. For example, network node 1060 may be connectable to an external power source (e.g., an electricity outlet) via an input circuitry or interface such as an electrical cable, whereby the external power source supplies power to power circuitry 1087. As a further example, power source 1086 may comprise a source of power in the form of a battery or battery pack which is connected to, or integrated in, power circuitry 1087. The battery may provide backup power should the external power source fail. Other types of power sources, such as photovoltaic devices, may also be used.

Alternative embodiments of network node 1060 may include additional components beyond those shown in FIG. 12 that may be responsible for providing certain aspects of the network node's functionality, including any of the functionality described herein and/or any functionality necessary to support the subject matter described herein. For example, network node 1060 may include user interface equipment to allow input of information into network node 1060 and to allow output of information from network node 1060. This may allow a user to perform diagnostic, maintenance, repair, and other administrative functions for network node 1060.

As used herein, wireless device (WD) 1010 refers to a device capable, configured, arranged and/or operable to communicate wirelessly with network nodes 1060 and/or other wireless devices 1010. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD 1010 may be configured to transmit and/or receive information without direct human interaction. For instance, a WD 1010 may be designed to transmit information to a network on a predetermined schedule, when triggered by an internal or external event, or in response to requests from the network. Examples of a WD 1010 include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), a vehicle-mounted wireless terminal device, etc. A WD 1010 may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD 1010 may represent a machine or other device that performs monitoring and/or measurements, and transmits the results of such monitoring and/or measurements to another WD 1010 and/or a network node. The WD 1010 may in this case be a machine-to-machine (M2M) device, which may in a 3GPP context be referred to as an MTC device. As one particular example, the WD 1010 may be a WD implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD 1010 may represent a vehicle or other equipment that is capable of monitoring and/or reporting on its operational status or other functions associated with its operation. A WD 1010 as described above may represent the endpoint of a wireless connection, in which case the device may be referred to as a wireless terminal. Furthermore, a WD 1010 as described above may be mobile, in which case it may also be referred to as a mobile device or a mobile terminal.

As illustrated, wireless device 1010 includes antenna 1011, radio front end circuitry 1014, processing circuitry 1020, device readable medium 1030, user interface equipment 1032, auxiliary equipment 1034, power source 1036 and power circuitry 1037. WD 1010 may include multiple sets of one or more of the illustrated components for different wireless technologies supported by WD 1010, such as, for example, GSM, WCDMA, LTE, NR, Wi-Fi, WiMAX, or Bluetooth wireless technologies, just to mention a few. These wireless technologies may be integrated into the same or different chips or set of chips as other components within WD 1010.

Antenna 1011 may include one or more antennas or antenna arrays, configured to send and/or receive wireless signals, and is connected to radio front end circuitry 1014. In certain alternative embodiments, antenna 1011 may be separate from WD 1010 and be connectable to WD 1010 through an interface or port. Antenna 1011, radio front end circuitry 1014, and/or processing circuitry 1020 may be configured to perform any receiving or transmitting operations described herein as being performed by a WD 1010. Any information, data and/or signals may be received from a network node and/or another WD 1010. In some embodiments, radio front end circuitry and/or antenna 1011 may be considered an interface.

As illustrated, radio front end circuitry 1014 comprises radio front end circuitry 1012 and antenna 1011. Radio front end circuitry 1012 comprise one or more filters 1018 and amplifiers 1016. Radio front end circuitry 1014 is connected to antenna 1011 and processing circuitry 1020, and is configured to condition signals communicated between antenna 1011 and processing circuitry 1020. Radio front end circuitry 1012 may be coupled to or a part of antenna 1011. In some embodiments, WD 1010 may not include separate radio front end circuitry 1012; rather, processing circuitry 1020 may comprise radio front end circuitry and may be connected to antenna 1011. Similarly, in some embodiments, some or all of RF transceiver circuitry 1022 may be considered a part of radio front end circuitry 1014. Radio front end circuitry 1012 may receive digital data that is to be sent out to other network nodes or WDs via a wireless connection. Radio front end circuitry 1012 may convert the digital data into a radio signal having the appropriate channel and bandwidth parameters using a combination of filters 1018 and/or amplifiers 1016. The radio signal may then be transmitted via antenna 1011. Similarly, when receiving data, antenna 1011 may collect radio signals which are then converted into digital data by radio front end circuitry 1012. The digital data may be passed to processing circuitry 1020. In other embodiments, the interface may comprise different components and/or different combinations of components.

Processing circuitry 1020 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1010 components, such as device readable medium 1030, WD 1010 functionality. Such functionality may include providing any of the various wireless features or benefits discussed herein. For example, processing circuitry 1020 may execute instructions stored in device readable medium 1030 or in memory within processing circuitry 1020 to provide the functionality disclosed herein.

As illustrated, processing circuitry 1020 includes one or more of RF transceiver circuitry 1022, baseband processing circuitry 1024, and application processing circuitry 1026. In other embodiments, the processing circuitry may comprise different components and/or different combinations of components. In certain embodiments, processing circuitry 1020 of WD 1010 may comprise a system on a chip (SOC). In some embodiments, RF transceiver circuitry 1022, baseband processing circuitry 1024, and application processing circuitry 1026 may be on separate chips or sets of chips. In alternative embodiments, part or all of baseband processing circuitry 1024 and application processing circuitry 1026 may be combined into one chip or set of chips, and RF transceiver circuitry 1022 may be on a separate chip or set of chips. In still alternative embodiments, part or all of RF transceiver circuitry 1022 and baseband processing circuitry 1024 may be on the same chip or set of chips, and application processing circuitry 1026 may be on a separate chip or set of chips. In yet other alternative embodiments, part or all of RF transceiver circuitry 1022, baseband processing circuitry 1024, and application processing circuitry 1026 may be combined in the same chip or set of chips. In some embodiments, RF transceiver circuitry 1022 may be a part of radio front end circuitry 1014. RF transceiver circuitry 1022 may condition RF signals for processing circuitry 1020.

In certain embodiments, some or all of the functionality described herein as being performed by a WD may be provided by processing circuitry 1020 executing instructions stored on device readable medium 1030, which in certain embodiments may be a computer-readable storage medium. In alternative embodiments, some or all of the functionality may be provided by processing circuitry 1020 without executing instructions stored on a separate or discrete device readable storage medium, such as in a hard-wired manner. In any of those particular embodiments, whether executing instructions stored on a device readable storage medium or not, processing circuitry 1020 can be configured to perform the described functionality. The benefits provided by such functionality are not limited to processing circuitry 1020 alone or to other components of WD 1010, but are enjoyed by WD 1010 as a whole, and/or by end users and the wireless network generally.

Processing circuitry 1020 may be configured to perform any determining, calculating, or similar operations (e.g., certain obtaining operations) described herein as being performed by a WD. These operations, as performed by processing circuitry 1020, may include processing information obtained by processing circuitry 1020 by, for example, converting the obtained information into other information, comparing the obtained information or converted information to information stored by WD 1010, and/or performing one or more operations based on the obtained information or converted information, and as a result of said processing making a determination.

Device readable medium 1030 may be operable to store a computer program, software, an application including one or more of logic, rules, code, tables, etc. and/or other instructions capable of being executed by processing circuitry 1020. Device readable medium 1030 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 1020. In some embodiments, processing circuitry 1020 and device readable medium 1030 may be considered to be integrated.

User interface equipment 1032 may provide components that allow for a human user to interact with WD 1010. Such interaction may be of many forms, such as visual, audial, tactile, etc. User interface equipment 1032 may be operable to produce output to the user and to allow the user to provide input to WD 1010. The type of interaction may vary depending on the type of user interface equipment 1032 installed in WD 1010. For example, if WD 1010 is a smart phone, the interaction may be via a touch screen; if WD 1010 is a smart meter, the interaction may be through a screen that provides usage (e.g., the number of gallons used) or a speaker that provides an audible alert (e.g., if smoke is detected). User interface equipment 1032 may include input interfaces, devices and circuits, and output interfaces, devices and circuits. User interface equipment 1032 is configured to allow input of information into WD 1010, and is connected to processing circuitry 1020 to allow processing circuitry 1020 to process the input information. User interface equipment 1032 may include, for example, a microphone, a proximity or other sensor, keys/buttons, a touch display, one or more cameras, a USB port, or other input circuitry. User interface equipment 1032 is also configured to allow output of information from WD 1010, and to allow processing circuitry 1020 to output information from WD 1010. User interface equipment 1032 may include, for example, a speaker, a display, vibrating circuitry, a USB port, a headphone interface, or other output circuitry. Using one or more input and output interfaces, devices, and circuits, of user interface equipment 1032, WD 1010 may communicate with end users and/or the wireless network, and allow them to benefit from the functionality described herein.

Auxiliary equipment 1034 is operable to provide more specific functionality which may not be generally performed by WDs 1010. This may comprise specialized sensors for doing measurements for various purposes, interfaces for additional types of communication such as wired communications etc. The inclusion and type of components of auxiliary equipment 1034 may vary depending on the embodiment and/or scenario.

Power source 1036 may, in some embodiments, be in the form of a battery or battery pack. Other types of power sources, such as an external power source (e.g., an electricity outlet), photovoltaic devices or power cells, may also be used. WD 1010 may further comprise power circuitry 1037 for delivering power from power source 1036 to the various parts of WD 1010 which need power from power source 1036 to carry out any functionality described or indicated herein. Power circuitry 1037 may in certain embodiments comprise power management circuitry. Power circuitry 1037 may additionally or alternatively be operable to receive power from an external power source; in which case WD 1010 may be connectable to the external power source (such as an electricity outlet) via input circuitry or an interface such as an electrical power cable. Power circuitry 1037 may also in certain embodiments be operable to deliver power from an external power source to power source 1036. This may be, for example, for the charging of power source 1036. Power circuitry 1037 may perform any formatting, converting, or other modification to the power from power source 1036 to make the power suitable for the respective components of WD 1010 to which power is supplied.

Figure 13:
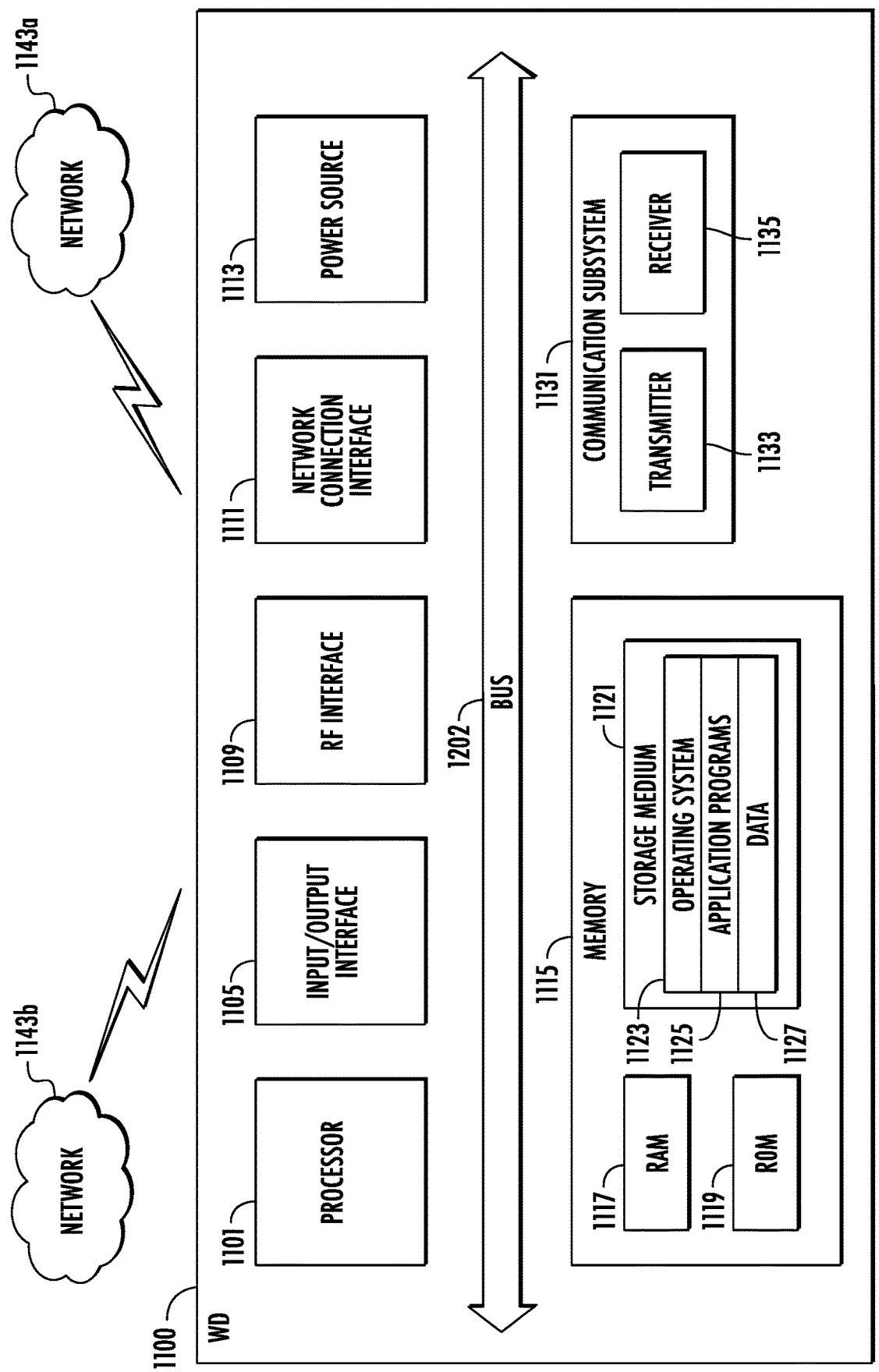
FIG. 13 illustrates one embodiment of a WD in accordance with various aspects described herein.

FIG. 13 illustrates one embodiment of a WD 1100 in accordance with various aspects described herein. As used herein, a user equipment or WD may not necessarily have a user in the sense of a human user who owns and/or operates the relevant device. Instead, a WD may represent a device that is intended for sale to, or operation by, a human user but which may not, or which may not initially, be associated with a specific human user (e.g., a smart sprinkler controller). Alternatively, a WD may represent a device that is not intended for sale to, or operation by, an end user but which may be associated with or operated for the benefit of a user (e.g., a smart power meter). WD 11200 may be any WD identified by the $3^{rd}$ Generation Partnership Project (3GPP), including a NB-IoT WD, a machine type communication (MTC) WD, and/or an enhanced MTC (eMTC) WD. The WD 1100, as illustrated in FIG. 13, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and WD may be used interchangeable. Accordingly, although FIG. 13 is a WD, the components discussed herein are equally applicable to a WD, and vice-versa.

In FIG. 13, the WD 1100 includes processing circuitry 1101 that is operatively coupled to input/output interface 1105, radio frequency (RF) interface 1109, network connection interface 1111, memory 1115 including random access memory (RAM) 1117, read-only memory (ROM) 1119, and storage medium 1121 or the like, communication subsystem 1131, power source 1133, and/or any other component, or any combination thereof. Storage medium 1121 includes operating system 1123, application program 1125, and data file 1127. In other embodiments, storage medium 1121 may include other similar types of information. Certain WDs may utilize all of the components shown in FIG. 13, or only a subset of the components. The level of integration between the components may vary from one WD to another WD. Further, certain WDs may contain multiple instances of a component, such as multiple processors, memories, transceivers, transmitters, receivers, etc.

In FIG. 13, processing circuitry 1101 may be configured to process computer instructions and data. Processing circuitry 1101 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1101 may include two central processing units (CPUs). Data may be information in a form suitable for use by a computer.

In the depicted embodiment, input/output interface 1105 may be configured to provide a communication interface to an input device, output device, or input and output device. WD 1100 may be configured to use an output device via input/output interface 1105. An output device may use the same type of interface port as an input device. For example, a USB port may be used to provide input to and output from WD 1100. The output device may be a speaker, a sound card, a video card, a display, a monitor, a printer, an actuator, an emitter, a smartcard, another output device, or any combination thereof. WD 1100 may be configured to use an input device via input/output interface 1105 to allow a user to capture information into WD 1100. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 13, RF interface 1109 may be configured to provide a communication interface to RF components such as a transmitter, a receiver, and an antenna. Network connection interface 1111 may be configured to provide a communication interface to network 1143a. Network 1143a may encompass wired and/or wireless networks such as a local-area network (LAN), a wide-area network (WAN), a computer network, a wireless network, a telecommunications network, another like network or any combination thereof. For example, network 1143a may comprise a Wi-Fi network. Network connection interface 1111 may be configured to include a receiver and a transmitter interface used to communicate with one or more other devices over a communication network according to one or more communication protocols, such as Ethernet, TCP/IP, SONET, ATM, or the like. Network connection interface 1111 may implement receiver and transmitter functionality appropriate to the communication network links (e.g., optical, electrical, and the like). The transmitter and receiver functions may share circuit components, software or firmware, or alternatively may be implemented separately.

RAM 1117 may be configured to interface via bus 1102 to processing circuitry 1101 to provide storage or caching of data or computer instructions during the execution of software programs such as the operating system, application programs, and device drivers. ROM 1119 may be configured to provide computer instructions or data to processing circuitry 1101. For example, ROM 1119 may be configured to store invariant low-level system code or data for basic system functions such as basic input and output (I/O), startup, or reception of keystrokes from a keyboard that are stored in a non-volatile memory. Storage medium 1121 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1121 may be configured to include operating system 1123, application program 1125 such as a web browser application, a widget or gadget engine or another application, and data file 1127. Storage medium 1121 may store, for use by WD 1100, any of a variety of various operating systems or combinations of operating systems.

Storage medium 1121 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1121 may allow WD 1100 to access computer-executable instructions, application programs or the like, stored on transitory or non-transitory memory media, to off-load data, or to upload data. An article of manufacture, such as one utilizing a communication system may be tangibly embodied in storage medium 1121, which may comprise a device readable medium.

In FIG. 13, processing circuitry 1101 may be configured to communicate with network 1143b using communication subsystem 1131. Network 1143a and network 1143b may be the same network or networks or different network or networks. Communication subsystem 1131 may be configured to include one or more transceivers used to communicate with network 1143b. For example, communication subsystem 1131 may be configured to include one or more transceivers used to communicate with one or more remote transceivers of another device capable of wireless communication such as another WD or base station of a radio access network (RAN) according to one or more communication protocols, such as IEEE 802.11, code division multiple access (CDMA), wideband CDMA (WCDMA), Global System for Mobile communication (GSM), LTE, universal terrestrial radio access network, UTRAN, WiMax, or the like. Each transceiver may include transmitter 1133 and/or receiver 1135 to implement transmitter or receiver functionality, respectively, appropriate to the RAN links (e.g., frequency allocations and the like). Further, transmitter 1133 and receiver 1135 of each transceiver may share circuit components, software or firmware, or alternatively may be implemented separately.

In the illustrated embodiment, the communication functions of communication subsystem 1131 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1131 may include cellular communication, Wi-Fi communication, Bluetooth communication, and GPS communication. Network 1143b may encompass wired and/or wireless networks such as a local-area network (LAN), a wide-area network (WAN), a computer network, a wireless network, a telecommunications network, another like network or any combination thereof. For example, network 1143b may be a cellular network, a Wi-Fi network, and/or a near-field network. Power source 1113 may be configured to provide alternating current (AC) or direct current (DC) power to components of WD 1100.

The features, benefits and/or functions described herein may be implemented in one of the components of WD 1100 or partitioned across multiple components of WD 1100. Further, the features, benefits, and/or functions described herein may be implemented in any combination of hardware, software or firmware. In one example, communication subsystem 1131 may be configured to include any of the components described herein. Further, processing circuitry 1101 may be configured to communicate with any of such components over bus 1102. In another example, any of such components may be represented by program instructions stored in memory that when executed by processing circuitry 1101 perform the corresponding functions described herein. In another example, the functionality of any of such components may be partitioned between processing circuitry 1101 and communication subsystem 1131. In another example, the non-computationally intensive functions of any of such components may be implemented in software or firmware and the computationally intensive functions may be implemented in hardware.

Figure 14:
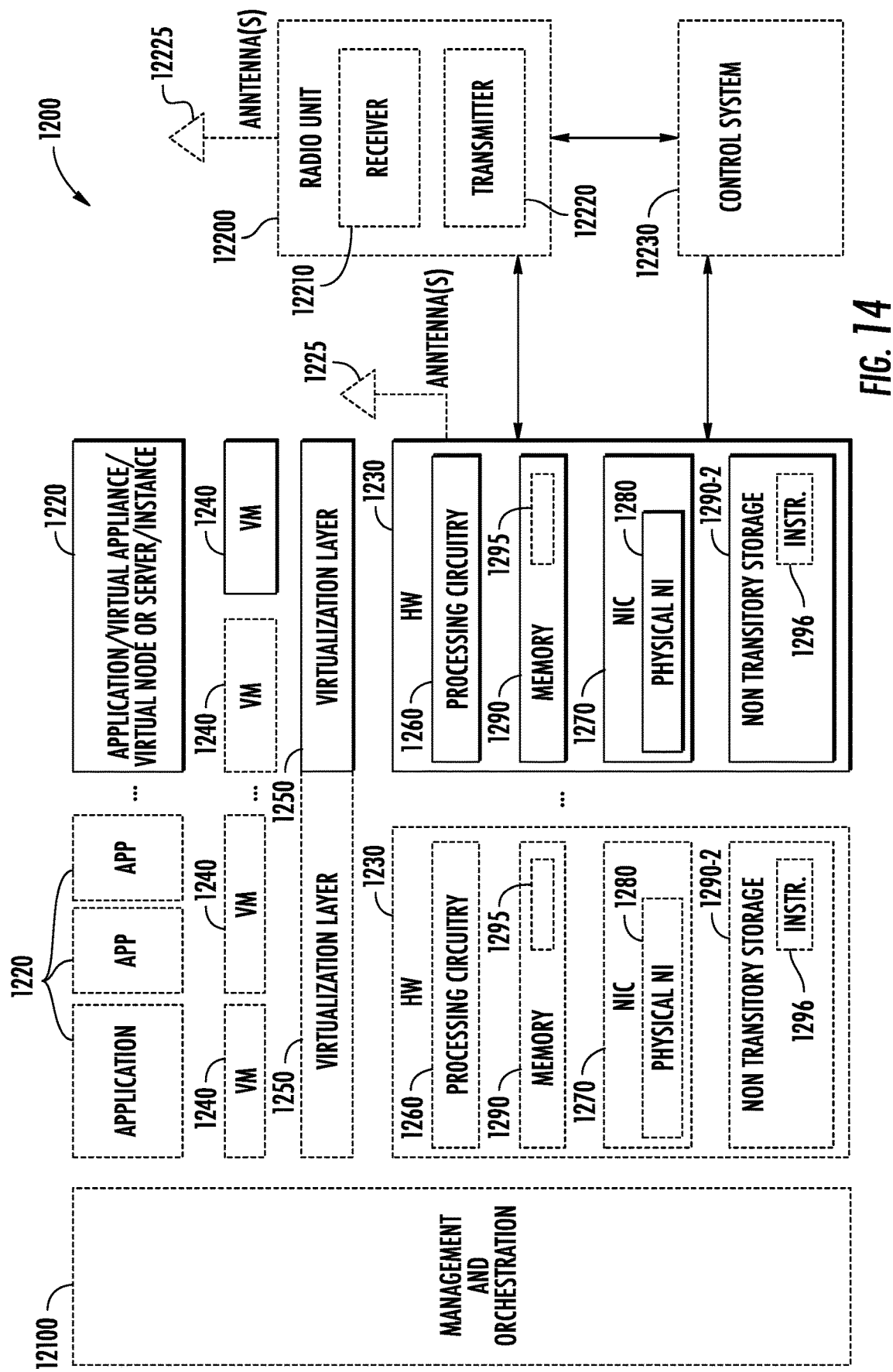
FIG. 14 is a schematic block diagram illustrating a virtualization environment in which functions implemented by some embodiments may be virtualized.

FIG. 14 is a schematic block diagram illustrating a virtualization environment 1200 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a WD, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1200 hosted by one or more of hardware nodes 1230. Further, in embodiments in which the virtual node is not a radio access node or does not require radio connectivity (e.g., a core network node), then the network node may be entirely virtualized.

The functions may be implemented by one or more applications 1220 (which may alternatively be called software instances, virtual appliances, network functions, virtual nodes, virtual network functions, etc.) operative to implement some of the features, functions, and/or benefits of some of the embodiments disclosed herein. Applications 1220 are run in virtualization environment 1200 which provides hardware node 1230 comprising processing circuitry 1260 and memory 1290. Memory 1290 contains instructions or software 1295 executable by processing circuitry 1260 whereby application 1220 is operative to provide one or more of the features, benefits, and/or functions disclosed herein.

Virtualization environment 1200, comprises general-purpose or special-purpose network hardware nodes 1230 comprising a set of one or more processors or processing circuitry 1260, which may be commercial off-the-shelf (COTS) processors, dedicated Application Specific Integrated Circuits (ASICs), or any other type of processing circuitry including digital or analog hardware components or special purpose processors. Each hardware device may comprise memory 1290-1 which may be non-persistent memory for temporarily storing instructions or software 1295 executed by processing circuitry 1260. Each hardware device may comprise one or more network interface controllers (NICs) 1270, also known as network interface cards, which include physical network interface 1280. Each hardware device may also include non-transitory, persistent, machine-readable storage media 1290-2 having stored therein software 1295 and/or instructions executable by processing circuitry 1260. Software 1295 may include any type of software 1296 including software for instantiating one or more virtualization layers 1250 (also referred to as hypervisors), software to execute virtual machines 1240 as well as software allowing it to execute functions, features and/or benefits described in relation with some embodiments described herein.

Virtual machines 1240, comprise virtual processing, virtual memory, virtual networking or interface and virtual storage, and may be run by a corresponding virtualization layer 1250 or hypervisor. Different embodiments of the instance of virtual applications 1220 may be implemented on one or more of virtual machines 1240, and the implementations may be made in different ways.

During operation, processing circuitry 1260 executes software 1295 to instantiate the hypervisor or virtualization layer 1250, which may sometimes be referred to as a virtual machine monitor (VMM). Virtualization layer 1250 may present a virtual operating platform that appears like networking hardware to virtual machine 1240.

As shown in FIG. 14, hardware node 1230 may be a standalone network node with generic or specific components. Hardware node 1230 may comprise antenna 1225 and may implement some functions via virtualization. Alternatively, hardware node 1230 may be part of a larger cluster of hardware (e.g. such as in a data center or customer premise equipment (CPE)) where many hardware nodes work together and are managed via management and orchestration (MANO) 12100, which, among others, oversees lifecycle management of applications 1220.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1240 may be a software implementation of a physical machine that runs programs as if they were executing on a physical, non-virtualized machine. Each of virtual machines 1240, and that part of hardware node 1230 that executes that virtual machine, be it hardware dedicated to that virtual machine and/or hardware shared by that virtual machine with others of the virtual machines 1240, forms a separate virtual network elements (VNE).

Still in the context of NFV, Virtual Network Function (VNF) is responsible for handling specific network functions that run in one or more virtual machines 1240 on top of hardware node 1230 and corresponds to application 1220 in FIG. 14.

In some embodiments, one or more radio units 12200 that each include one or more transmitters 12220 and one or more receivers 12210 may be coupled to one or more antennas 12225. Radio units 12200 may communicate directly with hardware nodes 1230 via one or more appropriate network interfaces and may be used in combination with the virtual components to provide a virtual node with radio capabilities, such as a radio access node or a base station.

In some embodiments, some signaling can be performed with the use of control system 12230 which may alternatively be used for communication between the hardware nodes 1230 and radio units 12200.

Figure 15:
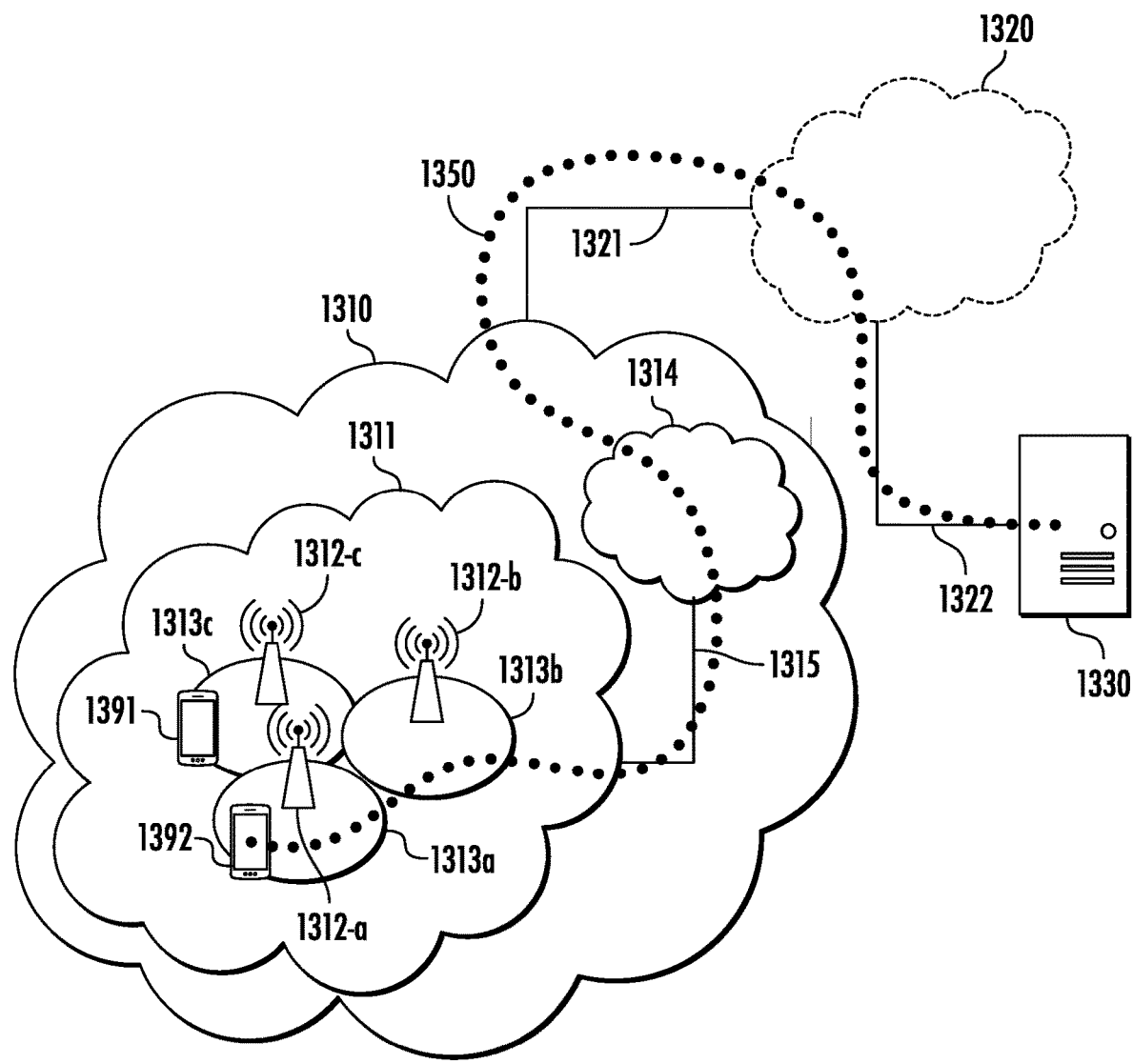
FIG. 15 is an embodiment of a wireless communication system.

With reference to FIG. 15, in accordance with an embodiment, a communication system includes telecommunication network 1310, such as a 3GPP-type cellular network, which comprises access network 1311, such as a radio access network, and core network 1314. Access network 1311 comprises a plurality of base stations 1312*a*, 1312*b*, 1312*c*, such as NBs, eNBs, gNBs or other types of wireless access points, each defining a corresponding coverage area 1313*a*, 1313*b*, 1313*c*. Each base station 1312*a*, 1312*b*, 1312*c* is connectable to core network 1314 over a wired or wireless connection 1315. A first WD 1391 located in coverage area 1313*c* is configured to wirelessly connect to, or be paged by, the corresponding base station 1312*c*. A second WD 1392 in coverage area 1313*a* is wirelessly connectable to the corresponding base station 1312*a*. While a plurality of WDs 1391, 1392 are illustrated in this example, the disclosed embodiments are equally applicable to a situation where a sole WD 1392 is in the coverage area or where a sole WD is connecting to the corresponding base station 1312.

Telecommunication network 1310 is itself connected to host computer 1330, which may be embodied in the hardware and/or software of a standalone server, a cloud-implemented server, a distributed server or as processing resources in a server farm. Host computer 1330 may be under the ownership or control of a service provider, or may be operated by the service provider or on behalf of the service provider. Connections 1321 and 1322 between telecommunication network 1310 and host computer 1330 may extend directly from core network 1314 to host computer 1330 or may go via an optional intermediate network 1320. Intermediate network 1320 may be one of, or a combination of more than one of, a public, private or hosted network; intermediate network 1320, if any, may be a backbone network or the Internet; in particular, intermediate network 1320 may comprise two or more sub-networks (not shown).

The communication system of FIG. 15 as a whole enables connectivity between the connected WDs 1391, 1392 and host computer 1330. The connectivity may be described as an over-the-top (OTT) connection 1350. Host computer 1330 and the connected WDs 1391, 1392 are configured to communicate data and/or signaling via OTT connection 1350, using access network 1311, core network 1314, any intermediate network 1320 and possible further infrastructure (not shown) as intermediaries. OTT connection 1350 may be transparent in the sense that the participating communication devices through which OTT connection 1350 passes are unaware of routing of uplink and downlink communications. For example, base station 1312 may not or need not be informed about the past routing of an incoming downlink communication with data originating from host computer 1330 to be forwarded (e.g., handed over) to a connected WD 1391. Similarly, base station 1312 need not be aware of the future routing of an outgoing uplink communication originating from the WD 1391 towards the host computer 1330.

Example implementations, in accordance with an embodiment, of the WD, base station and host computer discussed in the preceding paragraphs will now be described with reference to FIG. 16. In communication system 1400, host computer 1410 comprises hardware 1415 including communication interface 1416 configured to set up and maintain a wired or wireless connection with an interface of a different communication device of communication system 1400. Host computer 1410 further comprises processing circuitry 1418, which may have storage and/or processing capabilities. In particular, processing circuitry 1418 may comprise one or more programmable processors, application-specific integrated circuits, field programmable gate arrays or combinations of these (not shown) adapted to execute instructions. Host computer 1410 further comprises software 1411, which is stored in or accessible by host computer 1410 and executable by processing circuitry 1418. Software 1411 includes host application 1412. Host application 1412 may be operable to provide a service to a remote user, such as WD 1430 connecting via OTT connection 1450 terminating at WD 1430 and host computer 1410. In providing the service to the remote user, host application 1412 may provide user data which is transmitted using OTT connection 1450.

Communication system 1400 further includes base station 1420 provided in a telecommunication system and comprising hardware 1425 enabling it to communicate with host computer 1410 and with WD 1430. Hardware 1425 may include communication interface 1426 for setting up and maintaining a wired or wireless connection with an interface of a different communication device of communication system 1400, as well as radio interface 1427 for setting up and maintaining at least wireless connection 1470 with WD 1430 located in a coverage area (not shown in FIG. 16) served by base station 1420. Communication interface 1426 may be configured to facilitate connection 1460 to host computer 1410. Connection 1460 may be direct or it may pass through a core network (not shown in FIG. 16) of the telecommunication system and/or through one or more intermediate networks outside the telecommunication system. In the embodiment shown, hardware 1425 of base station 1420 further includes processing circuitry 1428, which may comprise one or more programmable processors, application-specific integrated circuits, field programmable gate arrays or combinations of these (not shown) adapted to execute instructions. Base station 1420 further has software 1421 stored internally or accessible via an external connection.

Communication system 1400 further includes WD 1430 already referred to. The hardware 1435 may include radio interface 1437 configured to set up and maintain wireless connection 1470 with a base station serving a coverage area in which WD 1430 is currently located. Hardware 1435 of WD 1430 further includes processing circuitry 1438, which may comprise one or more programmable processors, application-specific integrated circuits, field programmable gate arrays or combinations of these (not shown) adapted to execute instructions. WD 1430 further comprises software 1431, which is stored in or accessible by WD 1430 and executable by processing circuitry 1438. Software 1431 includes client application 1432. Client application 1432 may be operable to provide a service to a human or non-human user via WD 1430, with the support of host computer 1410. In host computer 1410, an executing host application 1412 may communicate with the executing client application 1432 via OTT connection 1450 terminating at WD 1430 and host computer 1410. In providing the service to the user, client application 1432 may receive request data from host application 1412 and provide user data in response to the request data. OTT connection 1450 may transfer both the request data and the user data. Client application 1432 may interact with the user to generate the user data that it provides.

Figure 16:
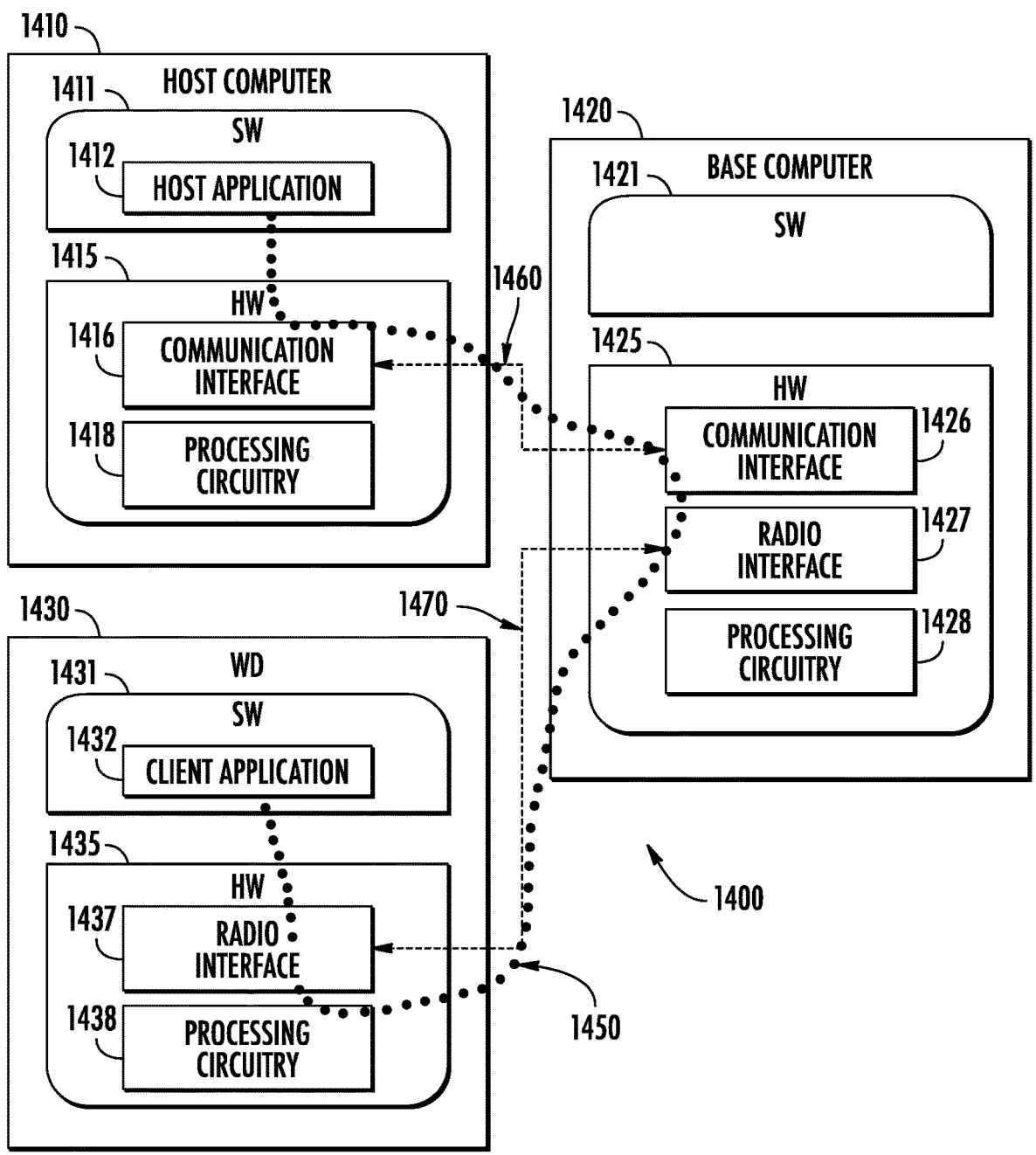
FIG. 16 is an embodiment of a wireless device.

It is noted that host computer 1410, base station 1420 and WD 1430 illustrated in FIG. 16 may be similar or identical to host computer 1330, one of base stations 1312a, 1312b, 1312c and one of WDs 1391, 1392 of FIG. 15, respectively. This is to say, the inner workings of these entities may be as shown in FIG. 16 and independently, the surrounding network topology may be that of FIG. 15.

In FIG. 16, OTT connection 1450 has been drawn abstractly to illustrate the communication between host computer 1410 and WD 1430 via base station 1420, without explicit reference to any intermediary devices and the precise routing of messages via these devices. Network infrastructure may determine the routing, which it may be configured to hide from WD 1430 or from the service provider operating host computer 1410, or both. While OTT connection 1450 is active, the network infrastructure may further take decisions by which it dynamically changes the routing (e.g., on the basis of load balancing consideration or reconfiguration of the network).

Wireless connection 1470 between WD 1430 and base station 1420 is in accordance with the teachings of the embodiments described throughout this disclosure. One or more of the various embodiments improve the performance of OTT services provided to WD 1430 using OTT connection 1450, in which wireless connection 1470 forms the last segment.

A measurement procedure may be provided for the purpose of monitoring data rate, latency and other factors on which the one or more embodiments improve. There may further be an optional network functionality for reconfiguring OTT connection 1450 between host computer 1410 and WD 1430, in response to variations in the measurement results. The measurement procedure and/or the network functionality for reconfiguring OTT connection 1450 may be implemented in software 1411 and hardware 1415 of host computer 1410 or in software 1431 and hardware 1435 of WD 1430, or both. In embodiments, sensors (not shown) may be deployed in or in association with communication devices through which OTT connection 1450 passes; the sensors may participate in the measurement procedure by supplying values of the monitored quantities exemplified above, or supplying values of other physical quantities from which software 1411, 1431 may compute or estimate the monitored quantities. The reconfiguring of OTT connection 1450 may include message format, retransmission settings, preferred routing etc.; the reconfiguring need not affect base station 1420, and it may be unknown or imperceptible to base station 1420. Such procedures and functionalities may be known and practiced in the art. In certain embodiments, measurements may involve proprietary WD signaling facilitating host computer 1410's measurements of throughput, propagation times, latency and the like. The measurements may be implemented in that software 1411 and 1431 causes messages to be transmitted, in particular empty or 'dummy' messages, using OTT connection 1450 while it monitors propagation times, errors etc.

Figure 17:
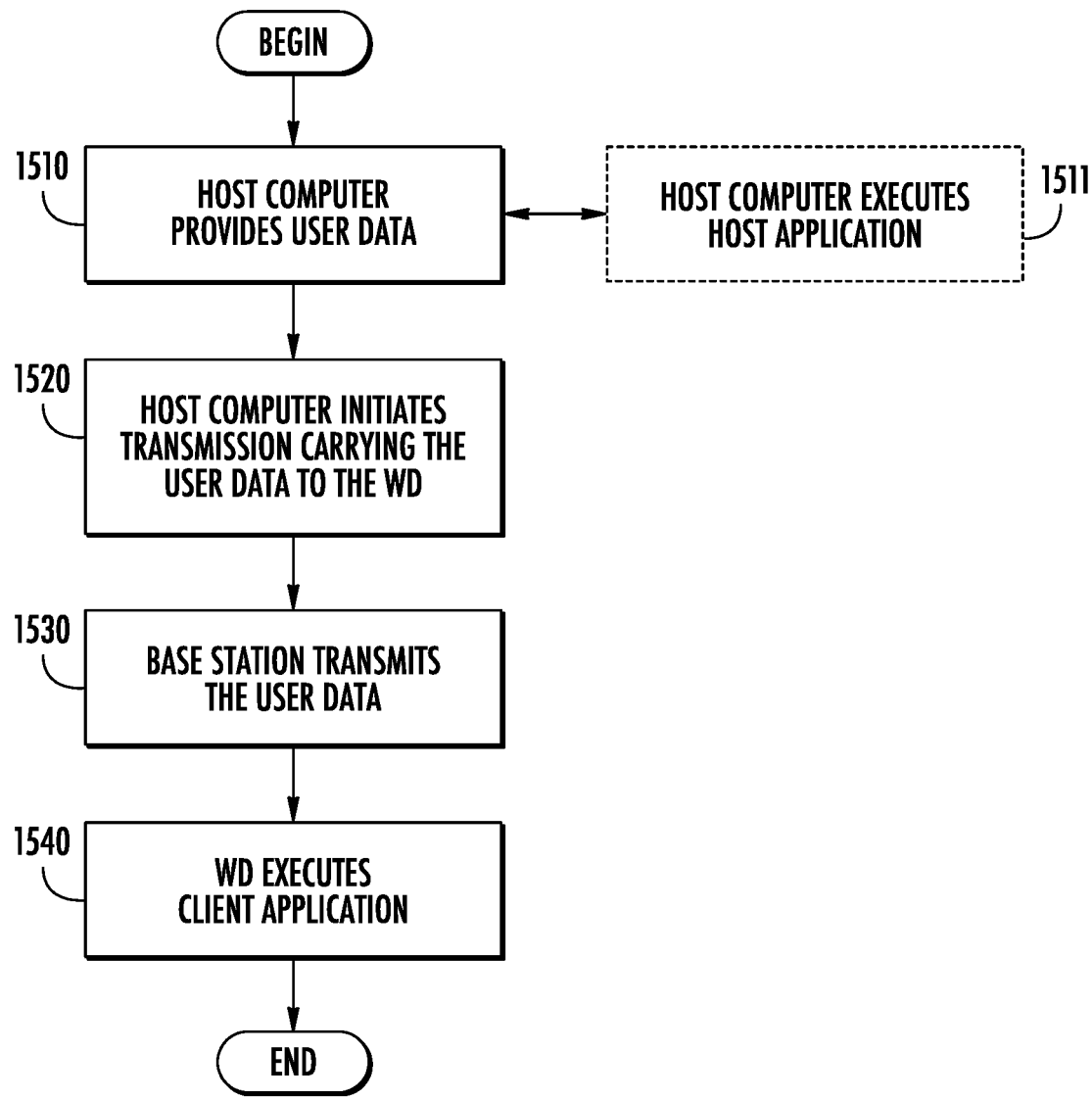
FIG. 17 is a flowchart of a first example process in a communication system.

FIG. 17 is a flowchart illustrating a method implemented in a communication system, in accordance with one embodiment. The communication system includes a host computer, a base station and a WD which may be those described with reference to FIGS. 15 and 16. For simplicity of the present disclosure, only drawing references to FIG. 17 will be included in this section. In step 1510, the host computer provides user data. In substep 1511 (which may be optional) of step 1510, the host computer provides the user data by executing a host application. In step 1520, the host computer initiates a transmission carrying the user data to the WD. In step 1530 (which may be optional), the base station transmits to the WD the user data which was carried in the transmission that the host computer initiated, in accordance with the teachings of the embodiments described throughout this disclosure. In step 1540 (which may also be optional), the WD executes a client application associated with the host application executed by the host computer.

Figure 18:
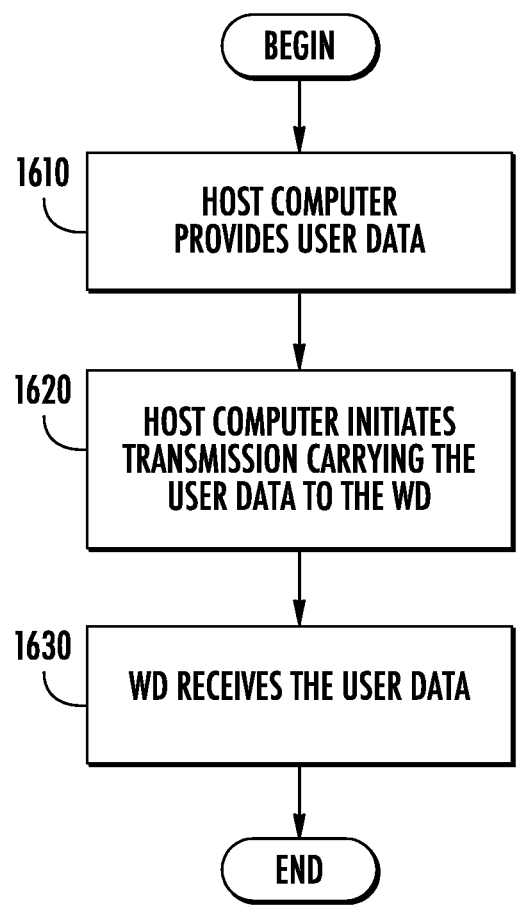
FIG. 18 is a flowchart of a second example process in a communication system.

FIG. 18 is a flowchart illustrating a method implemented in a communication system, in accordance with one embodiment. The communication system includes a host computer, a base station and a WD which may be those described with reference to FIGS. 15 and 16. For simplicity of the present disclosure, only drawing references to FIG. 18 will be included in this section. In step 1610 of the method, the host computer provides user data. In an optional substep (not shown) the host computer provides the user data by executing a host application. In step 1620, the host computer initiates a transmission carrying the user data to the WD. The transmission may pass via the base station, in accordance with the teachings of the embodiments described throughout this disclosure. In step 1630 (which may be optional), the WD receives the user data carried in the transmission.

Figure 19:
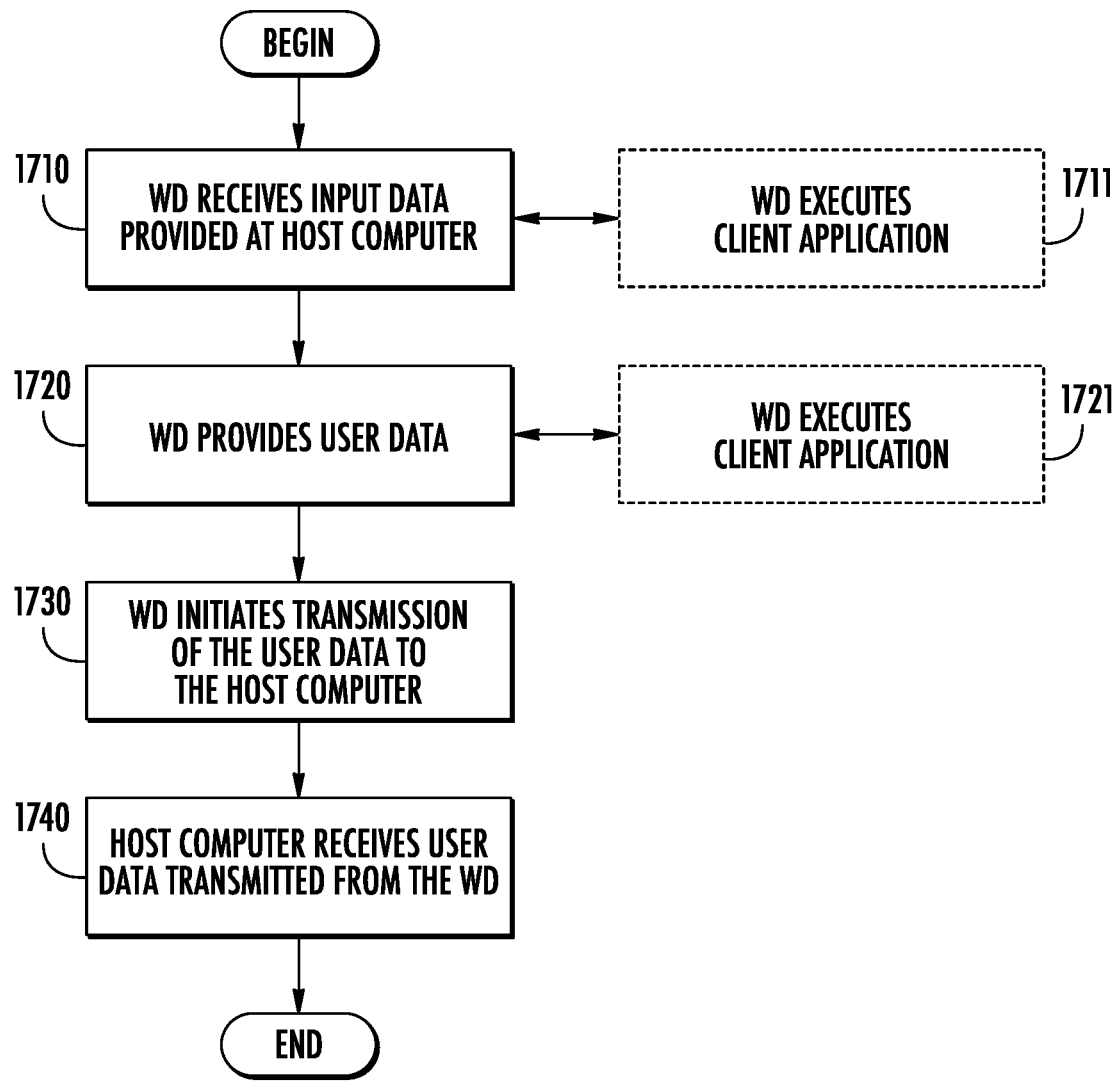
FIG. 19 is a flowchart of a third example process in a communication system.

FIG. 19 is a flowchart illustrating a method implemented in a communication system, in accordance with one embodiment. The communication system includes a host computer, a base station and a WD which may be those described with reference to FIGS. 15 and 16. For simplicity of the present disclosure, only drawing references to FIG. 19 will be included in this section. In step 1710 (which may be optional), the WD receives input data provided by the host computer. Additionally or alternatively, in step 1720, the WD provides user data. In substep 1721 (which may be optional) of step 1720, the WD provides the user data by executing a client application. In substep 1711 (which may be optional) of step 1710, the WD executes a client application which provides the user data in reaction to the received input data provided by the host computer. In providing the user data, the executed client application may further consider user input received from the user. Regardless of the specific manner in which the user data was provided, the WD initiates, in substep 1730 (which may be optional), transmission of the user data to the host computer. In step 1740 of the method, the host computer receives the user data transmitted from the WD, in accordance with the teachings of the embodiments described throughout this disclosure.

Figure 20:
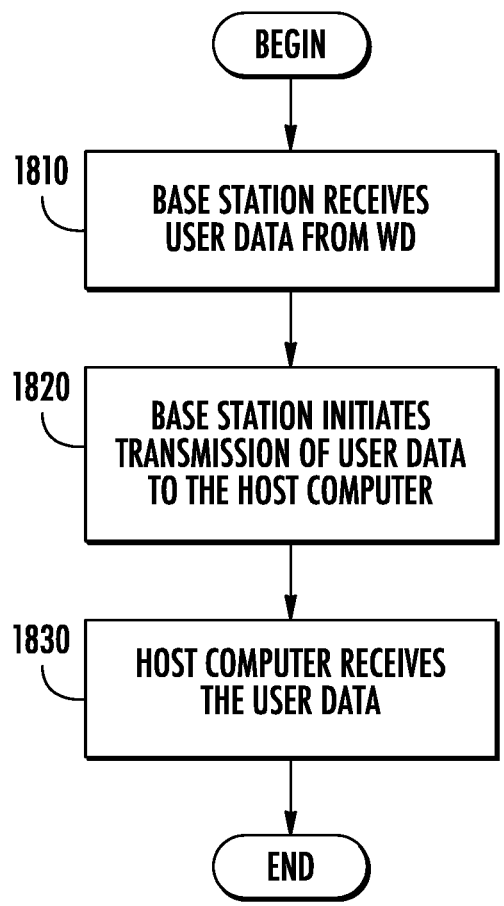
FIG. 20 is a flowchart of a fourth example process in a communication system.

FIG. 20 is a flowchart illustrating a method implemented in a communication system, in accordance with one embodiment. The communication system includes a host computer, a base station and a WD which may be those described with reference to FIGS. 15 and 16. For simplicity of the present disclosure, only drawing references to FIG. 20 will be included in this section. In step 1810 (which may be optional), in accordance with the teachings of the embodiments described throughout this disclosure, the base station receives user data from the WD. In step 1820 (which may be optional), the base station initiates transmission of the received user data to the host computer. In step 1830 (which may be optional), the host computer receives the user data carried in the transmission initiated by the base station.

Figure 21:
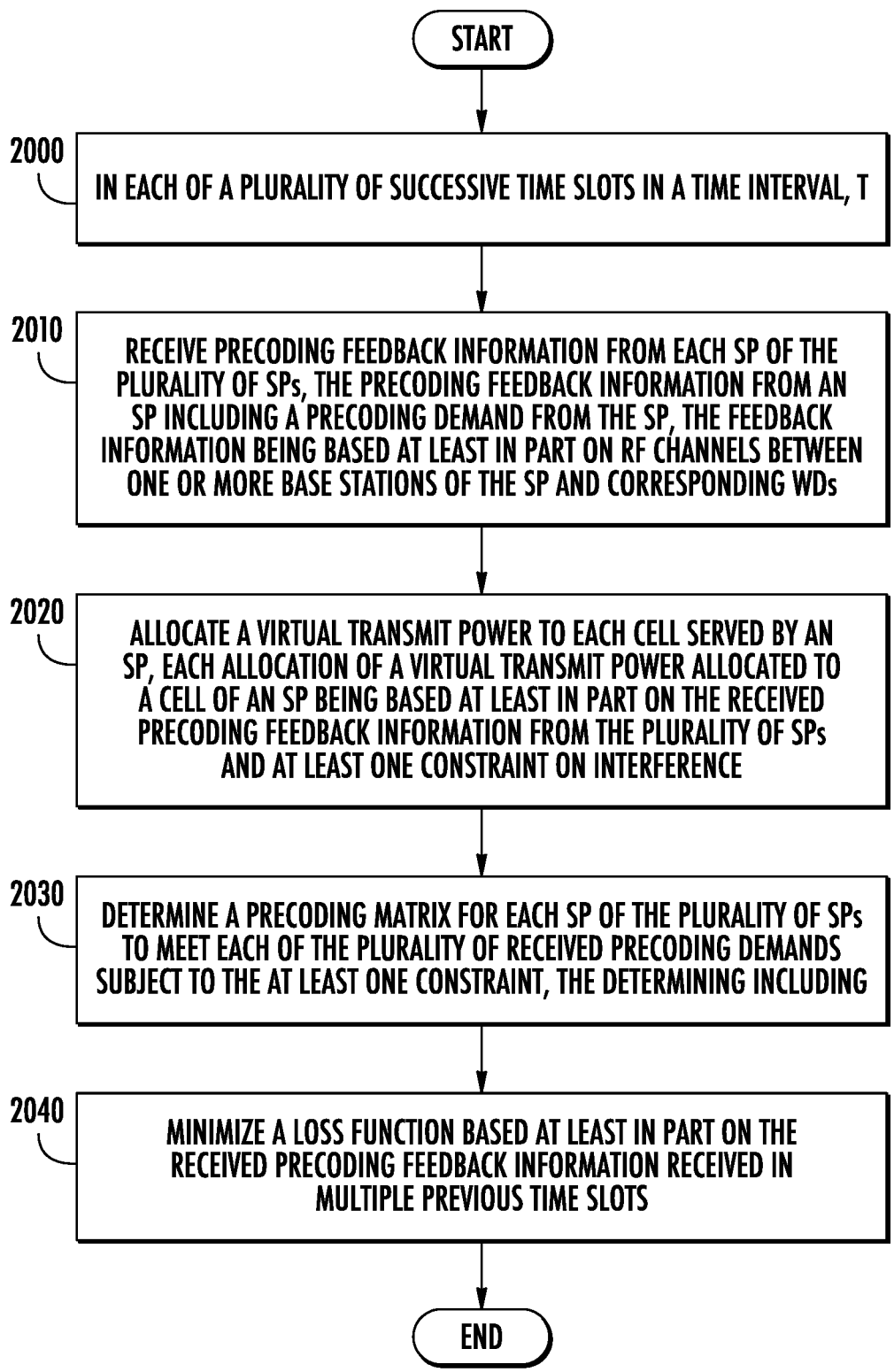
FIG. 21 is a flowchart of a first example process in a network node for performing WNV virtualization.

FIG. 21 is a flowchart illustrating a process in a network node 1060 according to some embodiments. The process may be performed by the processing circuitry 1070 and RF transceiver circuitry 1072 The process includes, in each of a plurality of successive time slots in a time interval, T (step 2000): receiving precoding feedback information from each SP of the plurality of SPs, the precoding feedback information from an SP including a precoding demand from the SP, the feedback information being based at least in part on RF channels between one or more base stations 1420 of the SP and corresponding WDs 1010 (step 2010); allocating a virtual transmit power to each cell served by an SP, each allocation of a virtual transmit power allocated to a cell of an SP being based at least in part on the received precoding feedback information from the plurality of SPs and at least one constraint on interference (step 2020); and determining a precoding matrix for each SP of the plurality of SPs to meet each of the plurality of received precoding demands subject to the at least one constraint (step 2030). The determining includes minimizing a loss function based at least in part on the received precoding feedback information received in multiple previous time slots (step 2040).

Figure 22:
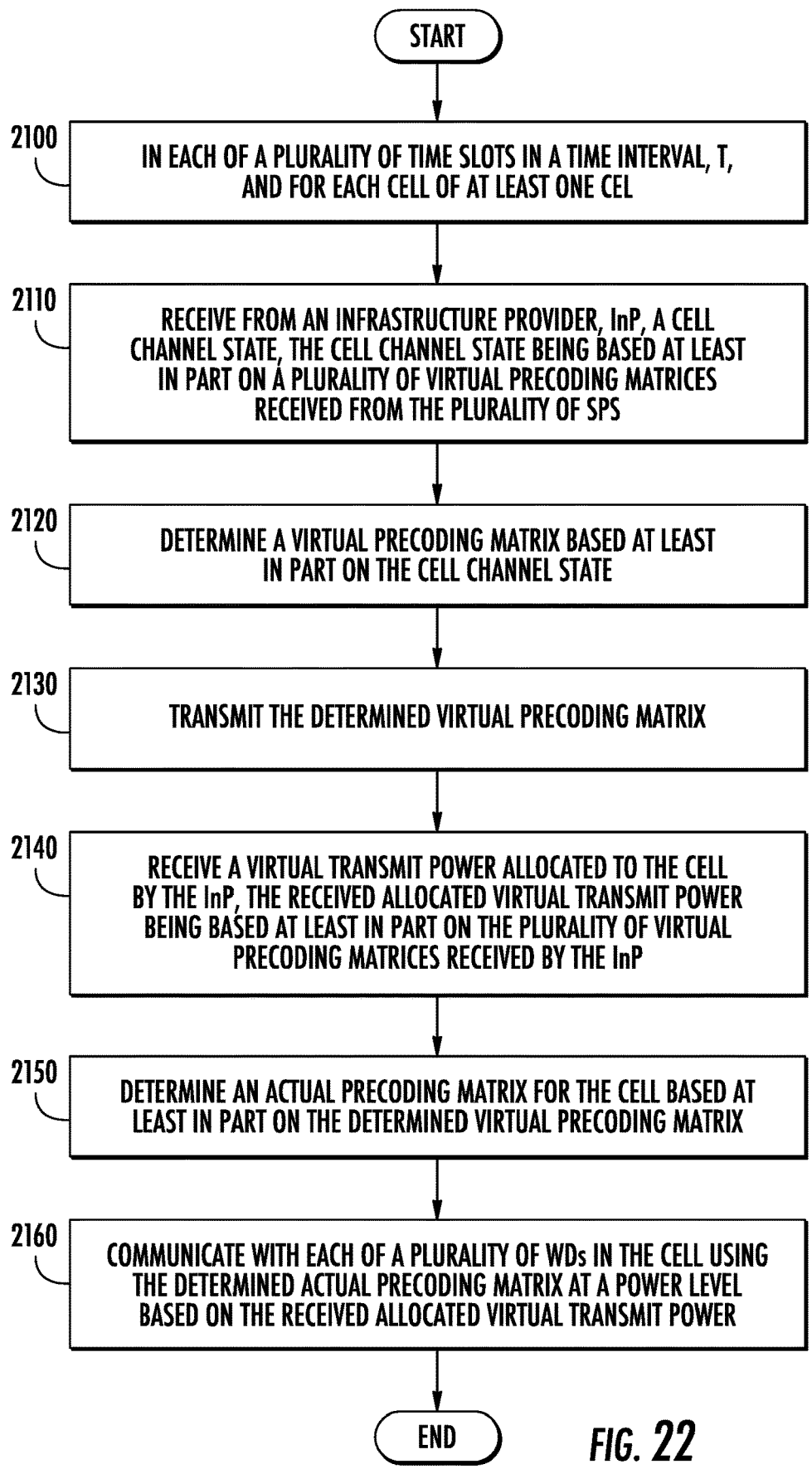
FIG. 22 is a flowchart of a second example process in a network node for performing WNV virtualization.

FIG. 22 is a flowchart of another example process performed by a network node 1060, and in particular, may be performed by the processing circuitry 1070 and RF transceiver circuitry 1072. The process includes, in each of a plurality of time slots over a time interval, T and for each cell of the at least one cell (step 2100): receiving from an infrastructure provider, InP, a cell channel state, the cell channel state being based at least in part on a plurality of virtual precoding matrices received from the plurality of SPs (step 2110); determining a virtual precoding matrix based at least in part on the cell channel state (step 2120); transmitting the determined virtual precoding matrix (step 2130); receiving a virtual transmit power allocated to the cell by the InP, the received allocated virtual transmit power being based at least in part on the plurality of virtual precoding matrices received by the InP (step 2140); determining an actual precoding matrix for the cell based at least in part on the determined virtual precoding matrix (step 2150); and communicating with each of a plurality of WDs 1010 in the cell using the determined actual precoding matrix at a power level based at least in part on the received allocated virtual transmit power (step 2160).

Thus, according to one aspect, a method in a network node 1060 is provided for wireless network virtualization to allocate resources of an infrastructure provider, InP, among a plurality of service providers, SPs, each SP serving at least one cell, each SP further serving a respective set of wireless devices, WDs 1010. The method may be performed by processing circuitry 1070 and RF transceiver circuitry 1072. The method includes, in each of a plurality of successive time slots in a time interval, T: receiving precoding feedback information from each SP of the plurality of SPs, the precoding feedback information from an SP including a precoding demand from the SP, the feedback information being based at least in part on RF channels between one or more base stations 1420 of the SP and corresponding WDs 1010; allocating a virtual transmit power to each cell served by an SP, each allocation of a virtual transmit power allocated to a cell of an SP being based at least in part on the received precoding feedback information from the plurality of SPs and at least one constraint on interference; and determining a precoding matrix for each SP of the plurality of SPs to meet each of the plurality of received precoding demands subject to the at least one constraint. The determining includes minimizing a loss function based at least in part on the received precoding feedback information received in multiple previous time slots.

According to this aspect, in some embodiments, minimizing a loss function includes finding a set of precoding matrices, one for each SP of the plurality of SPs, that minimizes a function of a gradient of the precoding feedback information. In some embodiments, the loss function includes a virtual queue sequence used as a backlog queue of long-term constraint violations where an upper bound on the virtual queue is transformed into an upper bound on the long-term constraint violation. In some embodiments, the loss function includes:

$$2\text{Re}\{tr\{[\nabla_{V_{t-\tau}^*} f_{t-\tau}(V_{t-\tau})]^H (V - V_{t-\tau})\}\} +$$
$$\alpha \|V - V_{t-\tau}\|_F^2 + [Q_{t-1} + g_{t-\tau-1}(V_{t-1})]^T g_{t-\tau}(V) + \eta \|V - V_{t-1}\|_F^2$$

where $$\nabla_{V_{t-\tau}^*} f_{t-\tau}(V_{t-\tau})$$

is the feedback from a plurality of SPs at time t−τ, $V_{t-\tau}$ is the precoding matrix for a plurality of SPs, $Q_{t-1}$ is the virtual queue sequence value at time t−1, $g_{t-\tau-1}(V_{t-1})$ is a constraint at time t−τ−1, and α and η are constants. In some embodiments, the interference constraint is a constraint on signal leakage, the signal leakage being determined based at least in part on a channel matrix for the SP and the actual precoding matrix determined by the SP. In some embodiments, minimizing the loss function further includes minimizing a per cell loss function for each of a plurality of cells of the plurality of SPs. In some embodiments, the per cell loss function includes:

$$2\text{Re}\{tr\{[\nabla_{\tilde{V}_{t-\tau}^{c*}} f_{t-\tau}^c(\tilde{V}_{t-\tau}^c)]^H (\tilde{V}^c - \tilde{V}_{t-\tau}^c)\}\} +$$
$$\alpha \|\tilde{V}^c - \tilde{V}_{t-\tau}^c\|_F^2 + [Q_{t-1}^c + g_{t-\tau-1}^c(\tilde{V}_{t-1}^c)]g_{t-\tau}^c(\tilde{V}^c) + \eta \|\tilde{V}^c - \tilde{V}_{t-1}^c\|_F^2$$

subject to $$\|\tilde{V}^c\|_F^2 \le P_c^{max},$$

where $$\nabla_{V_{t-\tau}^{c*}} f_{t-\tau}^c(\tilde{V}_{t-\tau}^c)$$

is the feedback corresponding to a cell of a plurality of SPs at time $$t-\tau, \tilde{V}_{t-\tau}^c$$

is the precoding matrix for the cell, $$Q_{t-1}^c$$

is the virtual queue sequence value for the cell at time t−1, $$g_{t-\tau-1}^c$$

is a constraint at time t−τ−1, and α and η are constants. In some embodiments, the method also includes updating the virtual queue for any c∈ $\mathcal{C}$ as $$Q_t^c = \max\{-\gamma g_{t-\tau}^c(x_t),\ Q_{t-1}^c + \gamma g_{t-\tau}^c(x_t)\}$$

where γ is a constant. In some embodiments, the interference constraint is a constraint on signal leakage between cells, the signal leakage between cells being determined based at least in part on a channel matrix for the cell and the actual precoding matrix for the cell.

According to another aspect, a network node 1060 is configured to perform wireless network virtualization to allocate resources of an infrastructure provider, InP. among a plurality of service providers, SPs, each SP serving at least one cell, each SP further serving a respective set of wireless devices, WDs 1010. The network node 1060 includes processing circuitry 1070 configured to: in each of a plurality of successive time slots in a time interval, T: receive precoding feedback information from each SP of the plurality of SPs, the precoding feedback information from an SP including a precoding demand from the SP, the feedback information being based at least in part on RF channels between one or more base stations 1420 of the SP and corresponding WDs 1010; allocate a virtual transmit power to each cell served by an SP, each allocation of a virtual transmit power allocated to a cell of an SP being based at least in part on the received precoding feedback information from the plurality of SPs and at least one constraint on interference; and determine a precoding matrix for each SP of the plurality of SPs to meet each of the plurality of received precoding demands subject to the at least one constraint. The determining includes minimizing a loss function based at least in part on the received precoding feedback information received in multiple previous time slots.

According to this aspect, in some embodiments, minimizing a loss function includes finding a set of precoding matrices, one for each SP of the plurality of SPs, that minimizes a function of a gradient of the precoding feedback information. In some embodiments, the loss function includes a virtual queue sequence used as a backlog queue of long-term constraint violations where an upper bound on the virtual queue is transformed into an upper bound on the long-term constraint violation. In some embodiments, the loss function includes:

$$2\text{Re}\{tr\{[\nabla_{V_{t-\tau}^{c*}} f_{t-\tau}^c(\tilde{V}_{t-\tau}^c)]^H (\tilde{V}^c - \tilde{V}_{t-\tau}^c)\}\} +$$
$$\alpha\|\tilde{V}^c - \tilde{V}_{t-\tau}^c\|_F^2 + [Q_{t-1}^c + g_{t-\tau-1}^c(\tilde{V}_{t-1}^c)]g_{t-\tau}^c(\tilde{V}^c) + \eta\|\tilde{V}^c - \tilde{V}_{t-1}^c\|_F^2$$

where $f_{t-\tau}(V_{t-\tau})$ is the feedback from a plurality of SPs at time t−τ, $V_{t-\tau}$ is the precoding matrix for a plurality of SPs, $Q_{t-1}$ is the virtual queue sequence value at time t−1, $g_{t-\tau-1}(V_{t-1})$ is a constraint at time t−τ−1, and α and η are constants. In some embodiments, the interference constraint is a constraint on signal leakage, the signal leakage being determined based at least in part on a channel matrix for the SP and the actual precoding matrix determined by the SP. In some embodiments, minimizing the loss function further includes minimizing a per cell loss function for each of a plurality of cells of the plurality of SPs. In some embodiments, the per cell loss function includes:

$$2\text{Re}\{tr\{[\nabla_{V_{t-\tau}^{c*}} f_{t-\tau}^c(\tilde{V}_{t-\tau}^c)]^H (\tilde{V}^c - \tilde{V}_{t-\tau}^c)\}\} +$$
$$\alpha\|\tilde{V}^c - \tilde{V}_{t-\tau}^c\|_F^2 + [Q_{t-1}^c + g_{t-\tau-1}^c(\tilde{V}_{t-1}^c)]g_{t-\tau}^c(\tilde{V}^c) + \eta\|\tilde{V}^c - \tilde{V}_{t-1}^c\|_F^2$$

subject to $$\|\tilde{V}^c\|_F^2 \le P_c^{max},$$

where $$\nabla_{V_{t-\tau}^{c*}} f_{t-\tau}^c(\tilde{V}_{t-\tau}^c)$$

is the feedback from corresponding to a cell of a plurality of SPs at time $$t-\tau, \tilde{V}_{t-\tau}^c$$

is the precoding matrix for the cell, $$Q_{t-1}^c$$

is the virtual queue sequence value for the cell at time t−1, $$g_{t-\tau-1}^c$$

is a constraint at time t−τ−1, and α and η are constants. In some embodiments, the processing circuitry is further configured to update the virtual queue for any c∈ $\mathcal{C}$ as:

$$Q_t^c = \max\{-\gamma g_{t-\tau}^c(x_t),\ Q_{t-1}^c + \gamma g_{t-\tau}^c(x_t)\}$$

where $\gamma$ is a constant. In some embodiments, the interference constraint is a constraint on signal leakage, the signal leakage being determined based at least in part on a channel matrix and the actual precoding matrix.

According to yet another aspect, a method in a network node 1060 provides wireless infrastructure to a service provider, SP, of a plurality of SPs, the SP of the plurality of SPs being in communication with a plurality of WDs 1010 in each of at least one cell served by the SP. The method may be performed by processing circuitry 1070. The method includes, in each of a plurality of time slots over a time interval, T, and for each cell of the at least one cell: receiving from an infrastructure provider, InP, a cell channel state, the cell channel state being based at least in part on a plurality of virtual precoding matrices received from the plurality of SPs; determining a virtual precoding matrix based at least in part on the cell channel state; transmitting the determined virtual precoding matrix; receiving a virtual transmit power allocated to the cell by the InP, the received allocated virtual transmit power being based at least in part on the plurality of virtual precoding matrices received by the InP; determining an actual precoding matrix for the cell based at least in part on the determined virtual precoding matrix; and communicating with each of a plurality of WDs 1010 in the cell using the determined actual precoding matrix at a power level based at least in part on the received allocated virtual transmit power.

According to another aspect, a network node 1060 is configured to provide wireless infrastructure to a service provider, SP, of a plurality of SPs, the SP of the plurality of SPs being in communication with a plurality of WDs 1010 in each of at least one cell served by the SP. The network node 1060 includes processing circuitry 1070 configured to, in each of a plurality of time slots over a time interval, T, and for each cell of the at least one cell. The network node 1060 includes processing circuitry configured to: in each of a plurality of time slots over a time interval, T, and for each of the at least one cell: receive from an infrastructure provider, InP, a cell channel state, the cell channel state being based at least in part on a plurality of virtual precoding matrices received by the InP from the plurality of SPs; determine a virtual precoding matrix based at least in part on the cell channel state; transmit the determined virtual precoding matrix; receive a virtual transmit power allocated to the cell by the InP, the received allocated virtual transmit power being based at least in part on the plurality of virtual precoding matrices received by the InP; determine an actual precoding matrix for the cell based at least in part on the determined virtual precoding matrix; and communicate with each of a plurality of WDs 1010 in the cell using the determined actual precoding matrix at a power level based at least in part on the received allocated virtual transmit power.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Some embodiments include the following examples.

Example A1. A network node 1060 configured to communicate with a plurality of service providers (SP) and wireless devices (WDs) (1010), the network node (1060) configured to, and/or comprising a radio interface and/or comprising processing circuitry configured to
in each of a plurality of successive transmission time periods:
select a decision sequence, $x_t$; and
select a virtual queue sequence, $Q_t$, the virtual queue sequence is used as a backlog queue on a long-term constraint violation where an upper bound on the virtual queue is transformed into an upper bound on the constraint violation,
wherein time-varying long-term constraints are accommodated with a guarantee on the dynamic regret.

Example B1. A method implemented in a network node (1060) in communication with a plurality of service providers (SPs) and wireless devices (WDs) (1010), the method comprising:
in each of a plurality of successive transmission time periods:
selecting a decision sequence, $x_t$; and
selecting a virtual queue sequence, $Q_t$, the virtual queue sequence is used as a backlog queue on a long-term constraint violation where an upper bound on the virtual queue is transformed into an upper bound on the constraint violation,
wherein time-varying long-term constraints are accommodated with a guarantee on the dynamic regret.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

ABBREVIATIONS

At least some of the following abbreviations may be used in this disclosure. If there is an inconsistency between abbreviations, preference should be given to how it is used above.

1x RTT CDMA2000 1x Radio Transmission Technology
3GPP 3rd Generation Partnership Project
5G 5th Generation
ABS Almost Blank Subframe
ARQ Automatic Repeat Request
AWGN Additive White Gaussian Noise
BCCH Broadcast Control Channel
BCH Broadcast Channel
CA Carrier Aggregation
CC Carrier Component
CCCH SDU Common Control Channel SDU
CDMA Code Division Multiplexing Access
CGI Cell Global Identifier
CIR Channel Impulse Response
CP Cyclic Prefix
CPICH Common Pilot Channel
CPICH Ec/No CPICH Received energy per chip divided by the power density in the band
CQI Channel Quality information
C-RAN Cloud Radio Networks
C-RNTI Cell RNTI
CSI Channel State Information
DCCH Dedicated Control Channel
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eNB E-UTRAN NodeB
ePDCCH enhanced Physical Downlink Control Channel
E-SMLC evolved Serving Mobile Location Center
E-UTRA Evolved UTRA
E-UTRAN Evolved UTRAN
FDD Frequency Division Duplex
FFS For Further Study
GERAN GSM EDGE Radio Access Network
gNB Base station in NR
GNSS Global Navigation Satellite System
GSM Global System for Mobile communication
HARQ Hybrid Automatic Repeat Request
HO Handover
HSPA High Speed Packet Access
HRPD High Rate Packet Data
IID Independent and Identically Distributed
InP Infrastructure Provider
KKT Karush-Kuhn-Tucker
LOS Line of Sight
LPP LTE Positioning Protocol
LTE Long-Term Evolution
MAC Medium Access Control
MBMS Multimedia Broadcast Multicast Services
MBSFN Multimedia Broadcast multicast service Single Frequency Network MBSFN ABS MBSFN Almost Blank Subframe
MDT Minimization of Drive Tests
MIB Master Information Block
MIMO Multiple Input Multiple Output
MME Mobility Management Entity
MSC Mobile Switching Center
NOMA Non-orthogonal Multiple Access
NPDCCH Narrowband Physical Downlink Control Channel
NR New Radio
OCNG OFDMA Channel Noise Generator
OCO Online Convex Optimization
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDCP Packet Data Convergence Protocol
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
RAN Radio Access Network
RAT Radio Access Technology
RLC Radio Link Control
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCH Synchronization Channel
SCell Secondary Cell
SDAP Service Data Adaptation Protocol
SDU Service Data Unit
SFN System Frame Number
SGW Serving Gateway
SI System Information
SIB System Information Block
SINR Signal to Interference plus Noise Ratio
SLNR Signal to Leakage plus Noise Ratio
SNR Signal to Noise Ratio
SON Self Optimized Network
SP Service Provider
SS Synchronization Signal
SSS Secondary Synchronization Signal
TDD Time Division Duplex
TDOA Time Difference of Arrival
TOA Time of Arrival
TSS Tertiary Synchronization Signal
TTI Transmission Time Interval
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network
WNV Wireless Network Virtualization It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method in a network node for wireless network virtualization to allocate resources of an infrastructure provider, InP, among a plurality of service providers, SPs, each SP serving at least one cell, each SP further serving a respective set of wireless devices, WDs, the method comprising:
   in each of a plurality of successive time slots in a time interval, T:
      receiving precoding feedback information from each SP of the plurality of SPs, the precoding feedback information from an SP including a precoding demand from the SP, the feedback information being based at least in part on RF channels between one or more base stations of the SP and corresponding WDs;
      allocating a virtual transmit power to each cell served by an SP, each allocation of a virtual transmit power allocated to a cell of an SP being based at least in part on the received precoding feedback information from the plurality of SPs and at least one constraint on interference; and
      determining a precoding matrix for each SP of the plurality of SPs to meet each of the plurality of received precoding demands subject to the at least one constraint, the determining including:
         minimizing a loss function based at least in part on the received precoding feedback information received in multiple previous time slots.

2. The method of claim 1, wherein minimizing a loss function includes finding a set of precoding matrices, one for each SP of the plurality of SPs, that minimizes a function of a gradient of the precoding feedback information.

3. The method of claim 2, wherein the loss function includes a virtual queue sequence used as a backlog queue of long-term constraint violations where an upper bound on the virtual queue is transformed into an upper bound on the long-term constraint violation.

4. The method of claim 2, wherein the loss function includes:

$$2\text{Re}\{tr\{[\nabla_{V_{t-\tau}^*} f_{t-\tau}(V_{t-\tau})]^H (V - V_{t-\tau})\}\} +$$
$$\alpha \|V - V_{t-\tau}\|_F^2 + [Q_{t-1} + g_{t-\tau-1}(V_{t-1})]^T g_{t-\tau}(V) + \eta \|V - V_{t-1}\|_F^2$$

where $$\nabla_{V_{t-\tau}^*} f_{t-\tau}(V_{t-\tau})$$

is the feedback from a plurality of SPs at time t−τ, $V_{t-\tau}$ is the precoding matrix for a plurality of SPs, $Q_{t-1}$ is the virtual queue sequence value at time t−1, $g_{t-\tau-1}(V_{t-1})$ is a constraint at time t−τ−1, and α and η are constants.

5. The method of claim 4, wherein the interference constraint is a constraint on signal leakage, the signal leakage being determined based at least in part on a channel matrix for the SP and the actual precoding matrix determined by the SP.

6. The method of claim 1, wherein minimizing the loss function further includes minimizing a per cell loss function for each of a plurality of cells of the plurality of SPs.

7. The method of claim 6, wherein the per cell loss function includes:

$$2\text{Re}\{tr\{[\nabla_{\tilde{V}_{t-\tau}^{c*}} f_{t-\tau}^c(\tilde{V}_{t-\tau}^c)]^H (\tilde{V}^c - \tilde{V}_{t-\tau}^c)\}\} +$$
$$\alpha \|\tilde{V}^c - \tilde{V}_{t-1}^c\|_F^2 + [Q_{t-1}^c + g_{t-\tau-1}^c(\tilde{V}_{t-1}^c)]g_{t-\tau}^c(\tilde{V}^c) + \eta \|\tilde{V}^c - \tilde{V}_{t-1}^c\|_F^2$$

subject to $$\|\tilde{V}^c\|_F^2 \leq P_c^{max}, \text{ where } \nabla_{\tilde{V}_{t-\tau}^{c*}} f_{t-\tau}^c(\tilde{V}_{t-\tau}^c)$$

is the feedback corresponding to a cell of a plurality of SPs at time t−τ, $$\tilde{V}_{t-\tau}^c$$

is the precoding matrix for the cell, $$Q_{t-1}^c$$

is the virtual queue sequence value for the cell at time t−1, $$g_{t-\tau-1}^c$$

is a constraint at time t−τ−1, and α and η are constants.

8. The method of claim 7, further comprising updating the virtual queue for any c∈ 𝒞 as $$Q_t^c = \max\{-\gamma g_{t-\tau}^c(x_t), Q_{t-1}^c + \gamma g_{t-\tau}^c(x_t)\}$$

where γ is a constant.

9. The method of claim 7, wherein the interference constraint is a constraint on signal leakage between cells, the signal leakage between cells being determined based at least in part on a channel matrix for the cell and the actual precoding matrix for the cell.

10. A network node configured to perform wireless network virtualization to allocate resources of an infrastructure provider, InP, among a plurality of service providers, SPs, each SP serving at least one cell, each SP further serving a respective set of wireless devices, WDs, the network node comprising processing circuitry configured to:
   in each of a plurality of successive time slots in a time interval, T:
      receive precoding feedback information from each SP of the plurality of SPs, the precoding feedback information from an SP including a precoding demand from the SP, the feedback information being based at least in part on RF channels between one or more base stations of the SP and corresponding WDs;
      allocate a virtual transmit power to each cell served by an SP, each allocation of a virtual transmit power allocated to a cell of an SP being based at least in part on the received precoding feedback information from the plurality of SPs and at least one constraint on interference; and
      determine a precoding matrix for each SP of the plurality of SPs to meet each of the plurality of received precoding demands subject to the at least one constraint, the determining including:
         minimizing a loss function based at least in part on the received precoding feedback information received in multiple previous time slots.

11. The network node of claim 10, wherein minimizing a loss function includes finding a set of precoding matrices, one for each SP of the plurality of SPs, that minimizes a function of a gradient of the precoding feedback information.

12. The network node of claim 11, wherein the loss function includes a virtual queue sequence used as a backlog queue of long-term constraint violations where an upper bound on the virtual queue is transformed into an upper bound on the long-term constraint violation.

13. The network node of claim 11, wherein the loss function includes:

$$2\text{Re}\{tr\{[\nabla_{V_{t-\tau}^*} f_{t-\tau}(V_{t-\tau})]^H (V - V_{t-1})\}\} +$$
$$\alpha \|V - V_{t-\tau}\|_F^2 + [Q_{t-1} + g_{t-\tau-1}(V_{t-1})]^T g_{t-\tau}(V) + \eta \|V - V_{t-\tau}\|_F^2$$

where $f_{t-\tau}(V_{t-\tau})$ is the feedback from a plurality of SPs at time t−τ, $V_{t-\tau}$ is the precoding matrix for a plurality of SPs, $Q_{t-1}$ is the virtual queue sequence value at time t−1, $g_{t-\tau-1}(V_{t-1})$ is a constraint at time t−τ−1, and α and η are constants.

14. The method of claim 13, wherein the interference constraint is a constraint on signal leakage, the signal leakage being determined based at least in part on a channel matrix for the SP and the actual precoding matrix determined by the SP.

15. The network node of claim 10, wherein minimizing the loss function further includes minimizing a per cell loss function for each of a plurality of cells of the plurality of SPs.

16. The network node of claim 15, wherein the per cell loss function includes:

$$2\text{Re}\left\{tr\left\{[\nabla_{\tilde{V}_{t-\tau}^{c*}} f_{t-\tau}^c(\tilde{V}_{t-\tau}^c)]^H \left(\tilde{V}^c - \tilde{V}_{t-\tau}^c\right)\right\}\right\} +$$
$$\alpha\|\tilde{V}^c - \tilde{V}_{t-\tau}^c\|_F^2 + [Q_{t-1}^c + g_{t-\tau-1}^c(\tilde{V}_{t-1}^c)]g_{t-\tau}^c(\tilde{V}^c) + \eta\|\tilde{V}^c - \tilde{V}_{t-1}^c\|_F^2$$

subject to $$\|\tilde{V}^c\|_F^2 \leq P_c^{max}, \text{ where } \nabla_{\tilde{V}_{t-\tau}^{c*}} f_{t-\tau}^c(\tilde{V}_{t-\tau}^c)$$

is the feedback from corresponding to a cell of a plurality of SPs at time t–τ, $$\tilde{V}_{t-\tau}^c$$

is the precoding matrix for the cell, $$Q_{t-1}^c$$

is the virtual queue sequence value for the cell at time t−1, $$g_{t-\tau-1}^c$$

is a constraint at time t−τ−1, and α and η are constants.

17. The network node of claim 16, wherein the processing circuitry is further configured to update the virtual queue for any c∈ $\mathcal{C}$ as:

$$Q_t^c = \max\{-\gamma g_{t-\tau}^c(x_t), Q_{t-1}^c + \gamma g_{t-\tau}^c(x_t)\}$$

where γ is a constant.

18. The network node of claim 16, wherein the interference constraint is a constraint on signal leakage, the signal leakage being determined based at least in part on a channel matrix and the actual precoding matrix.

19. A method in a network node providing wireless infrastructure to a service provider, SP, of a plurality of SPs, the SP of the plurality of SPs being in communication with a plurality of WDs in each of at least one cell served by the SP, the method comprising, in each of a plurality of time slots over a time interval, T, and for each cell of the at least one cell:
  receiving from an infrastructure provider, InP, a cell channel state, the cell channel state being based at least in part on a plurality of virtual precoding matrices received from the plurality of SPs;
  determining a virtual precoding matrix based at least in part on the cell channel state;
  transmitting the determined virtual precoding matrix;
  receiving a virtual transmit power allocated to the cell by the InP, the received allocated virtual transmit power being based at least in part on the plurality of virtual precoding matrices received by the InP;
  determining an actual precoding matrix for the cell based at least in part on the determined virtual precoding matrix; and
  communicating with each of a plurality of WDs in the cell using the determined actual precoding matrix at a power level based at least in part on the received allocated virtual transmit power.

20. A network node providing wireless infrastructure to a service provider, SP, of a plurality of SPs, the SP of the plurality of SPs being in communication with a plurality of WDs in each of at least one cell served by the SP, the method comprising, in each of a plurality of time slots over a time interval, T, and for each cell of the at least one cell, the network node comprising processing circuitry configured to:
  in each of a plurality of time slots over a time interval, T, and for each of the at least one cell:
    receive from an infrastructure provider, InP, a cell channel state, the cell channel state being based at least in part on a plurality of virtual precoding matrices received by the InP from the plurality of SPs;
    determine a virtual precoding matrix based at least in part on the cell channel state;
    transmit the determined virtual precoding matrix;
    receive a virtual transmit power allocated to the cell by the InP, the received allocated virtual transmit power being based at least in part on the plurality of virtual precoding matrices received by the InP;
    determine an actual precoding matrix for the cell based at least in part on the determined virtual precoding matrix; and
  communicate with each of a plurality of WDs in the cell using the determined actual precoding matrix at a power level based at least in part on the received allocated virtual transmit power.

* * * * *